(12) United States Patent
Yi et al.

(10) Patent No.: US 12,517,617 B2
(45) Date of Patent: Jan. 6, 2026

(54) ELECTRONIC DEVICE INCLUDING A SENSOR HAVING A DIVIDED SENSING AREA

(71) Applicant: SAMSUNG DISPLAY CO., LTD., Yongin-si (KR)

(72) Inventors: Da Eun Yi, Yongin-si (KR); Sanghun Park, Yongin-si (KR); Yongsub So, Yongin-si (KR); Bo-Hwan Lee, Yongin-si (KR); Byeongkyu Jeon, Yongin-si (KR); Keumdong Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/349,099

(22) Filed: Jul. 7, 2023

(65) Prior Publication Data

US 2024/0118776 A1   Apr. 11, 2024

(30) Foreign Application Priority Data

Oct. 7, 2022   (KR) .................. 10-2022-0128251
Oct. 28, 2022  (KR) .................. 10-2022-0140868

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01)

(58) Field of Classification Search
None
See application file for complete search history.

(56) References Cited

U.S. PATENT DOCUMENTS

| | | | |
|---|---|---|---|
| 9,013,441 B2* | 4/2015 | Kremin | G06F 3/041661 |
| | | | 178/18.05 |
| 9,256,309 B2* | 2/2016 | Lee | G06F 3/0443 |
| 9,513,749 B2* | 12/2016 | Suzuki | G06F 3/0412 |
| 9,619,088 B2* | 4/2017 | Azumi | G06F 3/04166 |
| 9,626,027 B2* | 4/2017 | Han | G06F 3/04164 |
| 9,740,326 B2* | 8/2017 | Shen | G06F 3/0446 |
| 9,804,704 B2* | 10/2017 | Azumi | G06F 3/0446 |
| 9,921,675 B2* | 3/2018 | Lai | G06F 3/0412 |
| 10,042,451 B2* | 8/2018 | Edwards | G06F 3/0446 |

(Continued)

FOREIGN PATENT DOCUMENTS

| | | |
|---|---|---|
| CN | 110716355 | 1/2020 |
| KR | 10-2018-0079088 | 7/2018 |

(Continued)

*Primary Examiner* — Sepehr Azari
(74) *Attorney, Agent, or Firm* — F. CHAU & ASSOCIATES, LLC

(57) ABSTRACT

An electronic device includes a sensor in which a sensing area and a peripheral area proximate to the sensing area are defined, and a sensor driver driving the sensor. The sensor includes first electrodes disposed in the sensing area and arranged along a first direction, and second electrodes arranged along a second direction intersecting the first direction. A boundary extending along the second direction is defined in the sensing area. The sensor driver simultaneously outputs a plurality of boundary transmit signals to a plurality of boundary electrodes disposed in a boundary area including the boundary among the plurality of first electrodes.

34 Claims, 30 Drawing Sheets

(56) References Cited

U.S. PATENT DOCUMENTS

| | | | |
|---|---|---|---|
| 10,185,434 B2* | 1/2019 | Suzuki | G06F 3/0446 |
| 10,635,210 B2 | 4/2020 | Yi et al. | |
| 10,901,550 B2 | 1/2021 | Zong et al. | |
| 11,112,919 B2* | 9/2021 | Gu | G06F 3/0445 |
| 11,194,431 B2* | 12/2021 | Lin | G06F 3/04166 |
| 11,334,207 B2 | 5/2022 | Kim et al. | |
| 11,500,501 B2* | 11/2022 | Lee | G06F 3/0446 |
| 11,507,233 B2 | 11/2022 | Gwon et al. | |
| 11,592,918 B2* | 2/2023 | Wang | G06F 3/0412 |
| 2009/0267903 A1* | 10/2009 | Cady | G06F 3/04166 |
| | | | 345/173 |
| 2009/0273572 A1* | 11/2009 | Edwards | G06F 3/0412 |
| | | | 345/173 |
| 2010/0156795 A1* | 6/2010 | Kim | G06F 3/0416 |
| | | | 715/764 |
| 2011/0134055 A1* | 6/2011 | Jung | G06F 3/0446 |
| | | | 345/173 |
| 2011/0141040 A1* | 6/2011 | Kang | G06F 3/0446 |
| | | | 345/173 |
| 2011/0148435 A1* | 6/2011 | Schwartz | G01R 27/2605 |
| | | | 324/658 |
| 2011/0279408 A1* | 11/2011 | Urano | G06F 3/0446 |
| | | | 345/173 |
| 2012/0050216 A1* | 3/2012 | Kremin | G06F 3/0446 |
| | | | 345/174 |
| 2013/0265282 A1* | 10/2013 | Nakagawa | G06F 3/0443 |
| | | | 345/174 |
| 2014/0132526 A1* | 5/2014 | Lee | G06F 3/0443 |
| | | | 345/173 |
| 2014/0184539 A1* | 7/2014 | Shin | G06F 3/041661 |
| | | | 345/173 |
| 2014/0253498 A1* | 9/2014 | Suzuki | G06F 3/0445 |
| | | | 345/174 |
| 2015/0022494 A1* | 1/2015 | Azumi | G06F 3/0445 |
| | | | 345/174 |
| 2016/0011687 A1* | 1/2016 | Ding | G06F 3/04164 |
| | | | 345/174 |
| 2016/0085350 A1* | 3/2016 | Edwards | G06F 3/0412 |
| | | | 345/174 |
| 2016/0216836 A1* | 7/2016 | Yao | G06F 3/041661 |
| 2016/0328060 A1* | 11/2016 | Lai | G06F 1/3262 |
| 2017/0045997 A1* | 2/2017 | Suzuki | G06F 3/0445 |
| 2018/0039374 A1* | 2/2018 | Azumi | G06F 3/0445 |
| 2018/0143711 A1* | 5/2018 | Ono | G02F 1/13338 |
| 2018/0181224 A1* | 6/2018 | Li | G06F 3/0446 |
| 2018/0239459 A1* | 8/2018 | Ahn | G06F 3/04184 |
| 2019/0302943 A1* | 10/2019 | Rhe | G06F 3/047 |
| 2020/0348787 A1* | 11/2020 | Wang | G06F 3/0412 |
| 2021/0191567 A1* | 6/2021 | Gu | G06F 3/04164 |
| 2021/0216165 A1* | 7/2021 | Lin | G06F 3/0412 |
| 2022/0004282 A1* | 1/2022 | Lee | G06F 3/0412 |
| 2022/0137783 A1* | 5/2022 | Paik | G06F 3/0443 |
| | | | 345/174 |
| 2023/0004249 A1* | 1/2023 | Teranishi | G06F 3/047 |
| 2023/0117610 A1* | 4/2023 | Shin | G06F 3/0443 |
| | | | 345/173 |
| 2023/0176699 A1* | 6/2023 | Mugiraneza | G06F 3/0443 |
| | | | 345/173 |

FOREIGN PATENT DOCUMENTS

| | | |
|---|---|---|
| KR | 10-2022-0005246 | 1/2022 |
| KR | 10-2022-0016360 | 2/2022 |
| KR | 10-2022-0084538 | 6/2022 |

* cited by examiner

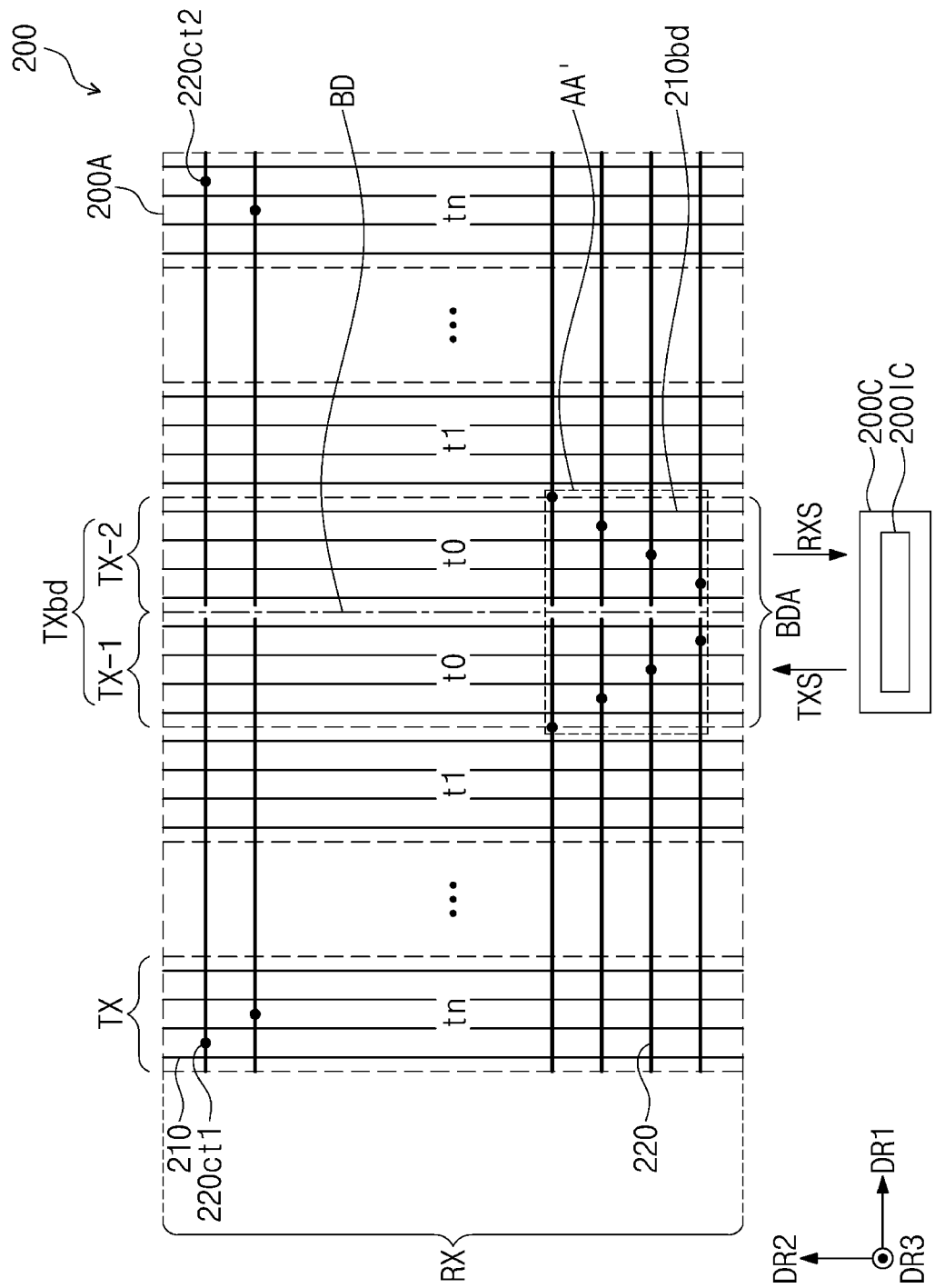

ELECTRONIC DEVICE INCLUDING A SENSOR HAVING A DIVIDED SENSING AREA

CROSS-REFERENCE TO RELATED APPLICATIONS

This application claims priority under 35 U.S.C. § 119 to Korean Patent Application No. 10-2022-0128251 filed on Oct. 7, 2022, and Korean Patent Application No. 10-2022-0140868 field on Oct. 28, 2022, in the Korean Intellectual Property Office, the disclosures of which are herein incorporated by reference in their entireties.

TECHNICAL FIELD

The present disclosure relates to an electronic device and, more specifically, to an electronic device including a sensor having a divided sensing area.

DISCUSSION OF THE RELATED ART

Multimedia electronic devices such as televisions, mobile phones, tablet computers, navigation devices, game consoles, and vehicle displays may display images, and may provide a touch-based input scheme which allows a user to input information or commands easily and intuitively in addition to usual input schemes using buttons, a keyboard, and a mouse.

SUMMARY

An electronic device includes a sensor in which a sensing area and a peripheral area proximate to the sensing area are defined, and a sensor driver driving the sensor. The sensor includes a plurality of first electrodes disposed in the sensing area and arranged along a first direction, and a plurality of second electrodes arranged along a second direction intersecting the first direction. A boundary extending along the second direction is defined in the sensing area. The sensor driver simultaneously outputs a plurality of boundary transmit signals to a plurality of boundary electrodes disposed in a boundary area including the boundary among the plurality of first electrodes.

The boundary may be a divided driving boundary-line. The sensor driver may output a plurality of transmit signals to the plurality of first electrodes in a symmetrical manner about the boundary.

A plurality of groups may be defined. Each of the plurality of groups may include one or more first electrodes among the plurality of first electrodes. Numbers of the first electrodes respectively included in the plurality of groups may be symmetrical with respect to each other about the boundary, wherein the sensor driver simultaneously may output the plurality of transmit signals to the first electrodes included in two groups disposed symmetrically about the boundary among the plurality of groups.

Two groups closest to each other and disposed proximate to the boundary among the plurality of groups may include the plurality of boundary electrodes.

Each of the plurality of second electrodes may include each of a plurality of first sub-electrodes arranged along the second direction and each of a plurality of second sub-electrodes arranged along the second direction. Each of the plurality of first sub-electrodes and each of the plurality of second sub-electrodes may be spaced apart from each other with the boundary being disposed therebetween.

The sensor may further include a plurality of first trace lines electrically connected to the plurality of first electrodes, respectively, a plurality of second trace lines electrically connected to the plurality of first sub-electrodes, respectively, and a plurality of third trace lines electrically connected to the plurality of second sub-electrodes, respectively. The plurality of second trace lines and the plurality of third trace lines may at least partially overlap the sensing area.

The plurality of first sub-electrodes and the plurality of second trace lines may be respectively electrically connected to each other via a plurality of first contacts. The plurality of second sub-electrodes and the plurality of third trace lines may be respectively electrically connected to each other via a plurality of second contacts. The plurality of first contacts and the plurality of second contacts may be arranged in a symmetrical manner with respect to each other about the boundary.

The plurality of first contacts may include first sub-contacts arranged according to a first rule and second sub-contacts arranged according to a second rule that is different from the first rule. A first boundary extending along the second direction and disposed between the first sub-contacts and the second sub-contacts may be further defined in the sensing area. The sensor driver may simultaneously output a plurality of first boundary transmit signals to a plurality of first boundary electrodes disposed in a first boundary area including the first boundary among the plurality of first electrodes.

The sensor driver may include a single driver chip. The plurality of first electrodes and the plurality of second electrodes may be electrically connected to the single driver chip.

The sensor driver may include a plurality of driver chips. A first plurality of first electrodes and a second plurality of first electrodes among the plurality of first electrodes may be spaced apart from each other with the boundary being disposed therebetween. The first plurality of first electrodes may be electrically connected to a first driver chip. The second plurality of first electrodes may be electrically connected to a second driver chip. The plurality of first sub-electrodes may be electrically connected to the first driver chip, while the plurality of second sub-electrodes may be electrically connected to the second driver chip.

A first boundary extending along the second direction and a second boundary extending along the second direction may be further defined in the sensing area such that the second boundary may be spaced apart from the first boundary with the boundary being interposed therebetween. Each of the first boundary and the second boundary may be a divided driving boundary-line. The first driver chip may output a plurality of transmit signals to the first plurality of first electrodes in a symmetrical manner about the first boundary. The second driver chip may output a plurality of transmit signals to the second plurality of first electrodes in a symmetrical manner about the second boundary.

The first driver chip may simultaneously output a plurality of first boundary transmit signals to a plurality of first boundary electrodes disposed in a first boundary area including the first boundary among the first plurality of first electrodes. The second driver chip may simultaneously output a plurality of second boundary transmit signals to a plurality of second boundary electrodes disposed in a second boundary area including the second boundary among the second plurality of first electrodes.

The sensor may further include a plurality of first trace lines electrically connected to the plurality of first electrodes, respectively, and a plurality of second trace lines electrically connected to the plurality of second electrodes, respectively. The plurality of second electrodes and the plurality of second trace lines may be respectively electrically connected to each other via a plurality of contacts. The plurality of second trace lines and the plurality of contacts may at least partially overlap the sensing area.

The plurality of contacts may include a plurality of first contacts arranged according to a first rule and a plurality of second contacts arranged according to a second rule that is different from the first rule. The plurality of first contacts and the plurality of second contacts may be spaced apart from each other with the boundary being disposed therebetween.

A first arrangement direction of the plurality of first contacts may have a negative slope, while a second arrangement direction of the plurality of second contacts may have a positive slope.

The plurality of first contacts and the plurality of second contacts may be arranged in a substantially symmetrical manner with respect to each other about the boundary.

In a view of the device in the first direction, the plurality of first contacts and the plurality of second contacts might not overlap each other.

A slope of a first arrangement direction of the plurality of first contacts may be different from a slope of a second arrangement direction of the plurality of second contacts.

A plurality of groups may be defined. Each of the plurality of groups may include one or more first electrodes among the plurality of first electrodes, the sensor driver may simultaneously output a plurality of transmit signals to the first electrodes included in each of the plurality of groups.

One group of the plurality of groups may include the plurality of boundary electrodes.

A center in the first direction of the one group and the boundary may at least partially overlap each other.

A center in the first direction of the one group and the boundary might not overlap each other.

A plurality of boundary groups among the plurality of groups may at least partially overlap the boundary. The plurality of boundary groups may partially overlap each other.

Lengths of some of the second trace lines overlapping the sensing area may be substantially equal to each other.

Lengths of some of the second trace lines overlapping the sensing area may be different from each other.

Some of the second trace lines may at least partially overlap the sensing area. Lengths of some of said some second traces may be equal to each other. Lengths of the others of said some second traces may be different from each other.

A plurality of groups may be defined. Each of the plurality of groups may include one or more first electrodes among the plurality of first electrodes. The sensor driver may simultaneously output a plurality of transmit signals to the first electrodes included in each of the plurality of groups. A number of the first electrodes included in each of the plurality of groups may vary based on an operation mode of the sensor.

An electronic device includes a sensing area, a peripheral area proximate to the sensing area, a plurality of transmit groups arranged along a first direction and disposed in the sensing area each of the transmit groups may include one or more first electrodes, and a receive group including a plurality of second electrodes disposed in the sensing area and arranged along a second direction intersecting the first direction. A transmit signal is simultaneously provided to the one or more first electrodes included in each of the plurality of transmit groups. A boundary extending along the second direction intersecting the first direction is defined in the sensing area. One transmit group of the plurality of transmit groups at least partially overlaps the boundary.

A number of the one or more first electrodes included in each of the plurality of transmit groups may be variable.

The transmit signal may be sequentially provided to the plurality of transmit groups along the first direction.

Numbers of the one or more first electrodes respectively included in the plurality of transmit groups may be symmetrical with respect to each other about the boundary.

The transmit signal may be sequentially provided to two transmit groups disposed symmetrically about the boundary among the plurality of transmit groups.

The plurality of transmit groups might not overlap with each other.

At least some of the plurality of transmit groups may partially overlap each other.

The plurality of second electrodes may include a plurality of first sub-electrodes arranged along the second direction and a plurality of second sub-electrodes arranged along the second direction. The plurality of first sub-electrodes and the plurality of second sub-electrodes may be spaced apart from each other with the boundary being disposed therebetween. The one transmit group may at least partially overlap the plurality of first sub-electrodes and the plurality of second sub-electrodes.

An electronic device includes a plurality of first electrodes arranged along a first direction, a plurality of second electrodes arranged along a second direction intersecting the first direction, a plurality of first trace lines electrically connected to the plurality of first electrodes, respectively, and a plurality of second trace lines electrically connected to the plurality of second electrodes, respectively. The plurality of second electrodes and the plurality of second trace lines may be respectively electrically connected to each other via a plurality of contacts. A plurality of boundary transmit signals are simultaneously provided to boundary electrodes among the plurality of first electrodes. The boundary electrodes are spaced apart from each other with the boundary being disposed therebetween.

The boundary may be a divided driving boundary-line. A plurality of transmit signals may be provided to the plurality of first electrodes in a symmetrical manner about the boundary.

The plurality of contacts may include a plurality of first contacts arranged according to a first rule and a plurality of second contacts arranged according to a second rule that is different from the first rule. The plurality of first contacts and the plurality of second contacts may be spaced apart from each other with the boundary being disposed therebetween.

BRIEF DESCRIPTION OF THE FIGURES

The above and other objects and features of the present disclosure will become apparent by describing in detail embodiments thereof with reference to the accompanying drawings.

FIG. 7A is a diagram illustrating an operation of a sensor according to an embodiment of the present disclosure.

DETAILED DESCRIPTION

Figure 1:
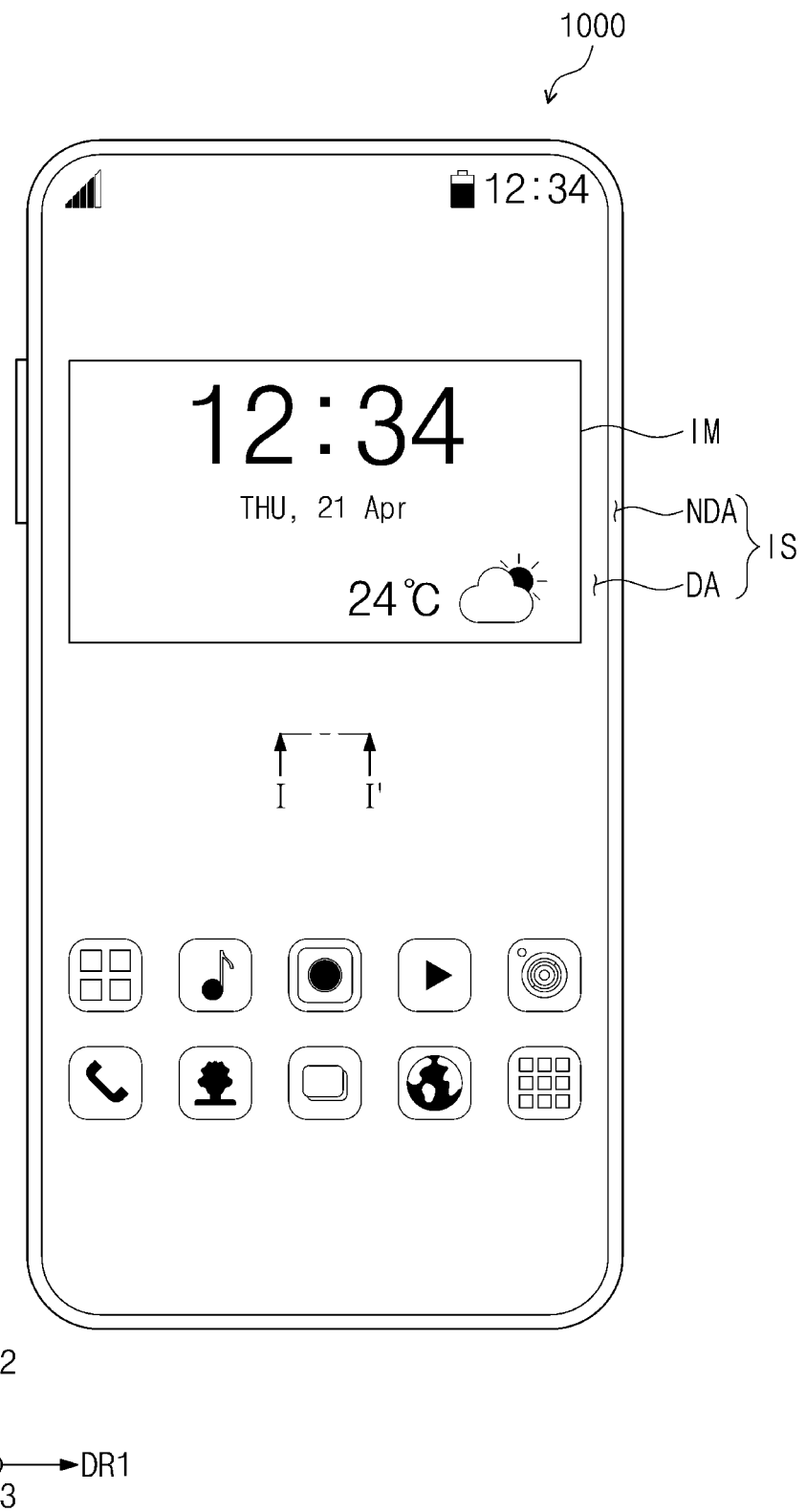
FIG. 1 is a plan view of an electronic device according to an embodiment of the present disclosure.

As used herein, when a component (or a region, a layer, a portion, and the like) is referred to as being "on", "connected to", or "coupled to" another component, it may mean that the component may be disposed/connected/coupled directly on another component or a third component may be disposed between the component and another component.

Like reference numerals may refer to like components throughout the specification and the drawings. In addition, in the drawings, thicknesses, ratios, and dimensions of components may be exaggerated for effective description of technical content. As used herein, "and/or" includes all of one or more combinations that the associated components may define.

Terms such as first, second, and the like may be used to describe various components, but the components should not necessarily be limited by the terms. The above terms are used for the purpose of distinguishing one component from another. For example, without departing from the scope of the present disclosure, a first component may be named as a second component, and similarly, the second component may also be named as the first component. The singular expression includes the plural expression unless the context clearly dictates otherwise.

In addition, terms such as "beneath", "below", "on", "above" are used to describe the relationship of the components illustrated in the drawings. The above terms are relative concepts, and are described with reference to directions indicated in the drawings.

It should be understood that terms such as "include" or "have" are intended to specify that a feature, a number, a step, an operation, a component, a part, or a combination thereof described in the specification is present, and do not preclude a possibility of addition or existence of one or more other features or numbers, steps, operations, components, parts, or combinations thereof.

Hereinafter, embodiments of the present disclosure will be described with reference to drawings.

FIG. 1 is a plan view of an electronic device 1000 according to an embodiment of the present disclosure.

Referring to FIG. 1, the electronic device 1000 may be a device that is activated according to an electrical signal. The electronic device 1000 may be applied to electronic devices such as mobile phones, tablets, smart watches, notebooks, computers, and smart televisions. FIG. 1 shows one example in which the electronic device 1000 is applied to the mobile phone (e.g., smartphone).

The electronic device 1000 may display an image IM on a display surface IS parallel to each of a first direction DR1 and a second direction DR2. The display surface IS on which the image IM is displayed may correspond to a front face of the electronic device 1000. The image IM may include a still image as well as a moving image (e.g., video). A normal direction to the display face IS, for example, a thickness direction of the electronic device 1000 is indicated by a third direction DR3. A front face (or a top face) and a rear face (or a bottom face) of each of layers or units as described below are distinguished from each other based on the third direction DR3.

The display surface IS of the electronic device 1000 may be divided into a display area DA and a non-display area NDA. The display area DA may be an area where the image IM is displayed. A user recognizes the image IM through the display area DA. In this embodiment, the display area DA is illustrated as having a quadrangular shape with rounded corners. However, this is an example, and the display area DA may have various shapes. The present disclosure is not necessarily limited to a single embodiment.

The non-display area NDA is proximate to the display area DA. The non-display area NDA may have a predetermined color. The non-display area NDA may at least partially surround the display area DA. Accordingly, a shape of the display area DA may be substantially defined by the non-display area NDA. However, this is an example, and the non-display area NDA may be disposed proximate to only one side of the display area DA or may be omitted or otherwise disposed in a manner that is not observable from a front plan view. The electronic device 1000, according to an embodiment of the present disclosure, may include various embodiments, and the present disclosure is not necessarily limited to a single embodiment.

Figure 2:
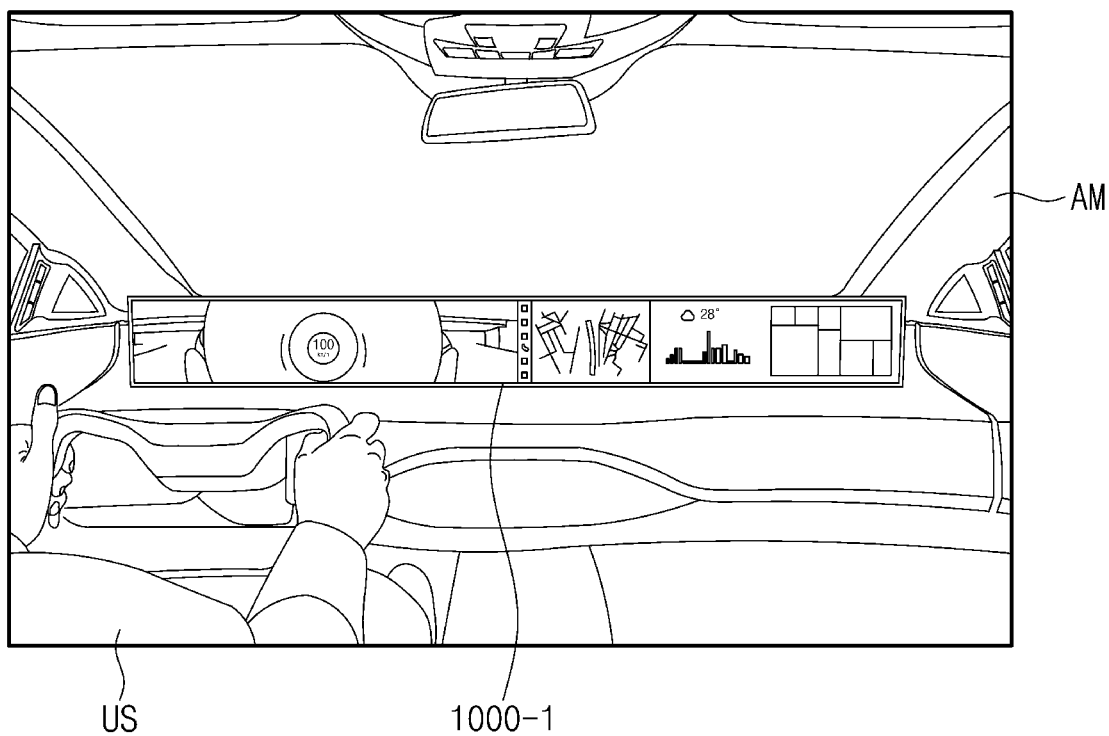
FIG. 2 is a view showing an inside of a vehicle in which an electronic device according to an embodiment of the present disclosure is disposed.

FIG. 2 is a diagram showing an inside of a vehicle in which an electronic device 1000-1 according to an embodiment of the present disclosure is disposed.

Referring to FIG. 2, the electronic device 1000-1 may be disposed inside a vehicle AM. In FIG. 2, an example is illustrated in which one electronic device 1000-1 is disposed inside the vehicle AM. However, the present disclosure is not necessarily particularly limited thereto. For example, a plurality of electronic devices may be disposed inside the vehicle AM. In this case, the plurality of electronic devices may include an electronic device disposed in front of a driver US and an electronic device facing a passenger seat.

The electronic device 1000-1 may display an image necessary for the driver US to drive the vehicle. For example, the electronic device 1000-1 may display speed information, vehicle state information, vehicle internal-component manipulation information, and/or navigation information. Further, the electronic device 1000-1 may display not only the information necessary for the driving, but also various information not related to the driving. In this regard, the electronic device 1000-1 may constitute an instrument cluster and/or a infotainment unit.

As the electronic device 1000-1 is applied to various products (e.g., a vehicle), a screen ratio (e.g., an aspect ratio) of the electronic device 1000-1 may also vary.

Figure 3A:
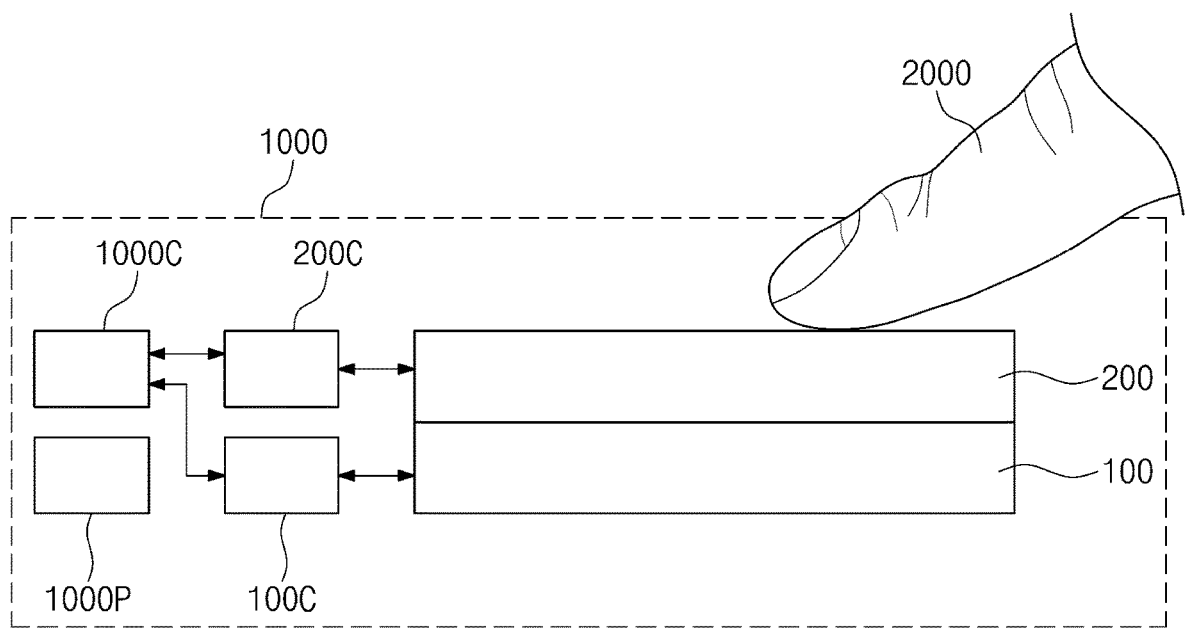
FIG. 3A is a block diagram illustrating a use example of an electronic device according to an embodiment of the present disclosure.

FIG. 3A is a block diagram illustrating a use example of the electronic device 1000 according to an embodiment of the present disclosure.

Referring to FIG. 3A, the electronic device 1000 may include a display layer 100, a sensor 200, a display driver 100C, a sensor driver 200C, a main driver 1000C, and a power circuit 1000P.

The display layer 100 may be a component that generates an image. The display layer 100 may be a light emitting display layer. For example, the display layer 100 may include an organic light-emitting display layer, an inorganic light-emitting display layer, an organic-inorganic light-emitting display layer, a quantum dot display layer, a micro LED display layer or a nano LED display layer.

The sensor 200 may be disposed on the display layer 100. The sensor 200 may detect an external input. The sensor 200 may be an integrated sensor with the display layer 100. In this case, the sensor 200 and the display layer 100 may be continuously formed during a manufacturing process of the display layer 100. Alternatively, the sensor 200 may be an external sensor attached to the display layer 100.

The main driver 1000C may control overall operations of the electronic device 1000. For example, the main driver 1000C may control an operation of each of the display driver 100C and the sensor driver 200C. The main driver 1000C may include at least one microprocessor, and the main driver 1000C may be referred to as a host. The main driver 1000C may further include a graphic controller.

The display driver 100C may drive the display layer 100. The display driver 100C may receive image data and a control signal from the main driver 1000C. The control signal may include various signals. For example, the control signal may include an input vertical synchronization signal, an input horizontal synchronization signal, a main clock, and a data enable signal.

The sensor driver 200C may drive the sensor 200. The sensor driver 200C may receive a control signal from the main driver 1000C. The control signal may include a clock signal of the sensor driver 200C.

The power circuit 1000P may include a power management integrated circuit (PMIC). The power circuit 1000P may generate a plurality of driving voltages for driving the display layer 100, the sensor 200, the display driver 100C, and the sensor driver 200C. For example, the plurality of driving voltages may include a gate high voltage, a gate low voltage, an ELVSS voltage, an ELVDD voltage, an initialization voltage, and the like. However, the present disclosure is not necessarily particularly limited to the above example.

The electronic device 1000 may detect external inputs. For example, the electronic device 1000 may detect a passive input by a touch 2000. The touch 2000 may include all input means that may provide change in capacitance, such as the user's body and an input device (such as a stylus pen).

Figure 3B:
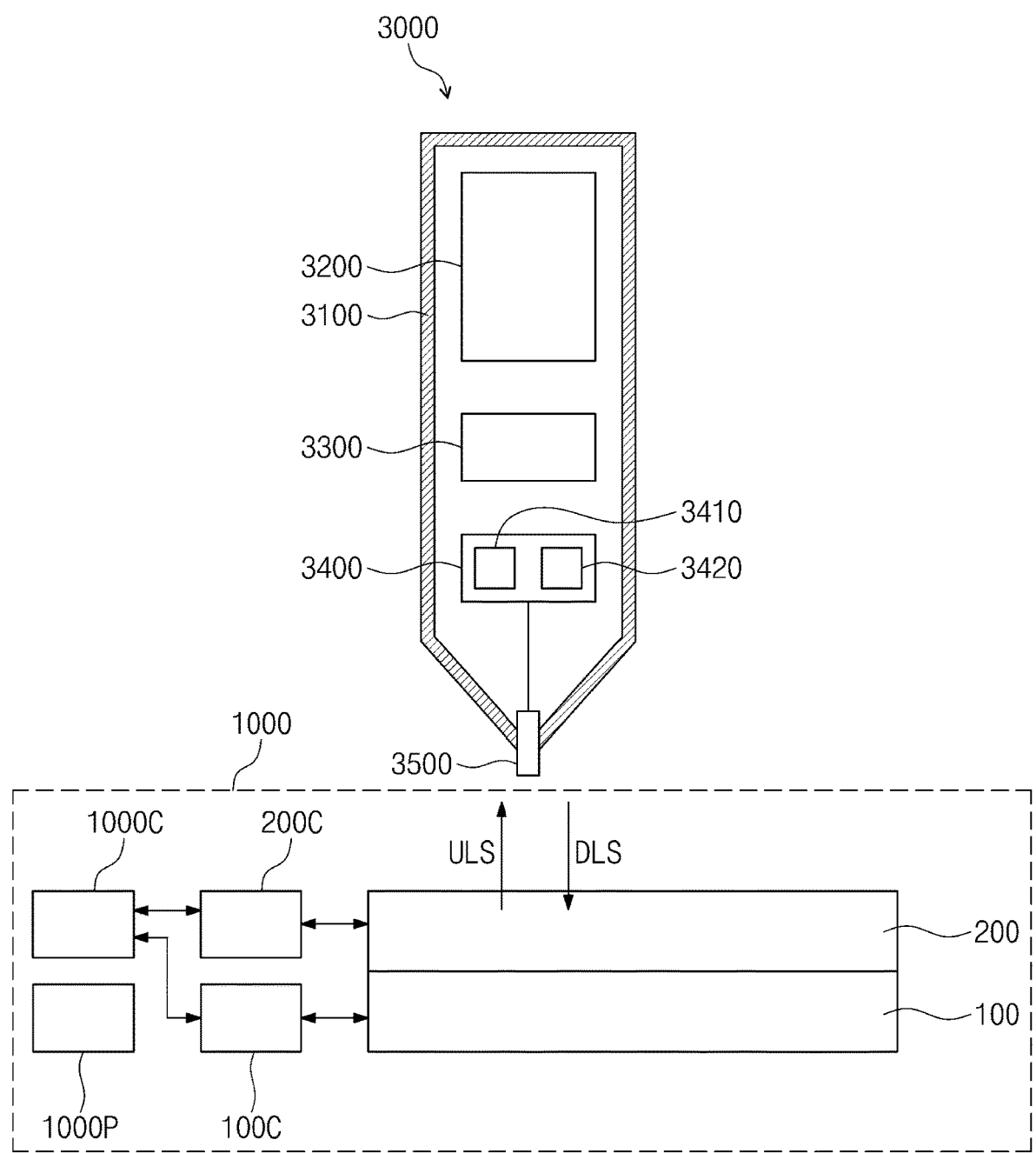
FIG. 3B is a block diagram illustrating a use example of an electronic device according to an embodiment of the present disclosure.

FIG. 3B is a block diagram illustrating a use example of the electronic device 1000 according to an embodiment of the present disclosure.

Referring to FIG. 3B, the electronic device 1000 may detect both an active input by an input device 3000 and the passive input by the touch 2000 (refer to FIG. 3A).

The electronic device 1000 and the input device 3000 may communicate with each other in a bi-directional manner. The sensor 200 of the electronic device 1000 may provide an uplink signal ULS to the input device 3000. For example, the uplink signal ULS may include a synchronization signal or information of the electronic device 1000. However, the present disclosure is not necessarily particularly limited thereto.

The input device 3000 may provide a downlink signal DLS to the electronic device 1000. The downlink signal DLS may include a synchronization signal or state information of the input device 3000. For example, the downlink signal DLS may include coordinate information of the input device 3000, battery information of the input device 3000, angle information of the input device, and/or various information stored in the input device 3000. However, the present disclosure is not necessarily particularly limited thereto.

The input device 3000 may include a housing 3100, a power supply 3200, a controller 3300, a communication module 3400, and a pen tip 3500. However, components constituting the input device 3000 are not necessarily limited to the components as listed above. For example, the input device 3000 may further include an electrode switch for switching to a signal transmission mode or a signal reception mode, a pressure sensor for detecting a pressure, a memory for storing therein predetermined information, or a rotation sensor for detecting a rotation.

The housing 3100 may have a pen shape, and an accommodation space may be formed therein. The power supply 3200, the controller 3300, the communication module 3400, and the pen tip 3500 may be accommodated in the accommodation space defined inside the housing 3100.

The power supply 3200 may supply power to the controller 3300, the communication module 3400, and etc. inside the input device 3000. The power supply 3200 may include a battery and/or a high capacity capacitor.

The controller 3300 may control an operation of the input device 3000. The controller 3300 may be embodied as an ASIC (an application-specific integrated circuit). The controller 3300 may be configured to operate according to a designed program.

The communication module 3400 may include a transmission circuit 3410 and a reception circuit 3420. The transmission circuit 3410 may output the downlink signal DLS to the sensor 200. The reception circuit 3420 may receive the uplink signal ULS provided from the sensor 200. The transmission circuit 3410 may receive a signal provided from the controller 3300 and modulate the same into a signal that may be sensed by the sensor 200. The reception circuit 3420 may modulate a signal provided from the sensor 200 into a signal that may be processed by the controller 3300.

The pen tip 3500 may be electrically connected to the communication module 3400. A portion of the pen tip 3500 may protrude out of the housing 3100. Alternatively, the input device 3000 may further include a cover housing that covers a portion of the pen tip 3500 exposed out of the housing 3100. Alternatively, the pen tip 3500 may be embedded inside the housing 3100.

Figure 4:
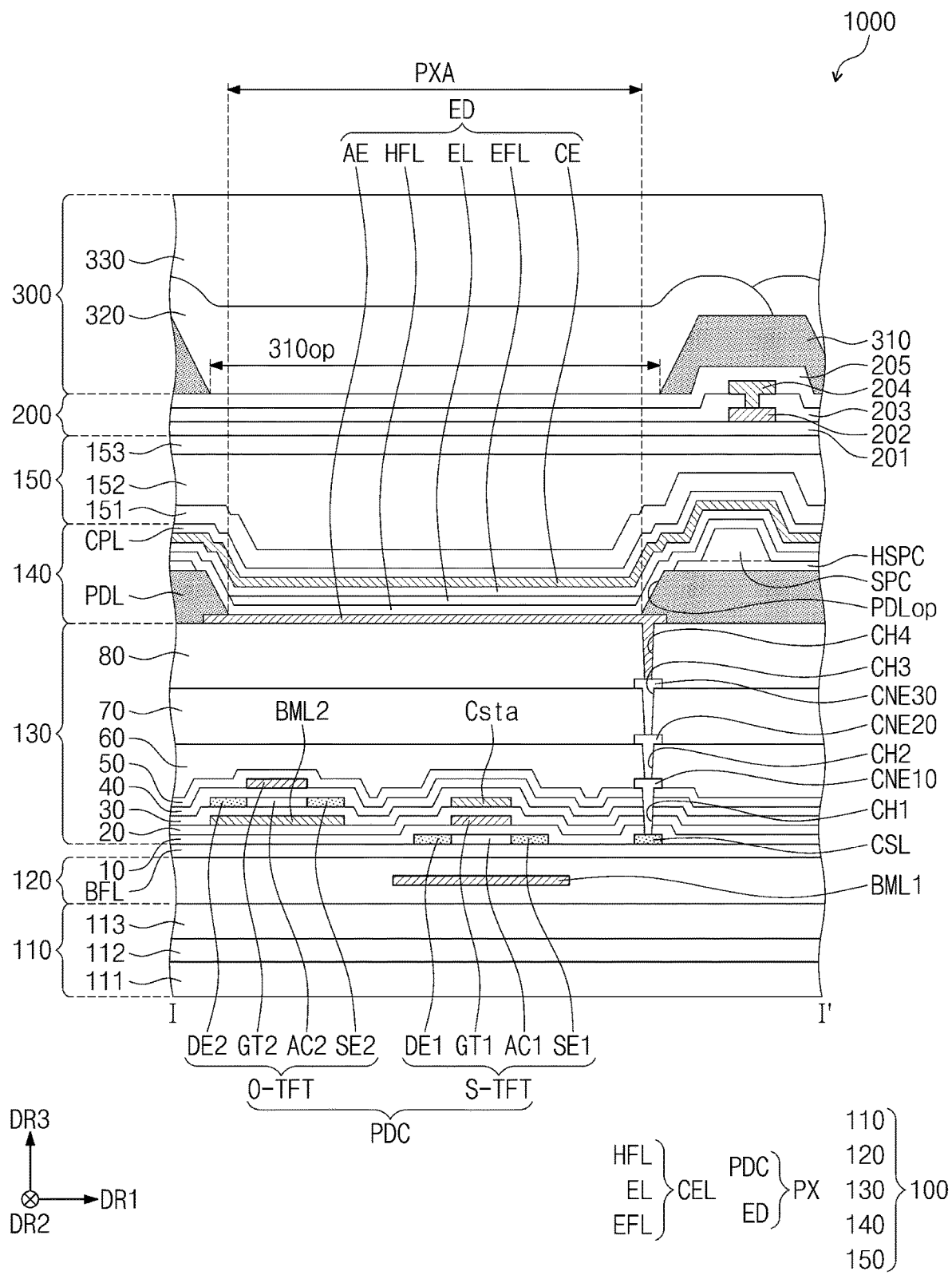
FIG. 4 is a cross-sectional view of an electronic device according to an embodiment of the present disclosure.

FIG. 4 is a cross-sectional view of the electronic device 1000 according to an embodiment of the present disclosure. For example, FIG. 4 may be a cross-sectional view taken along a line I-I' of FIG. 1.

Referring to FIG. 4, the electronic device 1000 may include the display layer 100, the sensor 200, and an anti-reflective layer 300. The display layer 100 may include a base layer 110, a barrier layer 120, a buffer layer BFL, a circuit layer 130, an element layer 140, and an encapsulation layer 150.

The base layer 110 may have a single-layer or multi-layer structure. For example, the base layer 110 may include first to third sub-base layers 111, 112, and 113. Each of the first sub-base layer 111 and the third sub-base layer 113 may include polyimide-based resin, acrylate-based resin, methacrylate-based resin, polyisoprene-based resin, vinyl-based resin, epoxy-based resin, urethane-based resin, cellulose-based resin, siloxane-based resin, polyamide-based resin, and/or perylene-based resin. As used herein, "A-based resin" means a resin including a functional group of "A". For example, each of the first sub-base layer 111 and the third sub-base layer 113 may include polyimide.

The second sub-base layer 112 may have a single-layer or multi-layer structure. For example, the second sub-base layer 112 may include an inorganic material, and may include silicon oxide, silicon nitride, silicon oxynitride, and/or amorphous silicon. For example, the second sub-base layer 112 may include silicon oxynitride and silicon oxide stacked thereon.

The barrier layer 120 may be disposed on the base layer 110. The barrier layer 120 may have a single-layer or multi-layer structure. The barrier layer 120 may include silicon oxide, silicon nitride, silicon oxynitride, and/or amorphous silicon.

The barrier layer 120 may further include a first lower light-blocking layer BML1. For example, when the barrier layer 120 has the multi-layer structure, the first lower light-blocking layer BML1 may be disposed between layers constituting the barrier layer 120. However, the present disclosure is not necessarily limited thereto, and the first lower light-blocking layer BML1 may be disposed between the base layer 110 and the barrier layer 120 or disposed on the barrier layer 120. In an embodiment, the first lower light-blocking layer BML1 may be omitted. The first lower light-blocking layer BML1 may be referred to as a first lower layer, a first lower metal layer, a first lower electrode layer, a first lower shielding layer, a first light-blocking layer, a first metal layer, a first shielding layer, or a first overlap layer.

The buffer layer BFL may be disposed on the barrier layer 120. The buffer layer BFL may prevent diffusion of metal atoms or impurities from the base layer 110 to a first semiconductor pattern. Further, the buffer layer BFL may adjust a heat supply rate during a crystallization process for forming the first semiconductor pattern so that the first semiconductor pattern is uniformly formed.

The buffer layer BFL may include a plurality of inorganic layers. For example, the buffer layer BFL may include a first sub-buffer layer including silicon nitride and a second sub-buffer layer disposed on the first sub-buffer layer and including silicon oxide.

The circuit layer 130 may be disposed on the buffer layer BFL, and the element layer 140 may be disposed on the circuit layer 130. A pixel PX may include a pixel circuit PDC and a light-emitting element ED electrically connected to the pixel circuit PDC. The pixel circuit PDC may be included in the circuit layer 130, and the light-emitting element ED may be included in the element layer 140.

FIG. 4 shows a silicon thin-film transistor S-TFT and an oxide thin-film transistor O-TFT of the pixel circuit PDC by way of example. However, each of the transistors constituting the pixel circuit PDC may be silicon thin-film transistors S-TFTs or oxide thin-film transistors O-TFTs.

The first semiconductor pattern may be disposed on the buffer layer BFL. The first semiconductor pattern may include silicon semiconductor. For example, the silicon semiconductor may include amorphous silicon, polycrystalline silicon, or the like. For example, the first semiconductor pattern may include low-temperature polysilicon.

FIG. 4 shows a portion of the first semiconductor pattern disposed on the buffer layer BFL. The first semiconductor pattern may be further disposed in another area. The first semiconductor patterns may be arranged across pixels according to a specific rule. The first semiconductor pattern may have electrical properties varying depending on whether the first semiconductor pattern is or is not doped with a dopant. The first semiconductor pattern may include a first area with comparatively high conductivity and a second area with comparatively low conductivity. The first area may be doped with an N-type dopant or a P-type dopant. A P-type transistor may include a doped area doped with a P-type dopant, and an N-type transistor may include a doped area doped with an N-type dopant. The second area may be a non-doped area or an area doped with a dopant at a lower concentration than that of the first area.

Conductivity of the first area may be greater than that of the second area, and the first area may serve as an electrode or signal line. The second area may act as an active area or a channel of the transistor. For example, a portion of the semiconductor pattern may be an active area of a transistor, another portion thereof may be a source or a drain of a transistor, and still another portion thereof may be a connection electrode or a connection signal line.

A source area SE1, an active area AC1, and a drain area DE1 of the silicon thin-film transistor S-TFT may be formed from the first semiconductor pattern. The source area SE1 and the drain area DE1 may respectively extend in opposite directions to each other from the active area AC1 in a cross-sectional view.

FIG. 4 shows a portion of a connection signal line CSL formed from the first semiconductor pattern.

The circuit layer 130 may include a plurality of inorganic layers and a plurality of organic layers. In an embodiment, first to fifth insulating layers 10, 20, 30, 40, and 50 sequentially stacked on the buffer layer BFL may be inorganic layers, and sixth to eighth insulating layers 60, 70, and 80 sequentially stacked thereon may be organic layers.

A first insulating layer 10 may be disposed on the buffer layer BFL. The first insulating layer 10 may cover the first semiconductor pattern. The first insulating layer 10 may be an inorganic layer and/or an organic layer, and may have a single-layer or multi-layer structure. The first insulating layer 10 may include aluminum oxide, titanium oxide, silicon oxide, silicon nitride, silicon oxynitride, zirconium oxide, and/or hafnium oxide. In this embodiment, the first insulating layer 10 may be a single layer made of silicon oxide. Not only the first insulating layer 10 but also an insulating layer of the circuit layer 130, to be described later, may have a single-layer or multi-layer structure.

A gate electrode GT1 of the silicon thin-film transistor S-TFT is disposed on the first insulating layer 10. The gate electrode GT1 may be a portion of a metal pattern. The gate electrode GT1 at least partially overlaps the active area AC. In a process of doping the first semiconductor pattern with a dopant, the gate electrode GT1 may function as a mask. The gate electrode GT1 may include titanium, silver, alloy containing silver, molybdenum, alloy containing molybdenum, aluminum, alloy containing aluminum, aluminum nitride, tungsten, tungsten nitride, copper, indium tin oxide, or indium zinc oxide, etc. However, the present disclosure is not necessarily particularly limited thereto.

The second insulating layer 20 is disposed on the first insulating layer 10 and may cover the gate electrode GT1. The second insulating layer 20 may be an inorganic layer and may have a single-layer or multi-layer structure. The second insulating layer 20 may include silicon oxide, silicon nitride, and/or silicon oxynitride. In this embodiment, the second insulating layer 20 may have a single layer structure including a silicon nitride layer.

The third insulating layer 30 may be disposed on the second insulating layer 20. The third insulating layer 30 may be an inorganic layer and may have a single-layer or multi-layer structure. For example, the third insulating layer 30 may have a multi-layer structure including a silicon oxide layer and a silicon nitride layer. One electrode Csta of a capacitor may be disposed between the second insulating layer 20 and the third insulating layer 30. Further, the other electrode of the capacitor may be disposed between the first insulating layer 10 and the second insulating layer 20.

A second semiconductor pattern may be disposed on the third insulating layer 30. The second semiconductor pattern may include oxide semiconductor. The oxide semiconductor may include a plurality of areas distinguished from each other based on whether a metal oxide is or is not reduced. An area (hereinafter referred to as a reduced area) in which the metal oxide is reduced has higher conductivity than that of an area (hereinafter referred to as a non-reduced area) in which the metal oxide is reduced. The reduced area acts as a source/drain or a signal line of the transistor. The non-reduced area acts as an active area (or a semiconductor area or a channel) of the transistor. For example, a portion of the second semiconductor pattern may be the active area of the transistor, another portion thereof may be the source/drain area of the transistor, and still another portion thereof may be a signal transfer area.

A source area SE2, an active area AC2, and a drain area DE2 of the oxide thin-film transistor O-TFT may be formed from the second semiconductor pattern. The source area SE2 and the drain area DE2 may extend in opposite directions to each other from the active area AC2 in a cross-sectional view.

The fourth insulating layer 40 may be disposed on the third insulating layer 30. The fourth insulating layer 40 may cover the second semiconductor pattern. The fourth insulating layer 40 may be an inorganic layer and may have a single-layer or multi-layer structure. The fourth insulating layer 40 may include aluminum oxide, titanium oxide, silicon oxide, silicon nitride, silicon oxynitride, zirconium oxide, and/or hafnium oxide. In this embodiment, the fourth insulating layer 40 may have a single layer structure including silicon oxide.

A gate electrode GT2 of the oxide thin-film transistor O-TFT is disposed on the fourth insulating layer 40. The gate electrode GT2 may be a portion of a metal pattern. The gate electrode GT2 at least partially overlaps the active area AC2. In a process of reducing the second semiconductor pattern, the gate electrode GT2 may function as a mask.

A second lower light-blocking layer BML2 may be disposed below the oxide thin-film transistor O-TFT. The second lower light-blocking layer BML2 may be disposed between the second insulating layer 20 and the third insulating layer 30. The second lower light-blocking layer BML2 includes the same material as that of one electrode Csta constituting the capacitor. The second lower light-blocking layer BML2 and one electrode Csta constituting the capacitor may be formed in the same process.

The fifth insulating layer 50 is disposed on the fourth insulating layer 40 and may cover the gate electrode GT2. The fifth insulating layer 50 may be an inorganic layer and/or an organic layer, and may have a single-layer or multi-layer structure. For example, the fifth insulating layer 50 may have a multi-layer structure including a silicon oxide layer and a silicon nitride layer.

A first connection electrode CNE10 may be disposed on the fifth insulating layer 50. The first connection electrode CNE10 may be electrically connected to the connection signal line CSL via a first contact hole CH1 extending through the first to fifth insulating layers 10, 20, 30, 40, and 50.

The sixth insulating layer 60 may be disposed on the fifth insulating layer 50. A second connection electrode CNE20 may be disposed on the sixth insulating layer 60. The second connection electrode CNE20 may be electrically connected to the first connection electrode CNE10 via a second contact hole CH2 extending through the sixth insulating layer 60.

The seventh insulating layer 70 may be disposed on the sixth insulating layer 60 and may cover the second connection electrode CNE20.

A third connection electrode CNE30 may be disposed on the seventh insulating layer 70. The third connection electrode CNE30 may be electrically connected to the second connection electrode CNE20 via a third contact hole CH3 extending through the seventh insulating layer 70. The eighth insulating layer 80 may be disposed on the seventh insulating layer 70 and may cover the third connection electrode CNE30.

Each of the sixth insulating layer 60, the seventh insulating layer 70, and the eighth insulating layer 80 may be an organic layer. For example, each of the sixth insulating layer 60, the seventh insulating layer 70, and the eighth insulating layer 80 may include a general-purpose polymer such as benzocyclobutene (BCB), polyimide, hexamethyldisiloxane (HMDSO), polymethylmethacrylate (PMMA), or polystyrene (PS), polymer derivatives with a phenolic group, acrylic-based polymer, imide-based polymer, aryletherbased polymer, amide-based polymer, fluorine-based polymer, p-xylene-based polymer, vinyl alcohol-based polymer, or blends thereof, etc.

The light-emitting element ED may include a first electrode AE, a first functional layer HFL, a light-emitting layer EL, a second functional layer EFL, and a second electrode CE. The first functional layer HFL, the second functional layer EFL, and the second electrode CE may be common to the pixels PX. The first functional layer HFL, the light-emitting layer EL, and the second functional layer EFL may be collectively referred to as a middle layer CEL. The first electrode AE may be referred to as a pixel electrode or an anode, and the second electrode CE may be referred to as a common electrode or a cathode.

The first electrode AE may be disposed on the eighth insulating layer 80. The first electrode AE may be electrically connected to the third connection electrode CNE30 electrically connected to the pixel circuit PDC via a fourth contact hole CH4 extending through the eighth insulating layer 80.

In an embodiment of the present disclosure, the third connection electrode CNE30 may be omitted. In this case, the first electrode AE may extend through the seventh and eighth insulating layers 70 and 80 so as to be electrically connected to the second connection electrode CNE20. Alternatively, in an embodiment of the present disclosure, the third connection electrode CNE30 and the eighth insulating layer 80 may be omitted. In this case, the first electrode AE may be disposed on the seventh insulating layer 70, and may extend through the seventh insulating layer 70 so as to be electrically connected to the second connection electrode CNE20.

The first electrode AE may be a transmissive electrode, a semi-transmissive electrode or a reflective electrode. In an embodiment, the first electrode AE may include a reflective layer made of silver, magnesium, aluminum, platinum, palladium, gold, nickel, neodymium, iridium, chromium, and/or a compound thereof, and a transparent or a semi-transparent electrode layer formed on the reflective layer. The transparent or semi-transparent electrode layer may include indium tin oxide, indium zinc oxide, indium gallium zinc oxide, zinc oxide or indium oxide, and/or aluminum doped zinc oxide. For example, the first electrode AE may include a multi-layer structure in which an indium tin oxide layer, a silver layer, and an indium tin oxide layer are sequentially stacked.

A pixel defining film PDL may be disposed on the eighth insulating layer 80. The pixel defining film PDL may have a property of absorbing light, and for example, the pixel defining film PDL may have a black color. The pixel defining film PDL may include a black component (e.g., a black coloring agent). The black component may include black dye and black pigment. The black component may include carbon black, a metal such as chromium, or an oxide thereof.

An opening PDLop exposing a portion of the first electrode AE may be defined in the pixel defining film PDL. That is, the pixel defining film PDL may cover an outer portion of the first electrode AE. A light-emitting area PXA may be defined by the pixel defining film PDL.

A spacer HSPC may be disposed on the pixel defining film PDL. A protruding spacer SPC may be disposed on the spacer HSPC. The spacer HSPC and the protruding spacer SPC may have an integral structure with each other and may be made of the same material. For example, the spacer HSPC and the protruding spacer SPC may be formed in the same process using a halftone mask. However, this is only an example and the present disclosure is not necessarily limited thereto. For example, the spacer HSPC and the protruding spacer SPC may include different materials and may be formed using separate processes.

The first functional layer HFL may be disposed on the first electrode AE, the pixel defining film PDL, the spacer HSPC, and the protruding spacer SPC. The first functional layer HFL may include a hole transport layer (HTL), a hole injection layer (HIL), or both a hole transport layer and a hole injection layer. The first functional layer HFL may be disposed throughout the display area.

The light-emitting layer EL may be disposed on the first functional layer HFL, and may be disposed in an area corresponding to the opening PDLop of the pixel defining film PDL. The light-emitting layer EL may include an organic material, an inorganic material, or an organic-inorganic material emitting light of a predetermined color.

The second functional layer EFL may be disposed on the first functional layer HFL and may cover the light-emitting layer EL. The second functional layer EFL may include an electron transport layer (ETL), an electron injection layer (EIL), or both an electron transport layer and an electron injection layer. The second functional layer EFL may be disposed throughout the display area.

The second electrode CE may be disposed on the second functional layer EFL. The second electrode CE may be disposed in the display area.

The element layer 140 may further include a capping layer CPL disposed on the second electrode CE. The capping layer CPL may play a role in increasing light-emitting efficiency under the principle of constructive interference. The capping layer CPL may include, for example, a material having a refractive index of 1.6 or higher with respect to light having a wavelength of 589 nm. The capping layer CPL may be an organic capping layer including an organic material, an inorganic capping layer including an inorganic material, or a composite capping layer including an organic material and an inorganic material. For example, the capping layer may include a carbocyclic compound, a heterocyclic compound, an amine group-containing compound, porphine derivatives, phthalocyanine derivatives, naphthalocyanine derivatives, alkali metal complexes, alkaline earth metal complexes, or any combination thereof. Optionally, each of the carbocyclic compound, the heterocyclic compound and the amine group-containing compound may be substituted with a substituent including oxygen (O), nitrogen (N), sulfur (S), selenium (Se), silicon (Si), fluorine (F), chlorine (Cl), bromine (Br), iodine (I), or any combination thereof.

The encapsulation layer 150 may be disposed on the element layer 140. The encapsulation layer 150 may include a first inorganic encapsulation layer 151, an organic encapsulation layer 152, and a second inorganic encapsulation layer 153 that are sequentially stacked. The first and second inorganic encapsulation layers 151 and 153 may protect the element layer 140 from moisture and oxygen, while the organic encapsulation layer 152 may protect the element layer 140 from foreign materials such as dust particles.

In an embodiment of the present disclosure, a low refractive index layer may be further disposed between the capping layer CPL and the encapsulation layer 150. The low refractive index layer may include lithium fluoride. The low refractive index layer may be formed by thermal evaporation.

The sensor 200 may be disposed on the display layer 100. The sensor 200 may be referred to as a sensor layer, an input sensing layer, or an input sensing panel. The sensor 200 may include a sensor base layer 201, a first sensor conductive layer 202, a sensor insulating layer 203, a second sensor conductive layer 204, and a sensor cover layer 205.

The sensor base layer 201 may be disposed directly on the display layer 100. The sensor base layer 201 may be an inorganic layer including silicon nitride, silicon oxynitride, and/or silicon oxide. Alternatively, the sensor base layer 201 may be an organic layer including an epoxy resin, an acrylic resin, or an imide-based resin. The sensor base layer 201 may have a single-layer structure or a multi-layer structure of layers stacked along the third direction DR3.

Each of the first sensor conductive layer 202 and the second sensor conductive layer 204 may have a single layer structure or may have a multi-layer structure of layers stacked along the third direction DR3.

The conductive layer of the single-layer structure may include a metal layer or a transparent conductive layer. The metal layer may include molybdenum (Mo), silver (Ag), titanium (Ti), copper (Cu), aluminum (Al), or alloys thereof. The transparent conductive layer may include a transparent conductive oxide such as indium tin oxide (ITO), indium zinc oxide (IZO), zinc oxide, and/or indium zinc tin oxide (IZTO). Alternatively, the transparent conductive layer may include a conductive polymer such as poly(3,4-ethylenedioxythiophene) (PEDOT), metal nanowires, and/or graphene.

The conductive layer of the multi-layer structure may include metal layers. The metal layers may have, for example, a 3-layer structure of titanium/aluminum/titanium. The conductive layer of the multi-layer structure may include at least one metal layer and at least one transparent conductive layer.

The sensor insulating layer 203 may be disposed between the first sensor conductive layer 202 and the second sensor conductive layer 204. The sensor insulating layer 203 may include an inorganic film. The inorganic layer may include aluminum oxide, titanium oxide, silicon oxide, silicon nitride, silicon oxynitride, zirconium oxide, and/or hafnium oxide.

Alternatively, the sensor insulating layer 203 may include an organic film. The organic film may include acrylic-based resin, methacrylic-based resin, polyisoprene, vinyl-based resin, epoxy-based resin, urethane-based resin, cellulose-based resin, siloxane-based resin, polyimide-based resin, polyamide-based resin and/or perylene-based resin.

The sensor cover layer 205 may be disposed on the sensor insulating layer 203 and may cover the second sensor conductive layer 204. The second sensor conductive layer 204 may include a conductive pattern. The sensor cover layer 205 may cover the conductive pattern and may reduce or eliminate a probability that damage to the conductive pattern occurs in a subsequent process. The sensor cover layer 205 may include an inorganic material. For example, the sensor cover layer 205 may include silicon nitride. However, the present disclosure is not necessarily particularly limited thereto. In an embodiment of the present disclosure, the sensor cover layer 205 may be omitted.

The anti-reflective layer 300 may be disposed on the sensor 200. The anti-reflective layer 300 may include a dividing layer 310, a plurality of color filters 320, and a planarization layer 330.

The dividing layer 310 may at least partially overlap the conductive pattern of the second sensor conductive layer 204. The sensor cover layer 205 may be disposed between the dividing layer 310 and the second sensor conductive layer 204. The dividing layer 310 may prevent reflection of external light from the second sensor conductive layer 204. A material constituting the dividing layer 310 is not necessarily particularly limited thereto as long as the material absorbs light. The dividing layer 310 may be a layer having a black color. In an embodiment, the dividing layer 310 may include a block component (e.g., a black coloring agent). The black component may include black dye and/or black pigment. The black component may include carbon black, a metal such as chromium, or an oxide thereof.

A dividing opening 310op may be defined in the dividing layer 310. The dividing opening 310op may at least partially overlap the light-emitting layer EL. The color filter 320 may be disposed in an area corresponding to an area of the dividing opening 310op. The color filter 320 may transmit, therethrough, light provided from the light-emitting layer EL overlapping the color filter 320.

The planarization layer 330 may cover the dividing layer 310 and the color filter 320. The planarization layer 330 may include an organic material. A top face of the planarization layer 330 may be substantially flat. In an embodiment, the planarization layer 330 may be omitted.

In an embodiment of the present disclosure, the anti-reflective layer 300 may include a reflection adjustment layer instead of the color filters 320. For example, in the illustration of FIG. 4, the color filter 320 may be omitted, and the reflection adjustment layer may be added in an area where the color filter 320 is removed. The reflection adjustment layer may selectively absorb a portion of a partial band of light reflected in an inside of the display panel and/or the electronic device or ambient light.

For example, the reflection adjustment layer may absorb light of a first wavelength range of 490 nm to 505 nm and light of a second wavelength range of 585 nm to 600 nm, so that the light transmittance of light in each of the first wavelength area and the second wavelength area may be 40% or lower. The reflection adjustment layer may absorb light of a wavelength out of a wavelength range of red, green, and blue light emitted from the light-emitting layer EL. In this way, the reflection adjustment layer may absorb light of a wavelength that does not belong to the red, green, or blue wavelength range of light emitted from the light-emitting layer EL, thereby preventing or minimizing decrease in luminance of the display panel and/or the electronic device. Further, at the same time, the reflection adjustment layer may prevent or minimize degradation of light-emitting efficiency of the display panel and/or the electronic device, and increase visibility.

The reflection adjustment layer may include an organic layer containing therein a dye, a pigment, or a combination thereof. The reflection adjustment layer may include tetraazaporphyrin (TAP)-based compounds, porphyrin-based compounds, metal porphyrin-based compounds, oxazine-based compounds, squaryllium-based compounds, triarylmethane-based compounds, polymethine-based compounds, anthraquinone-based compounds, phthalocyanine-based compounds, azo-based compounds, perylene-based compounds, xanthene-based compounds, diimmonium-based compounds, dipyrromethene-based compounds, cyanine-based compounds, or combination thereof.

In an embodiment, the reflection adjustment layer may have a transmittance of about 64% to 72%. The transmittance of the reflection adjustment layer may be adjusted based on an amount of the pigment and/or the dye contained in the reflection adjustment layer.

In an embodiment of the present disclosure, the anti-reflective layer 300 may include a phase retarder and/or a polarizer. The anti-reflective layer 300 may include at least a polarization film. In this case, the anti-reflective layer 300 may be attached to the sensor 200 via an adhesive layer.

Figure 5A:
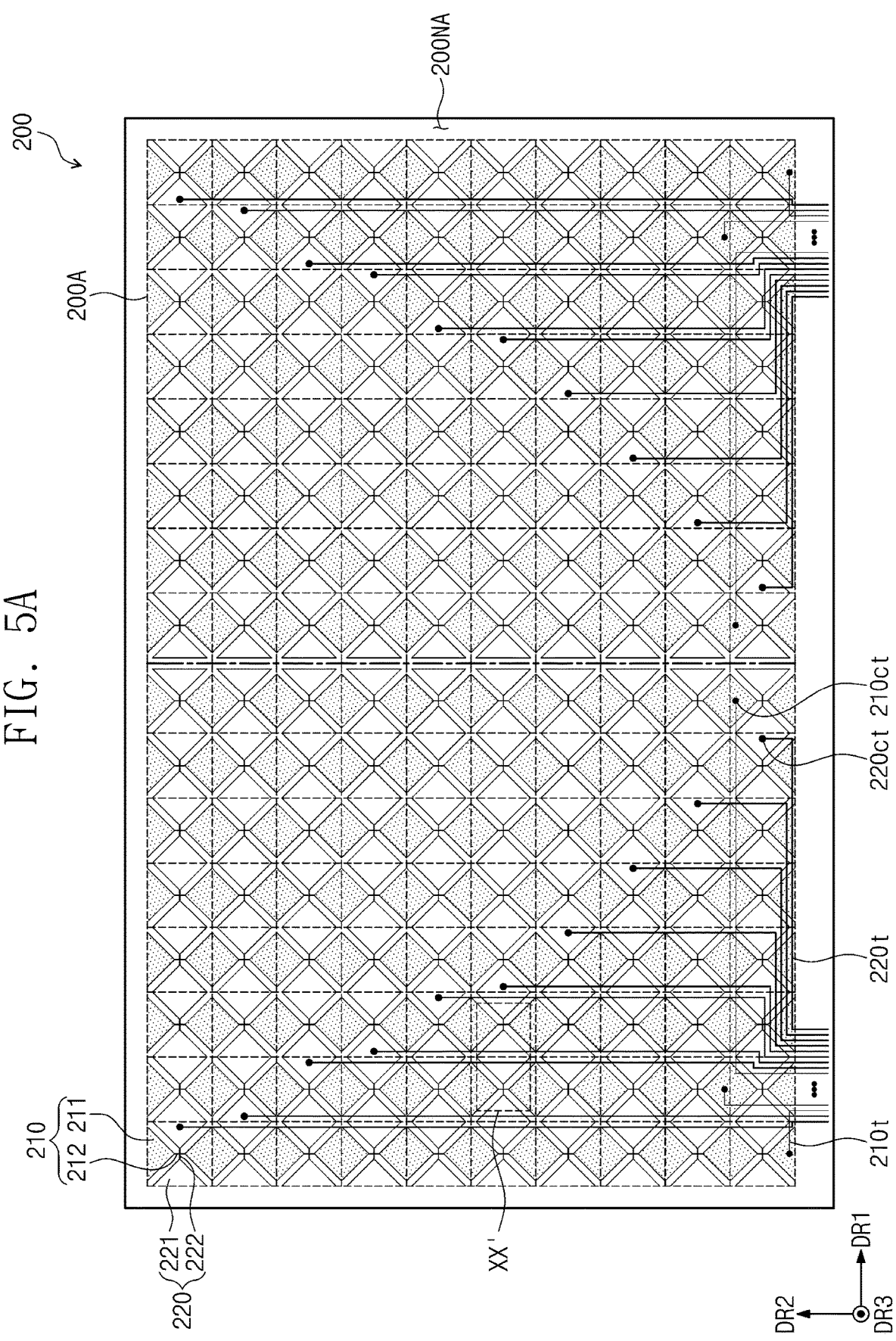
FIG. 5A is a plan view of a sensor according to an embodiment of the present disclosure.
Figure 5B:
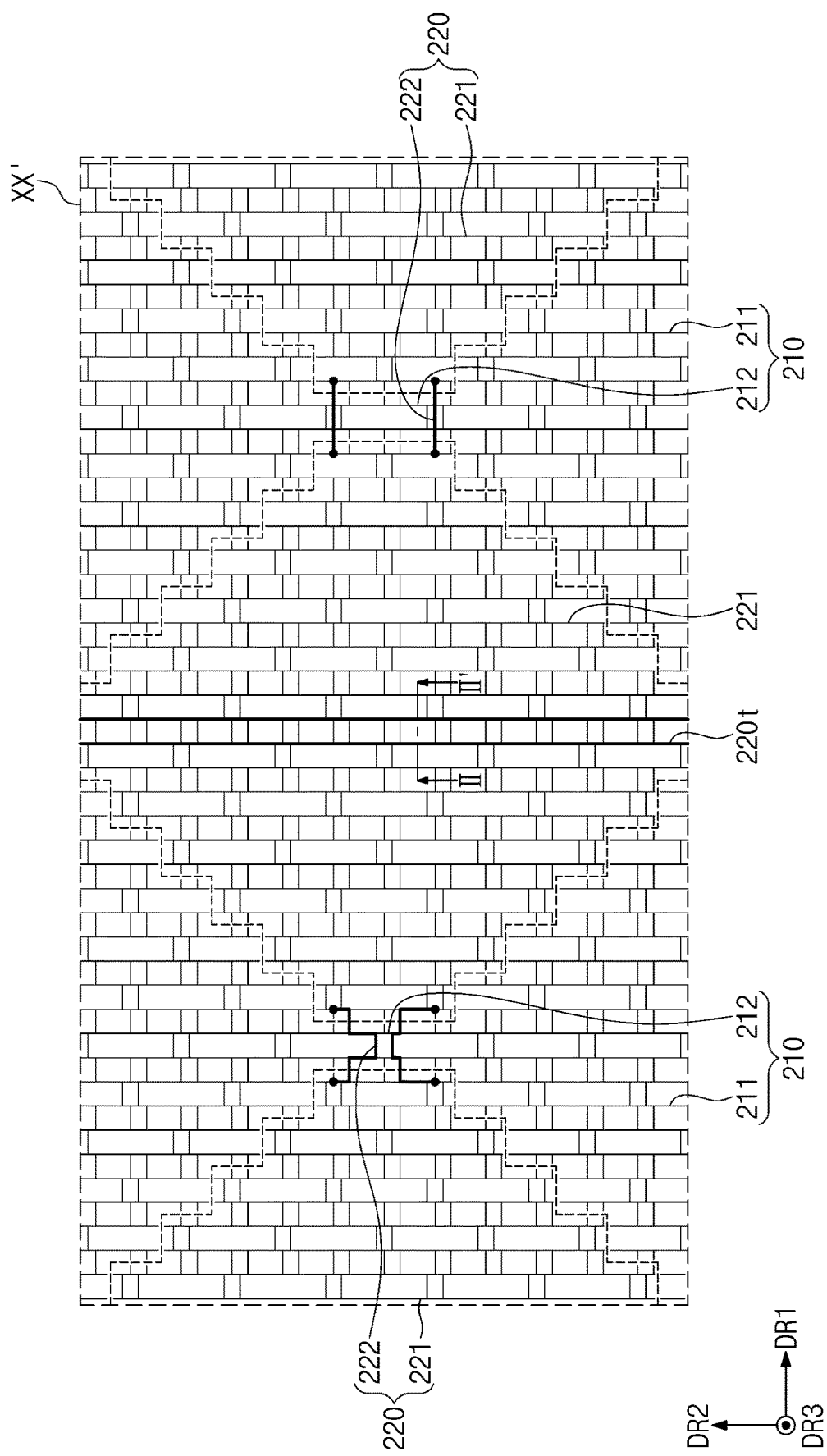
FIG. 5B is an enlarged plan view of an area of XX' area shown in FIG. 5A.
Figure 5C:
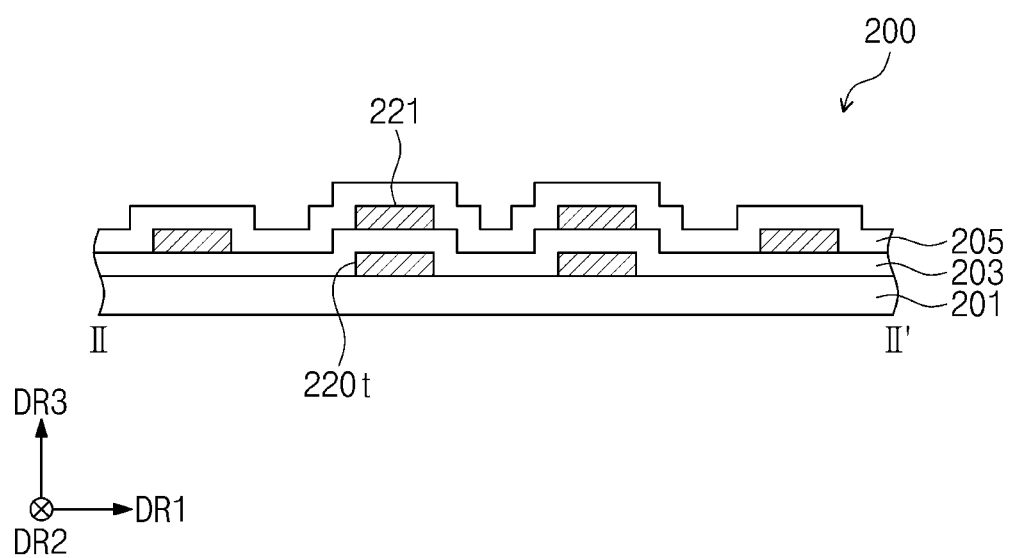
FIG. 5C is a cross-sectional view of a sensor according to an embodiment of the present disclosure.

FIG. 5A is a plan view of the sensor 200 according to an embodiment of the present disclosure. FIG. 5B is an enlarged plan view of an area of XX' area shown in FIG. 5A. FIG. 5C is a cross-sectional view of a sensor according to an embodiment of the present disclosure. For example, FIG. 5C may be a cross-sectional view taken along a line II-II' of FIG. 5B.

Referring to FIGS. 5A and 5B, a sensing area 200A and a peripheral area 200NA proximate to the sensing area 200A may be defined in the sensor 200.

The sensor 200 may include a plurality of first electrodes 210 and a plurality of second electrodes 220 disposed in the sensing area 200A. The first electrodes 210 may be arranged along the first direction DR1, and the second electrodes 220 may be arranged along the second direction DR2 intersecting the first direction DR1. Each of the first electrodes 210 may extend along the second direction DR2, and each of the first electrodes 210 may intersect with the second electrodes 220. Each of the second electrodes 220 may extend along the first direction DR1, and each of the second electrodes 220 may intersect with the first electrodes 210.

Although FIG. 5A illustrates an example in which 16 first electrodes 210 and 10 second electrodes 220 are arranged, each of the number of the first electrodes 210 and the number of the second electrodes 220 is not necessarily particularly limited thereto. For example, based on an aspect ratio of the electronic device 1000 (refer to FIG. 1), each of the number of the first electrodes 210 and the number of the second electrodes 220 may be variously changed.

Each of the first electrodes 210 may include a first portion 211 and a second portion 212. The first portion 211 and the second portion 212 may have an integral structure with each other and may be disposed in the same layer. Each of the second electrodes 220 may include a sensing pattern 221 and a connection pattern 222. Two proximate sensing patterns 221 may be electrically connected to each other via two connection patterns 222. However, the present disclosure is not necessarily particularly limited thereto. The first portion 211 may be referred to as a sensing portion, and the second portion 212 may be referred to as a connection portion. Alternatively, the first portion 211 may be referred to as a first sensing pattern, the second portion 212 may be referred to as a second sensing pattern, the sensing pattern 221 may be referred to as the second sensing pattern, and the connection pattern 222 may be referred to as a second connection pattern.

In an embodiment of the present disclosure, the first portion 211 and the second portion 212 may be disposed in the same layer as a layer in which the sensing pattern 221 is disposed. The sensing pattern 221, the first portion 211, and the second portion 212 may be arranged in a mesh shape. The sensing pattern 221 and the connection patterns 222 may be disposed in different layers. The two connection patterns 222 may be insulated from and may intersect with the second portion 212. The first portion 211, the second portion 212, and the sensing pattern 221 may be included in the second sensor conductive layer 204 as shown in FIG. 4. The connection patterns 222 may be included in the first sensor conductive layer 202 as shown in FIG. 4. However, the present disclosure is not necessarily particularly limited thereto, and the first portion 211, the second portion 212, and the sensing pattern 221 may be included in the first sensor conductive layer 202 as shown in FIG. 4, while the connection patterns 222 may be included in the second sensor conductive layer 204 as shown in FIG. 4.

In an embodiment of the present disclosure, the first portion 211 and the second portion 212 may be disposed in the same layer, while the sensing pattern 221 and the connection patterns 222 may be disposed in the same layer. For example, the first portion 211 and the second portion 212 may be included in the first sensor conductive layer 202 as shown in FIG. 4, while the sensing pattern 221 and the connection patterns 222 may be included in the second sensor conductive layer 204 as shown in FIG. 4. However, the present disclosure is not necessarily particularly limited thereto. The first portion 211 and the second portion 212 may be included in the second sensor conductive layer 204 as shown in FIG. 4, while the sensing pattern 221 and the connection patterns 222 may be included in the first sensor conductive layer 202 as shown in FIG. 4.

The sensor 200 may include a plurality of first trace lines 210t electrically connected to the first electrodes 210, respectively, and a plurality of second trace lines 220t electrically connected to the second electrodes 220, respectively.

In an embodiment of the present disclosure, the second trace lines 220t may extend so as to at least partially overlap the sensing area 200A. For example, the second trace lines 220t might not be disposed in a portion of the peripheral area 200NA proximate to the sensing area 200A in the first direction DR1. Therefore, an area size of the peripheral area 200NA may be reduced. As a result, an area of the display surface IS (refer to FIG. 1) of the electronic device 1000 (refer to FIG. 1) occupied with the non-display area NDA (refer to FIG. 1) may be reduced, and thus a narrow bezel may be implemented.

Further, in an embodiment of the present disclosure, a length of each of the second electrodes 220 may be increased with respect to the screen ratio of the electronic device 1000-1 (refer to FIG. 2), so that a load of each of the second electrodes 220 may be increased. In this case, in order to reduce the load of each of the second electrodes 220, each of the second electrodes 220 may be divided into a plurality of sub-electrodes. For example, when each of the second electrodes 220 is divided into three or more sub-electrodes, the sub-electrodes spaced apart from the peripheral area 200NA may be electrically connected to the second trace lines 220t extending so as to at least partially overlap the sensing area 200A.

The first electrodes 210 and the first trace lines 210t may be respectively electrically connected to each other via a plurality of first contacts 210ct. The second electrodes 220 and the second trace lines 220t may be respectively electrically connected to each other via a plurality of second contacts 220ct. In an embodiment of the present disclosure, both the first contacts 210ct and the second contacts 220ct may at least partially overlap the sensing area 200A. However, the present disclosure is not necessarily particularly limited thereto. For example, the first contacts 210ct may at least partially overlap the peripheral area 200NA.

Referring to FIG. 5B and FIG. 5C, the second trace lines 220t may be disposed in the same layer as a layer in which the connection patterns 222 are disposed. For example, in a plan view in the third direction DR3, the second trace lines 220t might not overlap the first electrodes 210. The second trace lines 220t may at least partially overlap the second electrodes 220, for example, the sensing pattern 221. Accordingly, an effect of signal interference or parasitic capacitance between the first electrodes 210 and the second trace lines 220t may be minimized.

The second trace lines 220t may be disposed in a layer different from a layer in which the sensing pattern 221 is disposed. For example, the second trace lines 220t may be disposed between the sensor base layer 201 and the sensor insulating layer 203, while the sensing pattern 221 may be disposed between the sensor insulating layer 203 and the sensor cover layer 205. However, the present disclosure is not necessarily limited thereto. In an embodiment of the present disclosure, the second trace lines 220t may be disposed between the sensor insulating layer 203 and the sensor cover layer 205, while the sensing pattern 221 may be disposed between the sensor base layer 201 and the sensor insulating layer 203.

Figure 5D:
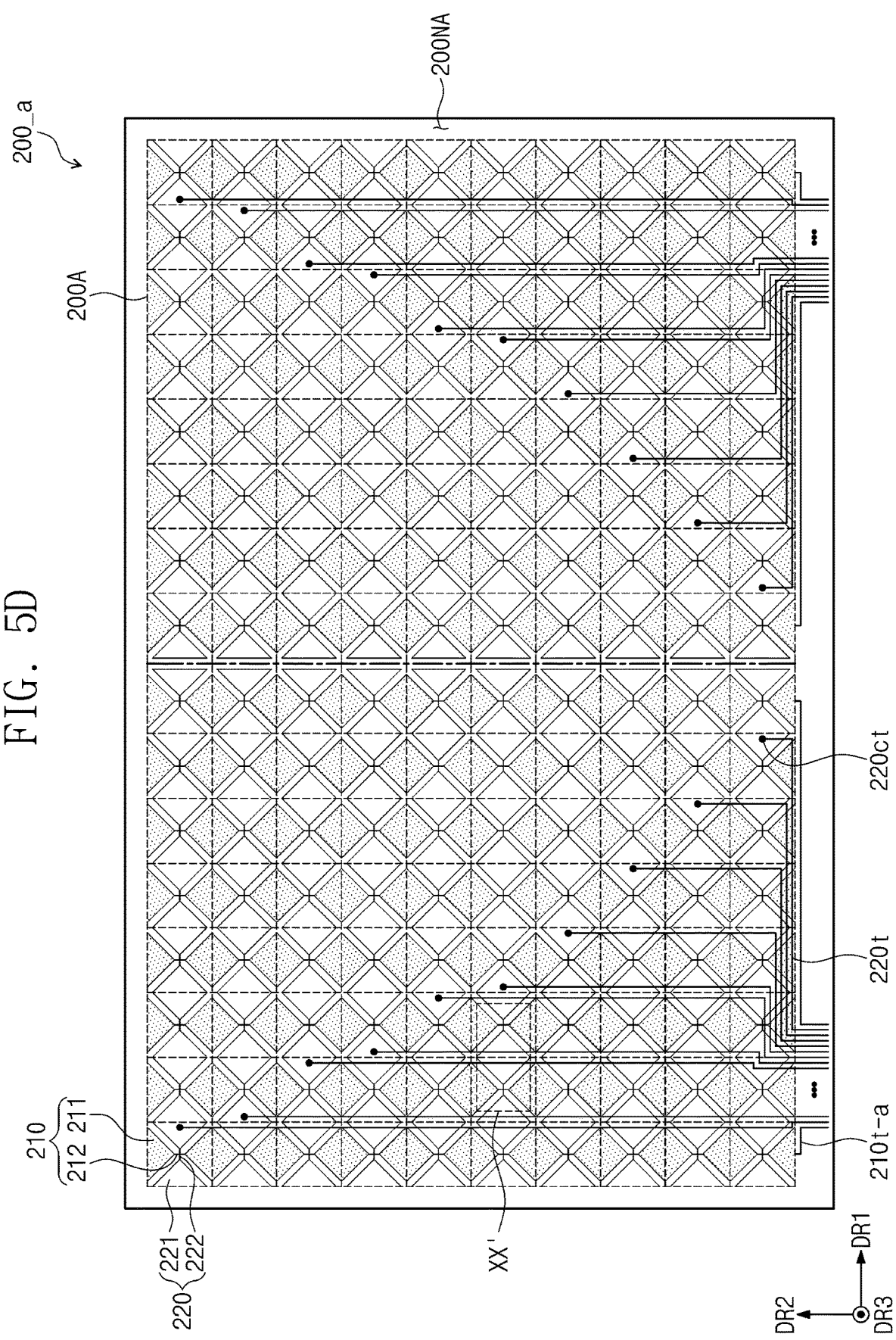
FIG. 5D is a plan view of a sensor according to an embodiment of the present disclosure.

FIG. 5D is a plan view of a sensor 200_a according to an embodiment of the present disclosure. In describing FIG. 5D, the same reference numerals are allocated to the same components as described in FIG. 5A, and to the extent that an element is not described in detail, it may be understood that the detail is at least similar to a corresponding element that has been described elsewhere within the present disclosure.

Referring to FIG. 5D, the sensor 200_a may include the plurality of first electrodes 210, the plurality of second electrodes 220, a plurality of first trace lines 210t-a, and the plurality of second trace lines 220t.

The first electrodes 210, the second electrodes 220, and a portion of each of the second trace lines 220t may be disposed in the sensing area 200A, while the first trace lines 210t-a may be disposed in the peripheral area 200NA. The first electrodes 210 and the first trace lines 210t-a may be respectively electrically connected to each other in the peripheral area 200NA, while the second electrodes 220 and the second trace lines 220t may be respectively electrically connected to each other in the sensing area 200A via the plurality of second contacts 220ct.

Figure 6:
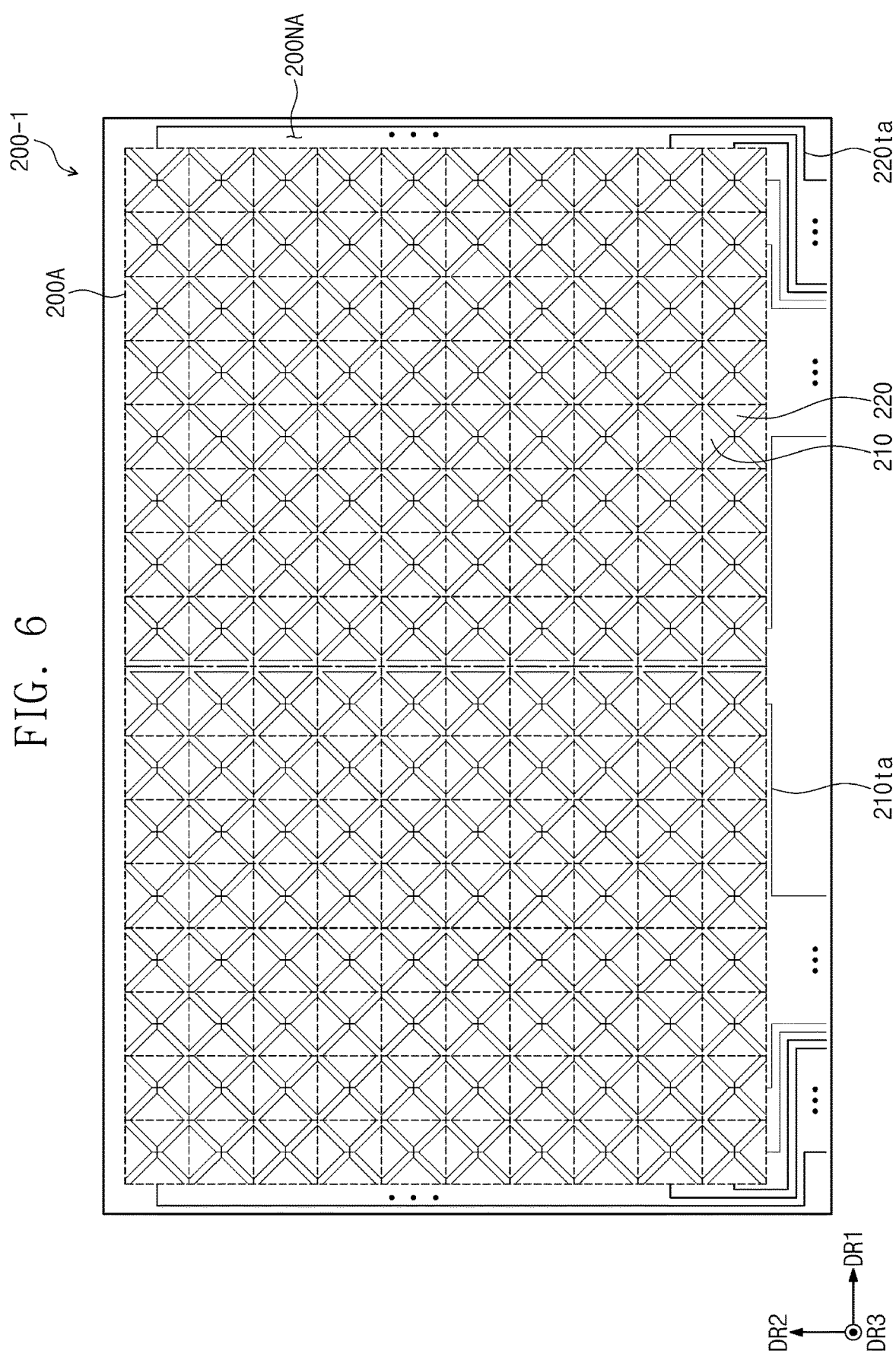
FIG. 6 is a plan view of a sensor according to an embodiment of the present disclosure.

FIG. 6 is a plan view of a sensor 200-1 according to an embodiment of the present disclosure. In describing FIG. 6, the same reference numerals are allocated to the same components as described in FIG. 5A, and to the extent that an element is not described in detail, it may be understood that the detail is at least similar to a corresponding element that has been described elsewhere within the present disclosure.

Referring to FIG. 6, the sensor 200-1 may include the plurality of first electrodes 210, the plurality of second electrodes 220, a plurality of first trace lines 210ta, and a plurality of second trace lines 220ta.

The first electrodes 210 and the second electrodes 220 may be disposed in the sensing area 200A, while the first trace lines 210ta and the second trace lines 220ta may be disposed in the peripheral area 200NA.

In FIG. 6, an example in which one first trace line 210ta is electrically connected to one first electrode 210, and one second trace line 220ta is electrically connected to one second electrode 220 is illustrated. However, the present disclosure is not necessarily limited thereto. For example, two first trace lines 210ta may be electrically connected to one first electrode 210, while two second trace lines 220ta may be electrically connected to one second electrode 220. Alternatively, two first trace lines 210ta may be electrically connected to one first electrode 210, while two second trace lines 220ta may be electrically connected to one second electrode 220.

Figure 7B:
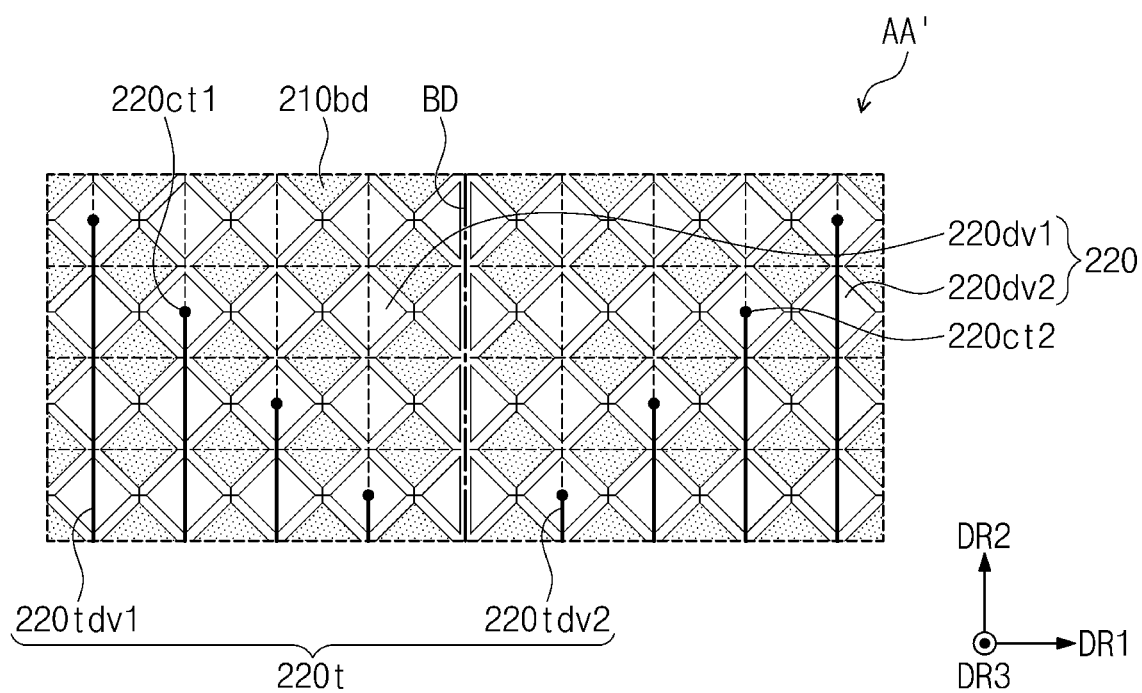
FIG. 7B is an enlarged plan view of an area of AA' area shown in FIG. 7A.

FIG. 7A is a diagram illustrating an operation of the sensor 200 according to an embodiment of the present disclosure. FIG. 7B is an enlarged plan view of an area of AA' area shown in FIG. 7A.

Referring to FIGS. 7A and 7B, the sensor 200 may include a plurality of transmit groups TX and a plurality of receive groups RX disposed in the sensing area 200A. The plurality of transmit groups TX may be arranged along the first direction DR1, and each of the plurality of transmit groups TX may include at least one first electrode 210. The receive group RX may include the second electrodes 220 arranged along the second direction DR2. The transmit groups TX may be referred to as groups TX. Each of the first electrodes 210 is briefly shown in a form of a line extending along the second direction DR2, and each of the second electrodes 220 is briefly shown in a form of a line extending along the first direction DR1.

The sensor 200 may be driven by the sensor driver 200C. In an embodiment of the present disclosure, the sensor driver 200C may include one driver chip 200IC, and the first electrodes 210 and the second electrodes 220 may be electrically connected to one driver chip 200IC. The sensor driver 200C may output transmit signals TXS to the sensor 200, and the sensor 200 may output sensed signal RXS to the sensor driver 200C.

According to an embodiment of the present disclosure, the transmit signals TXS may be simultaneously provided to one or more first electrodes 210 included in each of the plurality of transmit groups TX. This driving scheme may be referred to as multi-channel driving. For example, when four first electrodes 210 are included in single transmit group TX, the transmit signals TXS may be simultaneously provided to four first electrodes 210. In this case, waveforms of the simultaneously provided transmit signals TXS may be different from each other. For example, a phase of single transmit signal among the transmit signals TXS may be different from a phase of each of the other transmit signals for a specific period. Therefore, even when the transmit signals TXS are simultaneously provided to the plurality of first electrodes 210, the sensed signal RXS received by the sensor driver 200C may be post-processed to obtain input coordinates corresponding to an external input. An example where the phases thereof are different from each other has been described above. However, the present disclosure is not necessarily particularly limited thereto. For example, frequencies or amplitudes of the signals may be different from each other.

A time duration for which the sensed signal RXS is received through the receive group RX may be increased in a corresponding manner to the number of the first electrodes 210 included in single transmit group TX. For example, when there are four first electrodes 210 included in single transmit group TX, the time duration taken to receive the sensed signal RXS may be four times larger than that when one first electrode 210 is included in single transmit group TX. Accordingly, a signal-to-noise ratio (SNR) may be increased.

According to an embodiment of the present disclosure, the number of the first electrodes 210 included in each of the transmit groups TX may vary. For example, the number of the first electrodes 210 included in each of the transmit groups TX may vary based on a screen displayed on the display layer 100 (refer to FIG. 3A). When the display layer 100 displays the same still image (for example, an always-on display mode), noise caused by the display layer 100 may be relatively small. In this case, the number of the first electrodes 210 included in each transmit group TX may be one. Alternatively, when the display layer 100 displays a fast-changing moving image, the noise caused by the display layer 100 may be relatively large. In this case, the number of the first electrodes 210 included in each of the transmit groups TX may be in a range of 2 to a total number of the first electrodes 210.

Alternatively, the number of the first electrodes 210 included in each of the transmit groups TX may vary based on an operation mode of the sensor 200. For example, the number of the first electrodes 210 included in each of the transmit groups TX when the sensor 200 detects the input by the input device 3000 (refer to FIG. 3B) may be greater than the number of the first electrodes 210 included in each of the transmit groups TX when the sensor 200 detects the input by the touch 2000 (refer to FIG. 3A). Therefore, when the input is provided from the input device 3000, sensitivity of the sensor 200 may be further increased, so that linearity performance may be increased.

According to an embodiment of the present disclosure, the numbers of the first electrodes 210 respectively included in the transmit groups TX may be the same as or different from each other. Alternatively, the numbers of the first electrodes 210 respectively included in some of the transmit groups TX may be the same as each other and the numbers of the first electrodes 210 respectively included in the others of the transmit groups TX may be different from each other. For example, all of the numbers of the first electrodes 210 respectively included in the transmit groups TX may be 4. Alternatively, the numbers of the first electrodes 210 respectively included in the transmit groups TX may be 2, 4, and 8, or may be variously changed.

A boundary BD extending along the second direction DR2 may be defined in the sensing area 200A. In an embodiment of the present disclosure, the boundary BD may be a divided driving boundary-line. The sensor driver 200C may output the transmit signals TXS to the first electrodes 210 in a symmetrical manner about the boundary BD. For example, the numbers of the first electrodes 210 respectively included in the transmit groups TX may be symmetric with each other about the boundary BD.

The sensor driver 200C may simultaneously output the transmit signals TXS to the first electrodes 210 included in two transmit groups TX-1 and TX-2 arranged in a symmetric manner with respect to each other about the boundary BD. Accordingly, the transmit signals TXS may be simultaneously provided to the two transmit groups TX-1 and TX-2 facing each other with the boundary BD being disposed therebetween. The two transmit groups TX-1 and TX-2 may be two proximate groups closest to each other and disposed about the boundary BD. Since the transmit signals TXS are simultaneously provided to the two transmit groups TX-1 and TX-2, the two transmit groups TX-1 and TX-2 may be defined as a single transmit group TXbd. For example, the single transmit group TXbd may at least partially overlap the boundary BD.

An area where the single transmit group TXbd is disposed may be defined as a boundary area BDA including the boundary BD. Further, first electrodes 210bd included in the single transmit group TXbd overlapping the boundary BD among the first electrodes 210 may be defined as the boundary electrodes 210bd. For example, the sensor driver 200C may simultaneously output or provide the transmit signals TXS to the boundary electrodes 210bd. The transmit signals TXS received by the boundary electrodes 210bd may be referred to as boundary transmit signals.

In FIG. 7A, timings t0, t1, . . . , tn at which the signals are provided to the transmit groups TX are shown. For example, the transmit signals TXS may be sequentially provided to the transmit groups TX of the sensor 200 as the transmit groups TX are disposed away from the boundary BD. Further, FIG. 7A shows an example in which the transmit groups TX might not overlap each other. However, the present disclosure is not necessarily particularly limited thereto. For example, at least some of the transmit groups TX may partially overlap each other. For example, the single transmit group TXbd and a transmit group TX proximate thereto may partially overlap each other.

Referring to FIG. 7A and FIG. 7B, the second electrodes 220 may be respectively divided into first sub-electrodes 220$dv$1 arranged along the second direction DR2 and second sub-electrodes 220$dv$2 arranged along the second direction DR2. The first sub-electrodes 220$dv$1 and the second sub-electrodes 220$dv$2 may be spaced apart from each other in the first direction DR1 with the boundary BD being disposed therebetween.

According to an embodiment of the present disclosure, the single transmit group TXbd may at least partially overlap the boundary BD. Accordingly, the single transmit group TXbd may at least partially overlap the first sub-electrodes 220$dv$1 and the second sub-electrodes 220$dv$2. Further, the sensor 200 may receive the transmit signal TXS in a symmetrical manner (e.g., mirror symmetry) about the boundary BD. In this case, the same noise and the same sensed signal RXS may be simultaneously sensed in areas proximate to each other and disposed about the boundary BD. Therefore, as a difference (or deviation) between the sensed signals RXS respectively measured in areas spaced apart from each other and disposed around each other and disposed around the divided driving boundary BD is reduced or eliminated, distortion of data and data discontinuity occurring about the boundary BD may be reduced or eliminated. Therefore, sensing performance of the sensor 200 may be increased.

The second trace lines 220$t$ may include second trace lines 220$tdv$1 electrically connected to the first sub-electrodes 220$dv$1 and second trace lines 220$tdv$2 electrically connected to the second sub-electrodes 220$dv$2. Hereinafter, the second trace lines 220$tdv$2 are referred to as third trace lines 220$tdv$2. The second trace lines 220$tdv$1 and the third trace lines 220$tdv$2 may at least partially overlap the sensing area 200A.

The first sub-electrodes 220$dv$1 and the second trace lines 220$tdv$1 may be electrically connected to each other via first contacts 220$ct$1, respectively, while the second sub-electrodes 220$dv$2 and the third trace lines 220$tdv$2 may be electrically connected to each other via second contacts 220$ct$2, respectively. In an embodiment of the present disclosure, the first contacts 220$ct$1 and the second contacts 220$ct$2 may be arranged symmetrically with respect to each other about the boundary BD. However, the present disclosure is not necessarily particularly limited thereto.

Figure 8:
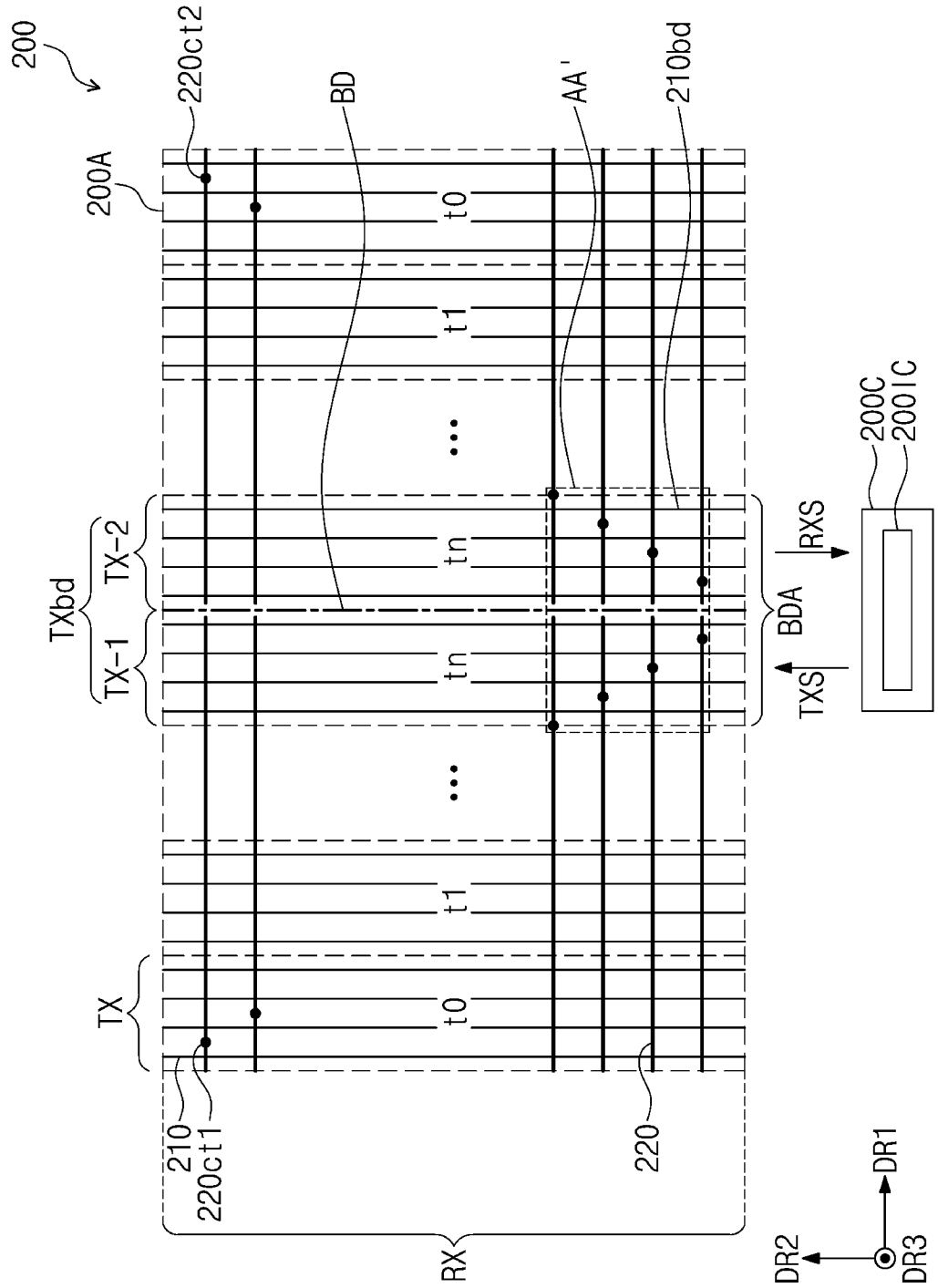
FIG. 8 is a diagram illustrating an operation of a sensor according to an embodiment of the present disclosure.

FIG. 8 is a diagram illustrating an operation of the sensor 200 according to an embodiment of the present disclosure. In describing FIG. 8, the same reference numerals are allocated to the same components as described in FIG. 7A, and to the extent that an element is not described in detail, it may be understood that the detail is at least similar to a corresponding element that has been described elsewhere within the present disclosure.

Referring to FIG. 8, timings t0, t1, . . . , tn at which the signals are provided to the transmit groups TX are shown. In FIG. 7A, the transmit signals TXS may be sequentially provided to the transmit groups TX of the sensor 200 as the transmit groups TX are disposed away from the boundary BD, whereas in an embodiment shown in FIG. 8, the transmit signals TXS may be sequentially provided to the transmit groups TX of the sensor 200 as the transmit groups TX are disposed in a closer manner to the boundary BD. For example, the sensor 200 may receive the transmit signal TXS in a symmetrical manner (e.g., mirror symmetry) about the boundary BD.

According to an embodiment of the present disclosure, the single transmit group TXbd may at least partially overlap the boundary BD. The sensor driver 200C may simultaneously sense the same noise and the sensed signal in areas proximate to each other and disposed about the boundary BD. Accordingly, as the difference between the sensed signals respectively measured in areas spaced apart from each other and disposed around each other and disposed around the divided driving boundary BD is reduced or eliminated, data distortion and data discontinuity, etc., that occur about the boundary BD may be reduced or eliminated. Therefore, the sensing performance of the sensor 200 may be increased.

Figure 9:
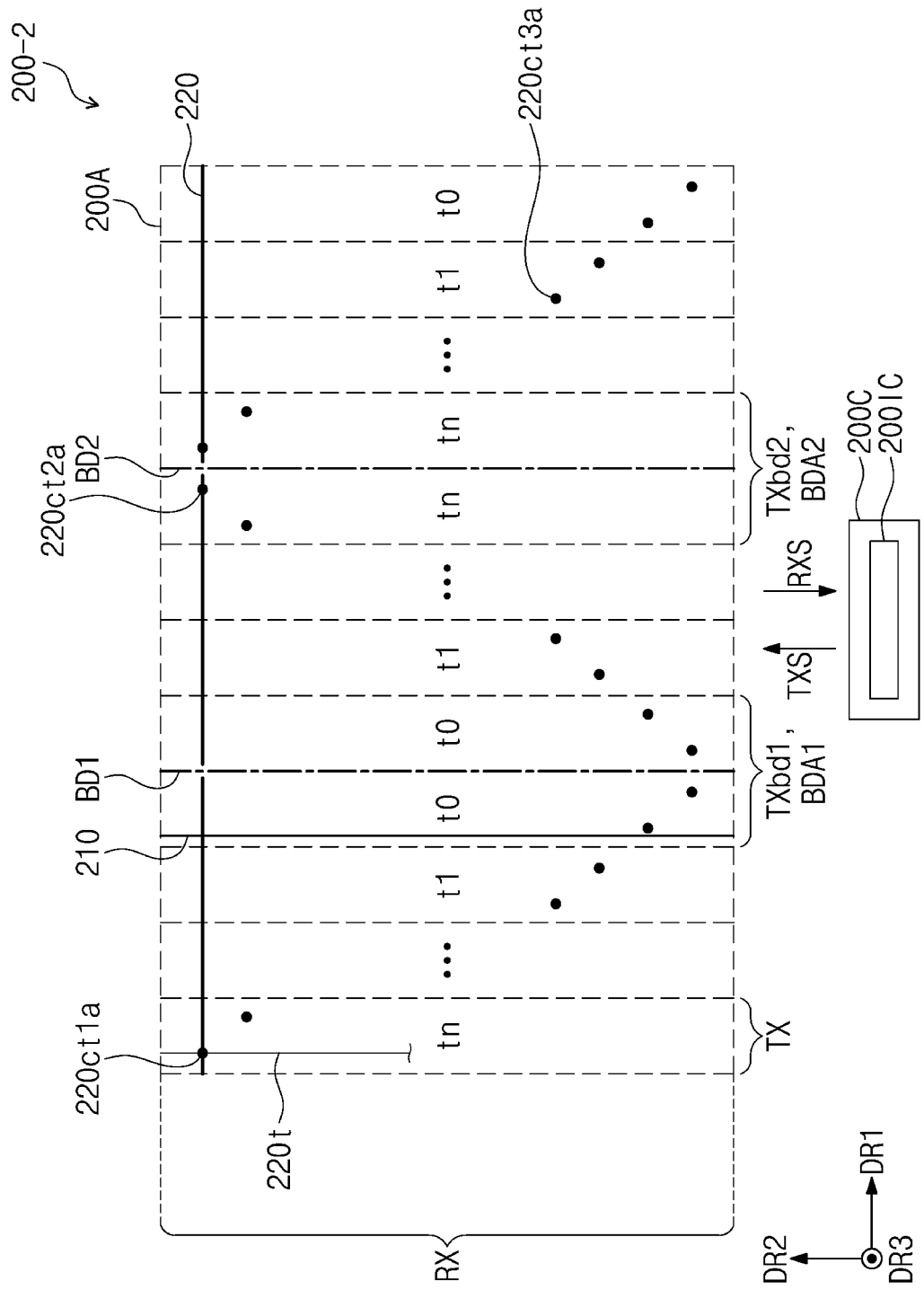
FIG. 9 is a diagram illustrating an operation of a sensor according to an embodiment of the present disclosure.

FIG. 9 is a diagram illustrating an operation of a sensor 200-2 according to an embodiment of the present disclosure.

Referring to FIG. 9, a first boundary BD1 and a second boundary BD2 may be defined in the sensing area 200A of the sensor 200-2. Each of the first boundary BD1 and the second boundary BD2 may extend along the second direction DR2, while the first boundary BD1 and the second boundary BD2 may be spaced apart from each other in the first direction DR1. Each of the first boundary BD1 and the second boundary BD2 may be a divided driving boundary. Accordingly, each of the second electrodes 220 may be divided into three sub-electrodes via the first boundary BD1 and the second boundary BD2. Description about the sub-electrodes may refer to the description as set forth above with reference to FIG. 7A and FIG. 7B. FIG. 9 shows one first electrode 210, one second electrode 220 including the three sub-electrodes, and one second trace line 220t by way of example.

Referring to FIG. 9, timings t0, t1, . . . , tn at which the signals are provided to the transmit groups TX are shown. For example, the transmit signals TXS may be sequentially provided to the transmit groups TX of the sensor 200 as the transmit groups TX are disposed away from the first boundary BD1. The transmit signals TXS may be sequentially provided to the transmit groups TX of the sensor 200 as the transmit groups TX are disposed in a closer manner to the second boundary BD2.

According to an embodiment of the present disclosure, the driver chip 200IC may simultaneously output the transmit signals TXS to the first electrodes 210 included in a first transmit group TXbd1 among the first electrodes 210. Further, the driver chip 200IC may simultaneously output the transmit signals TXS to the first electrodes 210 included in a second transmit group TXbd2 among the first electrodes 210. The first transmit group TXbd1 may be disposed in a first boundary area BDA1 including the first boundary BD1, and the second transmit group TXbd2 may be disposed in a second boundary area BDA2 including the second boundary BD2. For example, the first transmit group TXbd1 may at least partially overlap the first boundary BD1, and the second transmit group TXbd2 may at least partially overlap the second boundary BD2.

The sensor driver 200C may simultaneously sense the same noise and the same sensed signal in the first boundary area BDA1 including the first boundary BD1, and may simultaneously sense the same noise and the same sensed signal in the second boundary area BDA2 including the second boundary BD2. Therefore, as a difference between the sensed signals respectively measured in areas spaced apart from each other and disposed around each of the first and second boundaries BD1 and BD2 is reduced or eliminated, the data distortion and data discontinuity occurring around each of the first and second boundaries BD1 and BD2 are reduced or eliminated, such that the sensing performance of the sensor 200-2 may be increased.

According to an embodiment of the present disclosure, the sensor 200-2 may further include first contacts 220ct1a, second contacts 220ct2a, and third contacts 220ct3a. The first contacts 220ct1a, the second contacts 220ct2a, and the third contacts 220ct3a may at least partially overlap the sensing area 200A. The first contacts 220ct1a, the second contacts 220ct2a, and the third contacts 220ct3a may correspond to points at which the sub-electrodes included in the second electrodes 220 and the second trace lines 220t contact each other.

The first contacts 220ct1a and the second contacts 220ct2a may be spaced apart from each other while the first boundary BD1 is disposed therebetween. The third contacts 220ct3a and the second contacts 220ct2a may be spaced apart from each other while the second boundary BD2 is disposed therebetween. The first contacts 220ct1a may be arranged according to a first rule, and the second contacts 220ct2a may be arranged according to a second rule that is different from the first rule. For example, an arrangement direction of the first contacts 220ct1a may have a negative slope, and an arrangement direction of the second contacts 220ct2a may have a positive slope. The third contacts 220ct3a may be arranged according to a third rule that is different from the second rule. For example, an arrangement direction of the third contacts 220ct3a may have a negative slope.

FIG. 9 shows an example in which two divided driving boundaries are defined in the sensor 200-2. However, the present disclosure is not necessarily particularly limited thereto. For example, two or more divided driving boundaries may be defined in the sensor 200-2. Further, FIG. 9 illustrates an example in which the first to third contacts 220ct1a, 220ct2a, and 220ct3a are arranged in a symmetrical manner with respect to each other around each of the first and second boundaries BD1 and BD2. However, the first to third contacts 220ct1a, 220ct2a, and 220ct3a may be arranged in a non-symmetrical manner with respect to each other around each of the first and second boundaries BD1 and BD2.

Figure 10:
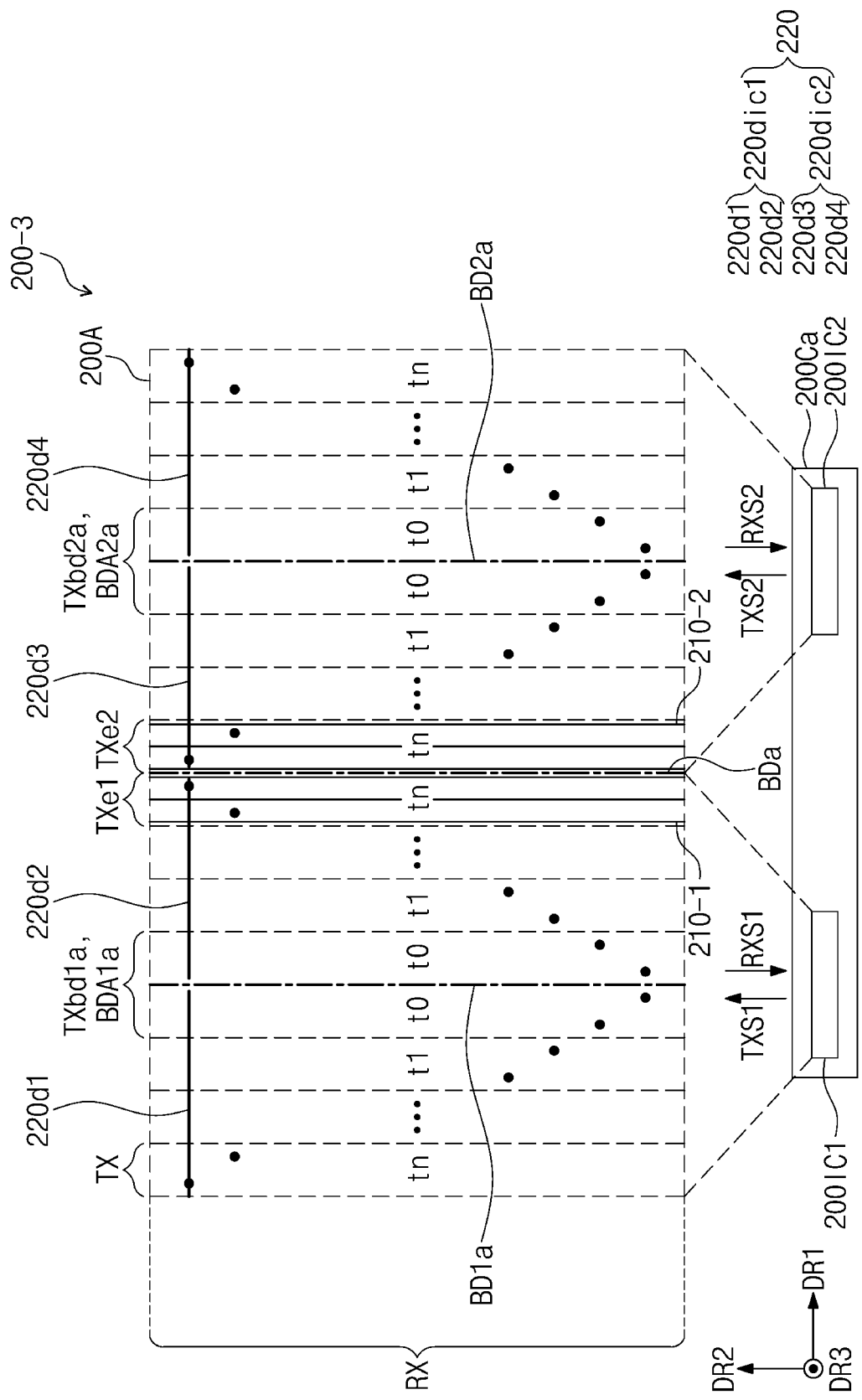
FIG. 10 is a diagram illustrating an operation of a sensor according to an embodiment of the present disclosure.

FIG. 10 is a diagram illustrating an operation of a sensor 200-3 according to an embodiment of the present disclosure.

Referring to FIG. 5A and FIG. 10, the sensor 200-3 and a sensor driver 200Ca driving the sensor 200-3 are shown. In an embodiment of the present disclosure, the sensor driver 200Ca may include a plurality of driver chips 200IC1 and 200IC2. In FIG. 10, the two driver chips 200IC1 and 200IC2 are illustrated by way of example. However, the present disclosure is not necessarily particularly limited thereto. For example, the sensor driver 200Ca may include three or more driver chips.

In an embodiment of the present disclosure, a boundary BDa may be defined in the sensing area 200A. A plurality of first electrodes 210-1 arranged on one side of the boundary BDa may be electrically connected to the first driver chip 200IC1, while a plurality of first electrodes 210-2 arranged on the other side of the boundary BDa may be electrically connected to the second driver chip 200IC2. The plurality of first electrodes 210-1 may be spaced apart from the plurality of first electrodes 210-2 with the boundary BDa being interposed therebetween. The boundary BDa may be a chip dividing boundary defining different areas respectively driven by different driver chips 200IC1 and 200IC2.

Each of the plurality of second electrodes 220 may be divided into first and second sub-electrodes 220dic1 and 220dic2 via the boundary BDa. Accordingly, the first sub-electrodes 220dic1 overlapping the plurality of first electrodes 210-1 may be electrically connected to the first driver chip 200IC1, while the second sub-electrodes 220dic2 overlapping the plurality of first electrodes 210-2 may be electrically connected to the second driver chip 200IC2.

FIG. 10 shows timings t0, t1, . . . , tn at which the signals are provided to the transmit groups TX. The signals may be simultaneously provided from the first and second driver chips 200IC1 and 200IC2 respectively to the transmit groups TXe1 and TXe2 facing each other with the boundary BDa being disposed therebetween. For example, the sensor driver 200Ca may simultaneously sense the same noise and the sensed signal in an area including the boundary BDa. Accordingly, as the difference between the sensed signals respectively measured in areas spaced apart from each other with the boundary BDa being disposed therebetween is reduced or eliminated, the data distortion and data discontinuity that occur about the boundary BDa may be reduced or eliminated.

A first boundary BD1a extending along the second direction DR2 and a second boundary BD2a extending along the second direction DR2 and spaced apart from the first boundary BD1a with the boundary BDa being disposed therebetween may be further defined in the sensing area 200A.

Each of the first boundary BD1a and the second boundary BD2a may be a divided driving boundary-line. Each of the first sub-electrodes 220dic1 may be divided into first sub-sub-electrodes 220d1 and 220d2 via the first boundary BD1a. Each of the second sub-electrodes 220dic2 may be divided into second sub-sub-electrodes 220d3 and 220d4 via the second boundary BD2a.

The first driver chip 200IC1 may output a plurality of transmit signals TXS1 to the plurality of first electrodes 210-1 in a symmetric manner about the first boundary BD1a. The second driver chip 200IC2 may output a plurality of transmit signals TXS2 to the plurality of first electrodes 210-2 in a symmetric manner with respect to the second boundary BD2a. The first driver chip 200IC1 may receive a first sensed signal RXS1 from the first sub-electrodes 220dic1, while the second driver chip 200IC2 may receive a second sensed signal RXS2 from the second sub-electrodes 220dic2.

For example, the first driver chip 200IC1 may simultaneously output the first transmit signals TXS1 to the first electrodes 210-1 included in a first transmit group TXbd1a among the first electrodes 210-1. The first transmit group TXbd1a may be defined in a first boundary area BDA1a including the first boundary BD1a. The second driver chip 200IC2 may simultaneously output the second transmit signals TXS2 to the first electrodes 210-2 included in a second transmit group TXbd2a among the first electrodes 210-2. The second transmit group TXbd2a may be defined in a first boundary area BDA2a including the second boundary BD2a. Therefore, as each of the difference between the sensed signals respectively measured in areas spaced apart from each other while the first boundary BD1a is disposed therebetween, and the difference between the sensed signals respectively measured in areas spaced apart from each other while the second boundary BD2a is disposed therebetween is reduced or eliminated, the data distortion and data discontinuity occurring around each of the first and second boundaries BD1a and BD2a may be reduced or eliminated.

Figure 11A:
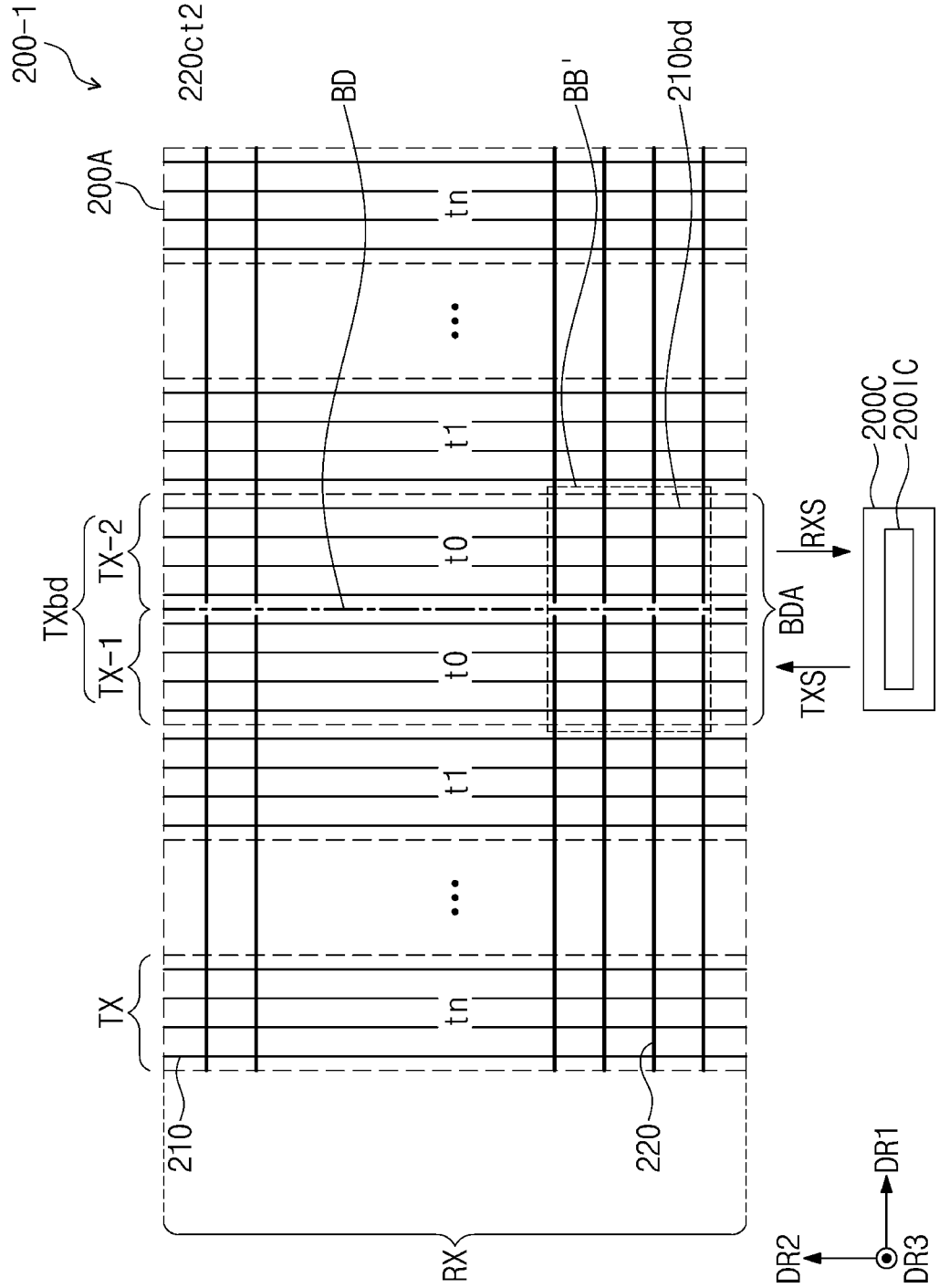
FIG. 11A is a diagram illustrating an operation of a sensor according to an embodiment of the present disclosure.
Figure 11B:
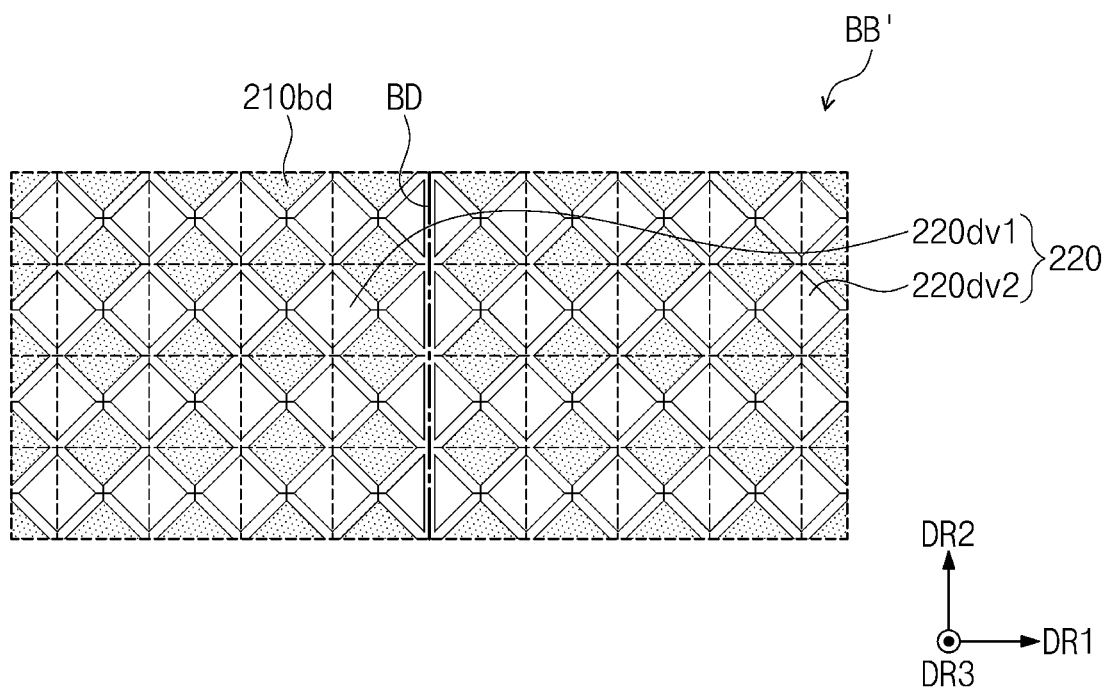
FIG. 11B is an enlarged plan view of an area of BB' area shown in FIG. 11A.

FIG. 11A is a diagram illustrating an operation of the sensor 200-1 according to an embodiment of the present disclosure. FIG. 11B is an enlarged plan view of an area of BB' area shown in FIG. 11A.

Referring to FIG. 6, FIG. 11A, and FIG. 11B, the sensor 200-1 may include the plurality of first electrodes 210, the plurality of second electrodes 220, the plurality of first trace lines 210ta, and the plurality of second trace lines 220ta. The first trace lines 210ta and the second trace lines 220ta may be disposed in the peripheral area 200NA. The first trace lines 210ta and the second trace lines 220ta might not overlap the sensing area 200A.

The second electrodes 220 may be respectively divided into the first sub-electrodes 220dv1 arranged along the second direction DR2 and the second sub-electrodes 220dv2 arranged along the second direction DR2. The first sub-electrodes 220dv1 and the second sub-electrodes 220dv2 may be spaced apart from each other with the boundary BD being disposed therebetween. The second electrodes 220 may be referred to as second electrode sets. One second electrode set may include a plurality of s second sub-electrodes.

According to an embodiment of the present disclosure, the sensor driver 200C may simultaneously output the transmit signals TXS to the first electrodes 210 included in two transmit groups TX-1 and TX-2 arranged in a symmetrical manner with respect to each other about the boundary BD. The two transmit groups TX-1 and TX-2 may be defined as the single transmit group TXbd because the transmit signals TXS are simultaneously provided thereto. For example, the single transmit group TXbd may at least partially overlap the boundary BD.

The single transmit group TXbd may at least partially overlap the first sub-electrodes 220dv1 and the second sub-electrodes 220dv2. Further, the sensor 200 may receive the transmit signal TXS in a symmetrical manner (e.g., mirror symmetry) about the boundary BD. In this case, the sensor may simultaneously sense the same noise and the same sensed signal RXS in different areas proximate to each other with the boundary BD being disposed therebetween. Accordingly, as the difference between the sensed signals RXS respectively measured in the areas spaced apart from each other while the divided driving boundary BD is disposed therebetween is reduced or eliminated, the distortion of data and data discontinuity occurring about the boundary BD may be reduced or eliminated. Therefore, the sensing performance of the sensor 200-1 may be increased.

The above description regarding the operation of the sensor 200-1 in which the first trace lines 210ta and the second trace lines 220ta are disposed in the peripheral area 200NA is based on an embodiment similar to FIG. 7A. However, the present disclosure is not necessarily limited thereto. The above description may be applied to the embodiment as described above in FIG. 8 in which a divided driving direction may be changed, to the embodiment as described above in FIG. 9 I which three or more divided driving areas may be provided, and to the embodiment as described above in FIG. 10 in which the sensor 200-1 may be driven using a plurality of driving chips.

Figure 12:
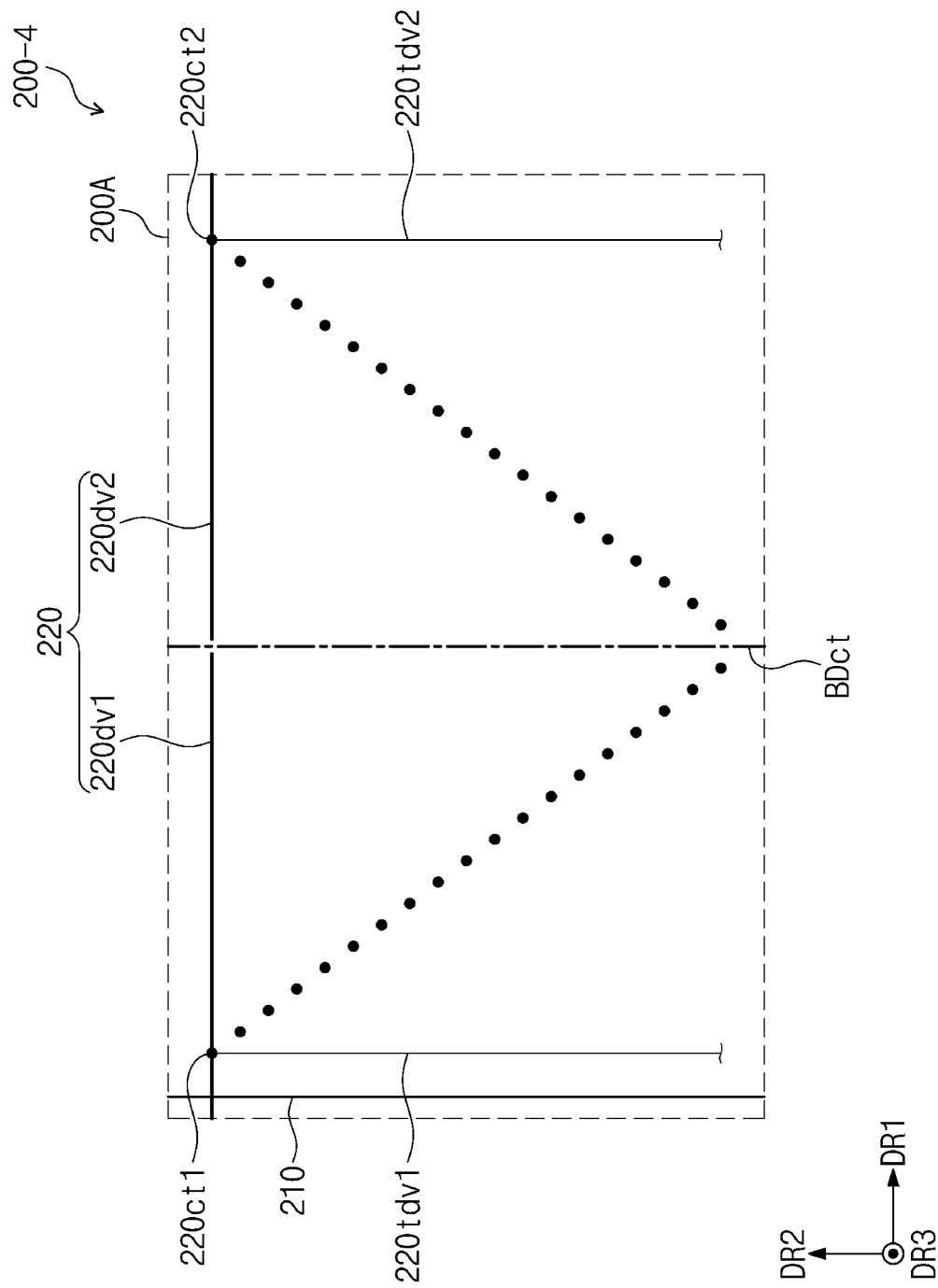
FIG. 12 is a plan view of a sensor according to an embodiment of the present disclosure.

FIG. 12 is a plan view of a sensor 200-4 according to an embodiment of the present disclosure.

Referring to FIG. 12, one first electrode 210, one second electrode 220, one second trace line 220tdv1, one third trace line 220tdv2, the first contacts 220ct1, and the second contacts 220ct2 disposed in the sensing area 200A of the sensor 200-4 are illustrated by way of example.

The second electrode 220 may be divided into the first sub-electrode 220dv1 and the second sub-electrode 220dv2 via a boundary BDct while the first sub-electrode 220dv1 and the second sub-electrode 220dv2 may be spaced apart from each other. The first sub-electrode 220dv1 may be electrically connected to the second trace line 220tdv1 via the first contact 220ct1. The second sub-electrode 220dv2 may be electrically connected to the third trace line 220tdv2 via the second contact 220ct2.

The first contacts 220ct1 and the second contacts 220ct2 may be spaced apart from each other with the boundary BDct being disposed therebetween. The first contacts 220ct1 may be arranged according to a first rule, and the second contacts 220*ct*2 may be arranged according to a second rule that is different from the first rule. A slope of a first arrangement direction of the first contacts 220*ct*1 and a slope of a second arrangement direction of the second contacts 220*ct*2 may be different from each other. For example, the first arrangement direction of the first contacts 220*ct*1 may have a negative slope, and the second arrangement direction of the second contacts 220*ct*2 may have a positive slope. The first contacts 220*ct*1 and the second contacts 220*ct*2 may be arranged in a substantially symmetric manner with respect to each other about the boundary BDct.

The difference between the arrangement rules of the first contacts 220*ct*1 and the second contacts 220*ct*2 may be considered as a difference between designs of the trace lines. Therefore, the boundary BDct may be a divided driving boundary as well as a trace line design discontinuity boundary.

Figure 13A:
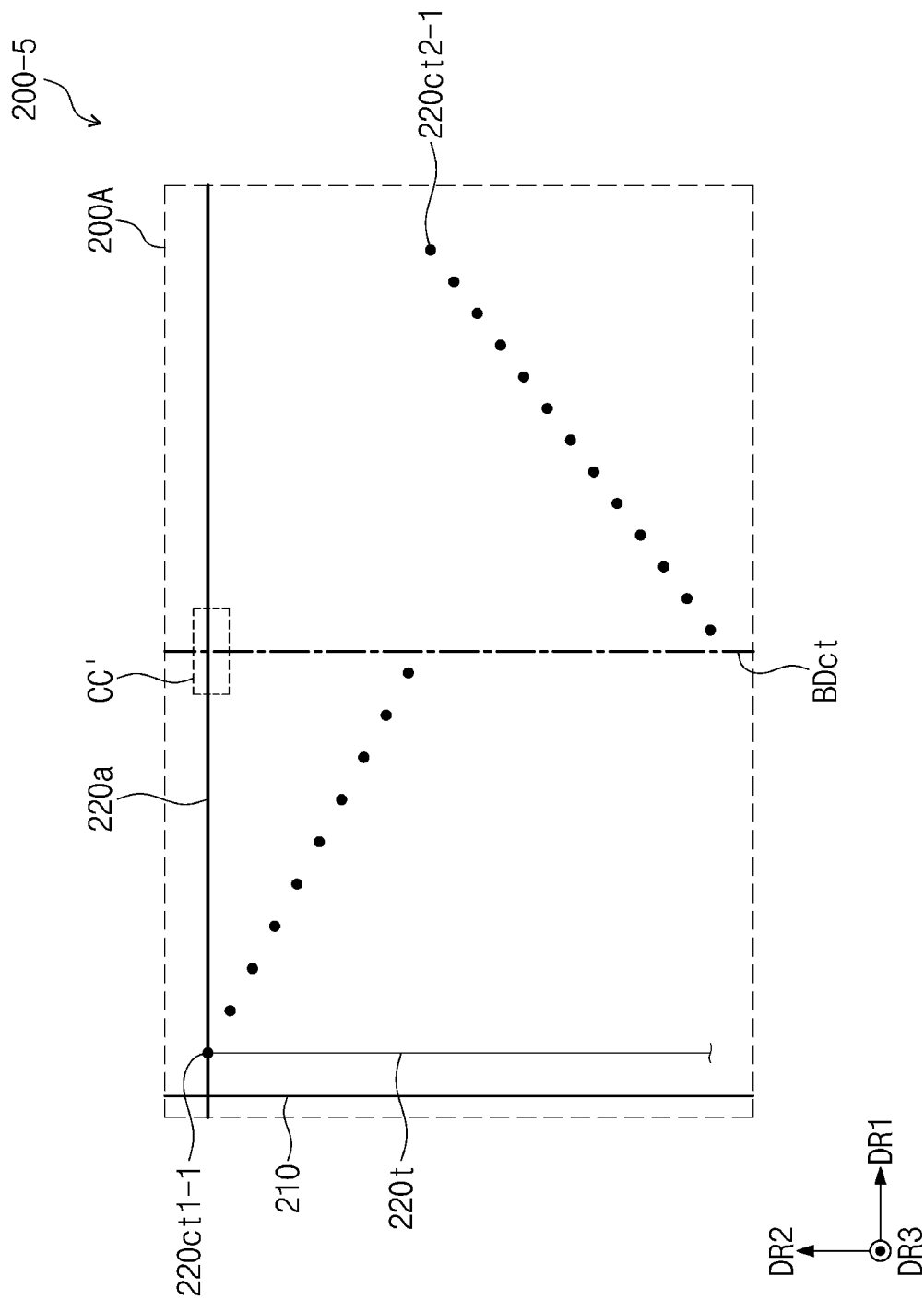
FIG. 13A is a plan view of a sensor according to an embodiment of the present disclosure.
Figure 13B:
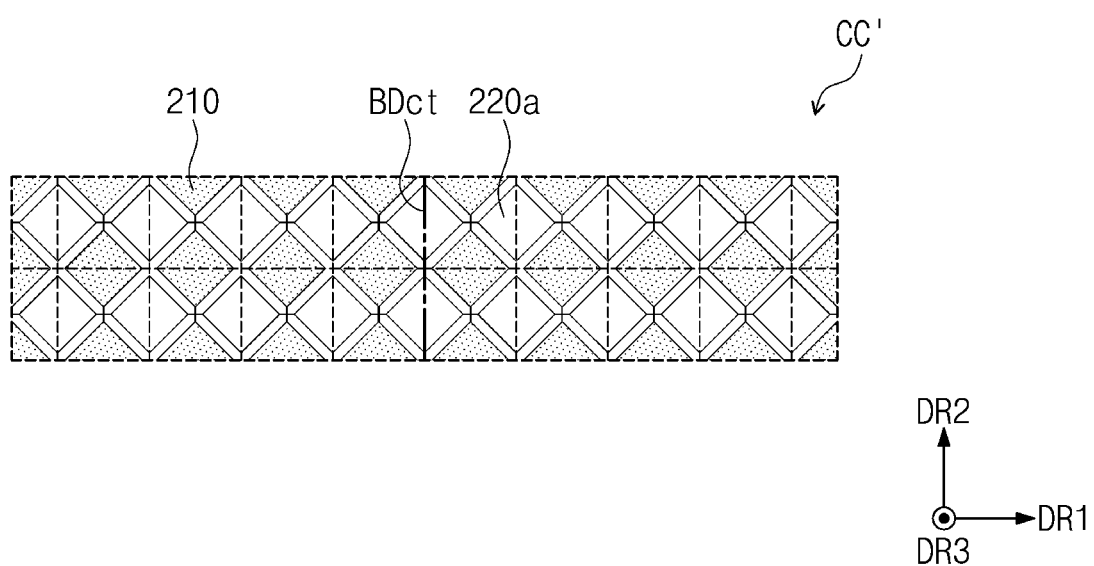
FIG. 13B is an enlarged plan view of an area of CC' area shown in FIG. 13A.

FIG. 13A is a plan view of a sensor 200-5 according to an embodiment of the present disclosure. FIG. 13B is an enlarged plan view of an area of CC' area shown in FIG. 13A.

Referring to FIG. 13A and FIG. 13B, one first electrode 210, one second electrode 220*a*, one second trace line 220*t*, first contacts 220*ct*1-1, and second contacts 220*ct*2-1 disposed in the sensing area 200A of the sensor 200-5 are illustrated by way of example.

The first contacts 220*ct*1-1 and the second contacts 220*ct*2-1 may be spaced apart from each other with the boundary BDct being disposed therebetween. The first contacts 220*ct*1-1 may be arranged according to a first rule, and the second contacts 220*ct*2-1 may be arranged according to a second rule that is different from the first rule. A slope of a first arrangement direction of the first contacts 220*ct*1-1 and a slope of a second arrangement direction of the second contacts 220*ct*2-1 may be different from each other. For example, the first arrangement direction of the first contacts 220*ct*1-1 may have a negative slope, and the second arrangement direction of the second contacts 220*ct*2-1 may have a positive slope.

When viewed in the first direction DR1, the first contacts 220*ct*1-1 and the second contacts 220*ct*2-1 might not overlap each other. For example, the number of the second electrodes 220*a* included in the sensor 200-5 and a total of the numbers of the first contacts 220*ct*1-1 and the second contacts 220*ct*2-1 may be the same as each other. The second electrode 220*a* may at least partially overlap with the boundary BDct. In an embodiment, a length in the first direction DR1 of the second electrode 220*a* may be substantially equal to a width in the first direction DR1 of the sensing area 200A.

Figure 14:
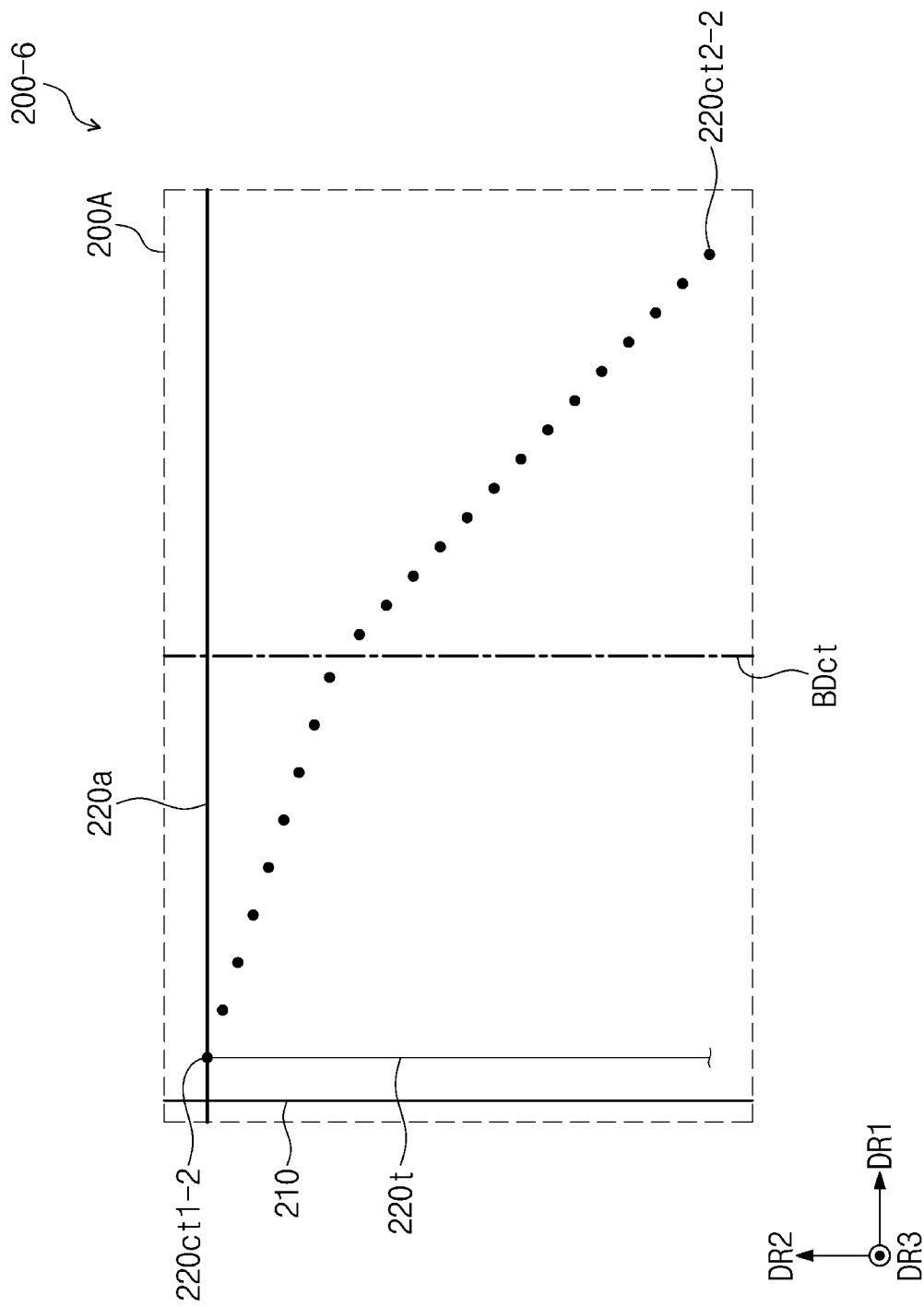
FIG. 14 is a plan view of a sensor according to an embodiment of the present disclosure.

FIG. 14 is a plan view of a sensor 200-6 according to an embodiment of the present disclosure.

Referring to FIG. 14, one first electrode 210, one second electrode 220*a*, one second trace line 220*t*, first contacts 220*ct*1-2, and second contacts 220*ct*2-2 disposed in the sensing area 200A of the sensor 200-6 are illustrated by way of example.

The first contacts 220*ct*1-2 and the second contacts 220*ct*2-2 may be spaced apart from each other with the boundary BDct being disposed therebetween. The first contacts 220*ct*1-2 may be arranged according to a first rule, and the second contacts 220*ct*2-2 may be arranged according to a second rule that is different from the first rule. A slope of a first arrangement direction of the first contacts 220*ct*1-2 and a slope of a second arrangement direction of the second contacts 220*ct*2-2 may be different from each other. When viewed in the first direction DR1, the first contacts 220*ct*1-2 and the second contacts 220*ct*2-2 might not overlap each other.

In FIG. 12, FIG. 13A, and FIG. 14, the examples in which the arrangement rule of the first contacts 220*ct*1, 220*ct*1-1, or 220*ct*1-2 and the arrangement rule of the second contacts 220*ct*2, 220*ct*2-1, or 220*ct*2-2 are different from each other due to the trace line design discontinuity are shown illustratively. The present disclosure is not necessarily limited to the above-described embodiments. As long as the arrangement rule of the first contacts 220*ct*1, 220*ct*1-1, or 220*ct*1-2 and the arrangement rule of the second contacts 220*ct*2, 220*ct*2-1, or 220*ct*2-2 are different from each other with the boundary BDct being disposed therebetween, the arrangement of the first contacts 220*ct*1, 220*ct*1-1, or 220*ct*1-2 and the arrangement of the second contacts 220*ct*2, 220*ct*2-1, or 220*ct*2-2 may be variously modified.

According to an embodiment of the present disclosure, the transmit signals TXS (refer to FIG. 7A) may be simultaneously provided to the first electrodes 210 (referred to as the boundary electrodes) disposed in an area including the boundary BDct among the first electrodes 210 of the sensor 200-4, 200-5, or 200-6. This is described in detail with reference to FIG. 15 to FIG. 19.

According to an embodiment of the present disclosure, the transmit signals TXS may be simultaneously provided to the area including the boundary BDct. The sensed signal RXS (refer to FIG. 7A) acquired from the area including the boundary BDct may be post-processed in the sensor driver 200C (refer to FIG. 7A). Therefore, data difference due to the trace line design discontinuity may be reduced, and thus, reliability of data acquired from the area including the boundary BDct may be increased. As a result, the sensing performance of the sensor 200-4, 200-5, or 200-6 may be increased.

Figure 15:
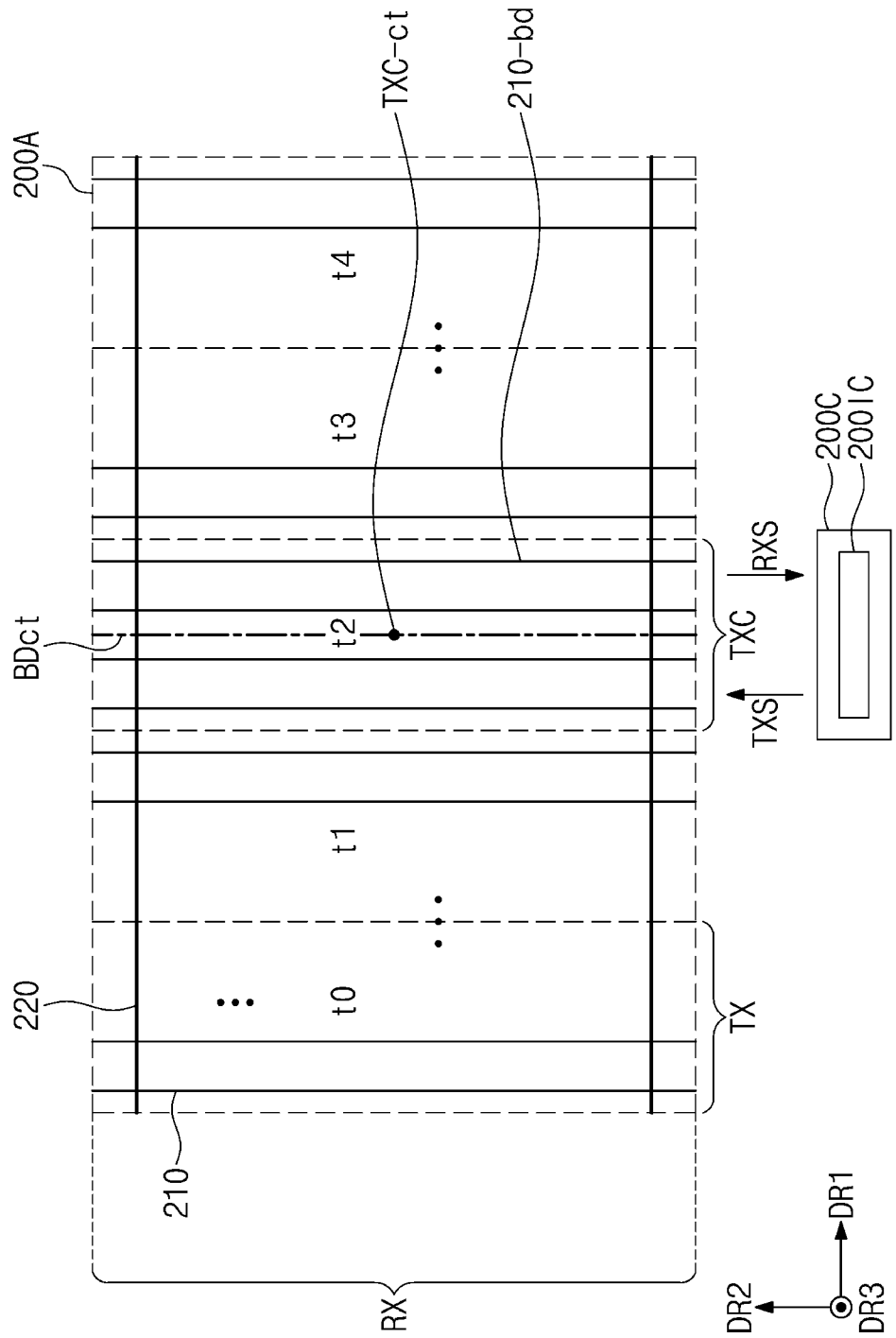
FIG. 15 is a diagram illustrating an operation of a sensor according to an embodiment of the present disclosure.

FIG. 15 is a diagram illustrating an operation of a sensor according to an embodiment of the present disclosure.

Referring to FIG. 15, a plurality of transmit groups TX and a receive group RX may be disposed in the sensing area 200A. The plurality of transmit groups TX may be arranged along the first direction DR1, and each of the plurality of transmit groups TX may include one or more first electrodes 210. The receive group RX may include the second electrodes 220 arranged along the second direction DR2. The transmit groups TX may be referred to as groups TX.

The sensor driver 200C may simultaneously output a plurality of transmit signals TXS to the first electrodes 210 included in each of the transmit groups TX. The transmit signals TXS may be sequentially provided to the transmit groups TX along the first direction DR1. FIG. 15 shows timings t0, t1, t2, t3, and t4 at which the signals are provided to the transmit groups TX.

In an embodiment of the present disclosure, the transmit groups TX might not overlap each other. For example, the first electrodes 210 included in each of the transmit groups TX might not overlap each other. The numbers of the first electrodes 210 respectively included in the transmit groups TX may be the same as or different from each other.

One group TXC of the transmit groups TX may include a plurality of boundary electrodes 210-*bd*. A center TXC-ct in the first direction DR1 of one group TXC and the boundary BDct may at least partially overlap each other. According to an embodiment of the present disclosure, the transmit signals TXS may be simultaneously provided to one group TXC including the boundary BDct. The sensed signal RXS obtained from an area including the boundary BDct may be post-processed in the sensing driver 200C.

Therefore, the data difference due to the trace line design discontinuity may be reduced, and thus reliability of data acquired from the area including the boundary BDct may be further increased.

Figure 16:
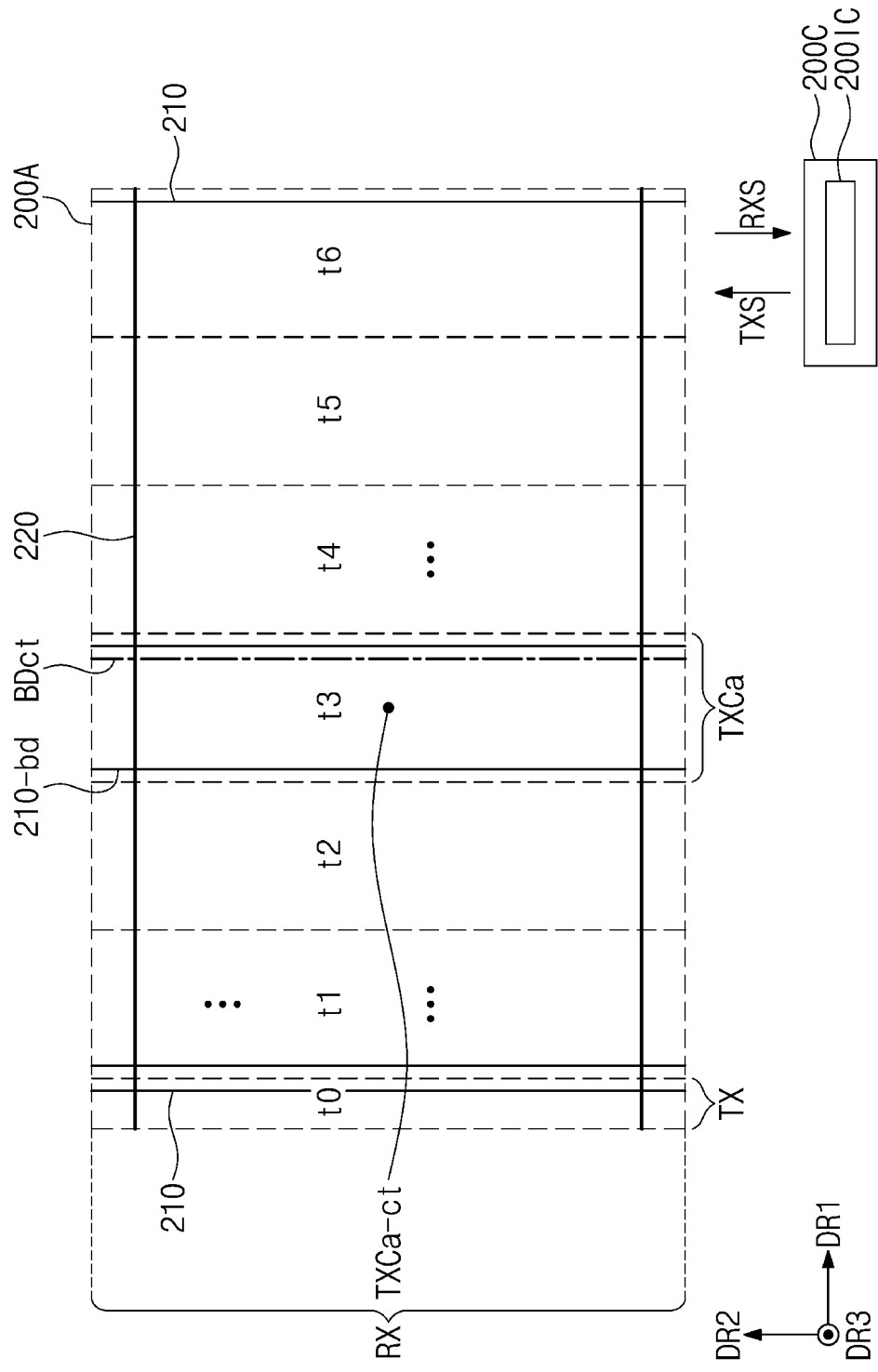
FIG. 16 is a diagram illustrating an operation of a sensor according to an embodiment of the present disclosure.

FIG. 16 is a diagram illustrating an operation of a sensor according to an embodiment of the present disclosure.

Referring to FIG. 16, a plurality of transmit groups TX and a receive group RX may be disposed in the sensing area 200A. The sensor driver 200C may simultaneously output a plurality of transmit signals TXS to the first electrodes 210 included in each of the transmit groups TX. The transmit signals TXS may be sequentially provided to the transmit groups TX along the first direction DR1.

One group TXCa of the transmit groups TX may include the plurality of boundary electrodes 210-*bd*. A center TXCa-ct in the first direction DR1 of one group TXCa and the boundary BDct might not overlap each other, whereas one group TXCa may at least partially overlap the boundary BDct. Therefore, the sensed signal RXS obtained from an area including the boundary BDct may be post-processed in the sensing driver 200C. Therefore, the data difference due to the trace line design discontinuity may be reduced, and thus, reliability of data acquired from the area including the boundary BDct may be further increased.

Figure 17:
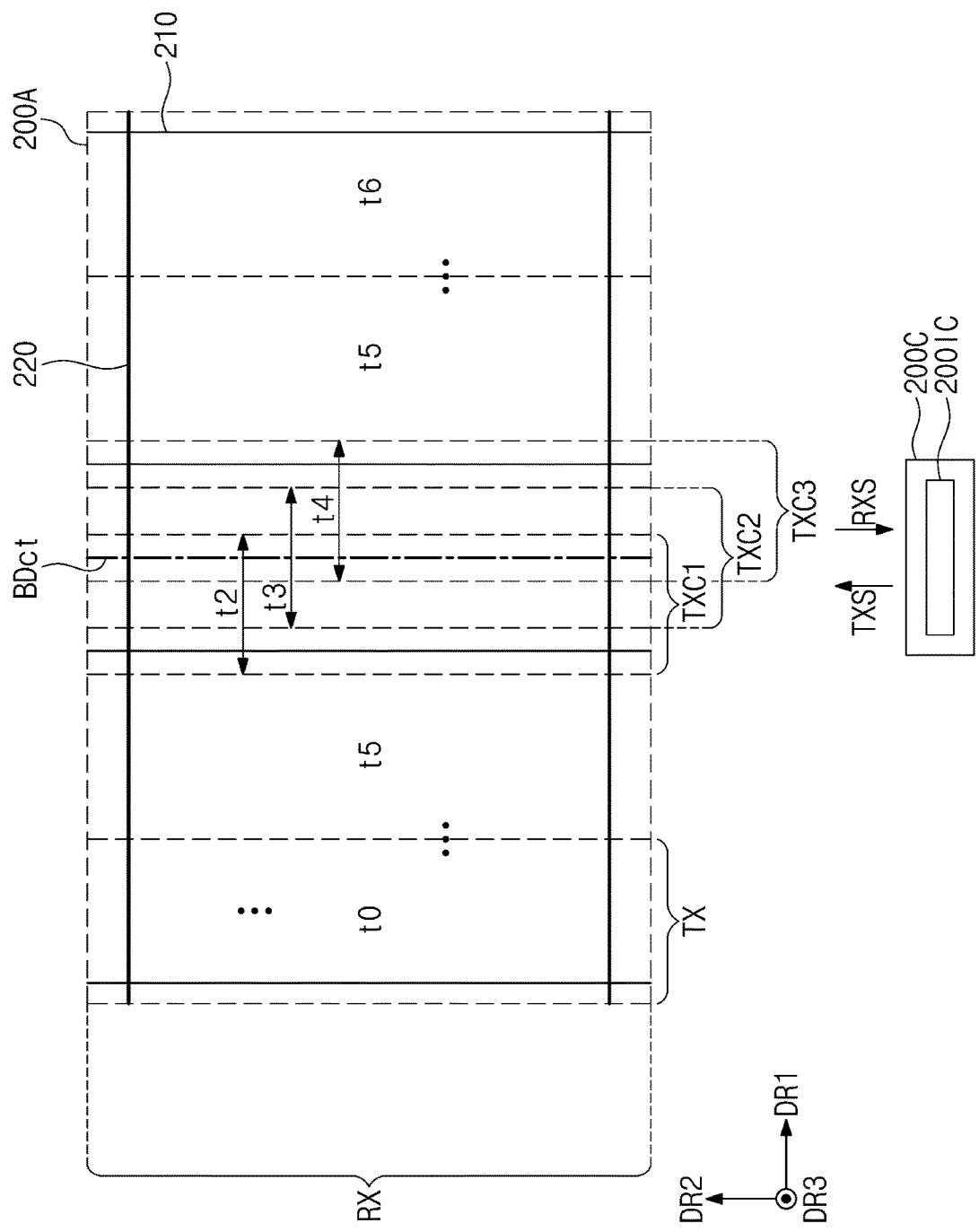
FIG. 17 is a diagram illustrating an operation of a sensor according to an embodiment of the present disclosure.

FIG. 17 is a diagram illustrating an operation of a sensor according to an embodiment of the present disclosure.

Referring to FIG. 17, a plurality of transmit groups TX and a receive group RX may be disposed in the sensing area 200A. The sensor driver 200C may simultaneously output a plurality of transmit signals TXS to the first electrodes 210 included in each of the transmit groups TX. The transmit signals TXS may be sequentially provided to the transmit groups TX along the first direction DR1.

At least one transmit group TXC1, TXC2, and TXC3 of the plurality of transmit groups TX may at least partially overlap the boundary BDct. Referring to FIG. 17, three transmit groups TXC1, TXC2, and TXC3 may at least partially overlap the boundary BDct. However, this is only an example, and the number of the transmit groups TXC1, TXC2, and TXC3 overlapping the boundary BDct may be two or more. However, the present disclosure is not necessarily particularly limited thereto.

The transmit groups TXC1, TXC2, and TXC3 overlapping the boundary BDct may be referred to as boundary groups TXC1, TXC2, and TXC3. The boundary groups TXC1, TXC2, and TXC3 may partially overlap each other. For example, some of the first electrodes 210 may be included in two or more boundary groups TXC1, TXC2, and TXC3.

According to an embodiment of the present disclosure, the transmit signals TXS may be simultaneously provided to the plurality of transmit groups TXC1, TXC2, and TXC3 including the boundary BDct. The sensed signal RXS obtained from each of areas including the boundary BDct may be post-processed in the sensing driver 200C. Therefore, data difference due to the trace line design discontinuity may be reduced, and thus, reliability of data acquired from the area including the boundary BDct may be further increased.

Figure 18:
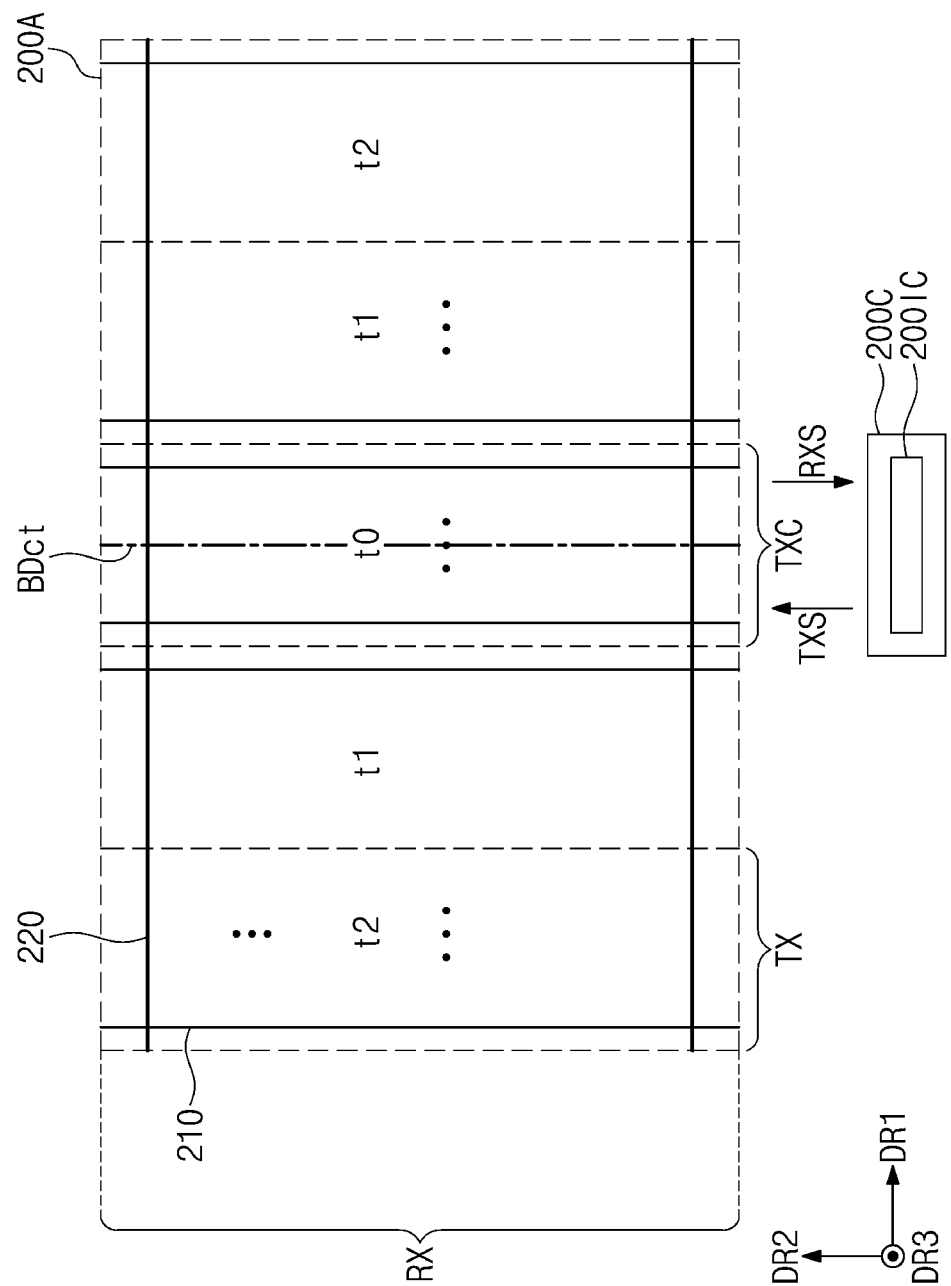
FIG. 18 is a diagram illustrating an operation of a sensor according to an embodiment of the present disclosure.

FIG. 18 is a diagram illustrating an operation of a sensor according to an embodiment of the present disclosure.

Referring to FIG. 18, a plurality of transmit groups TX and a receive group RX may be disposed in the sensing area 200A. The sensor driver 200C may simultaneously output a plurality of transmit signals TXS to the first electrodes 210 included in each of the transmit groups TX.

At least one transmit group TXC among the transmit groups TX may at least partially overlap the boundary BDct. For example, the sensor driver 200C may provide the transmit signal TXS to a single transmit group TXC, and then provide the transmit signals TXS in a symmetrical manner (e.g., mirror symmetry) about the boundary BDct.

FIG. 18 shows timings t0, t1, and t2 at which the signals are provided to the transmit groups TX. For example, the transmit signals TXS may be sequentially provided to the transmit groups TX as the transmit groups TX are disposed away from the boundary BDct. However, the present disclosure is not necessarily particularly limited thereto, and the transmit signals TXS may be sequentially provided to the transmit groups TX as the transmit groups TX are disposed in a closer manner to the boundary BDct.

According to an embodiment of the present disclosure, the transmit signals TXS may be simultaneously provided to the single transmit group TXC including the boundary BDct. The sensed signal RXS acquired from an area including the boundary BDct may be post-processed in the sensing driver 200C. Therefore, the data difference due to the trace line design discontinuity may be reduced, and, thus, reliability of data acquired from the area including the boundary BDct may be further increased.

Figure 19:
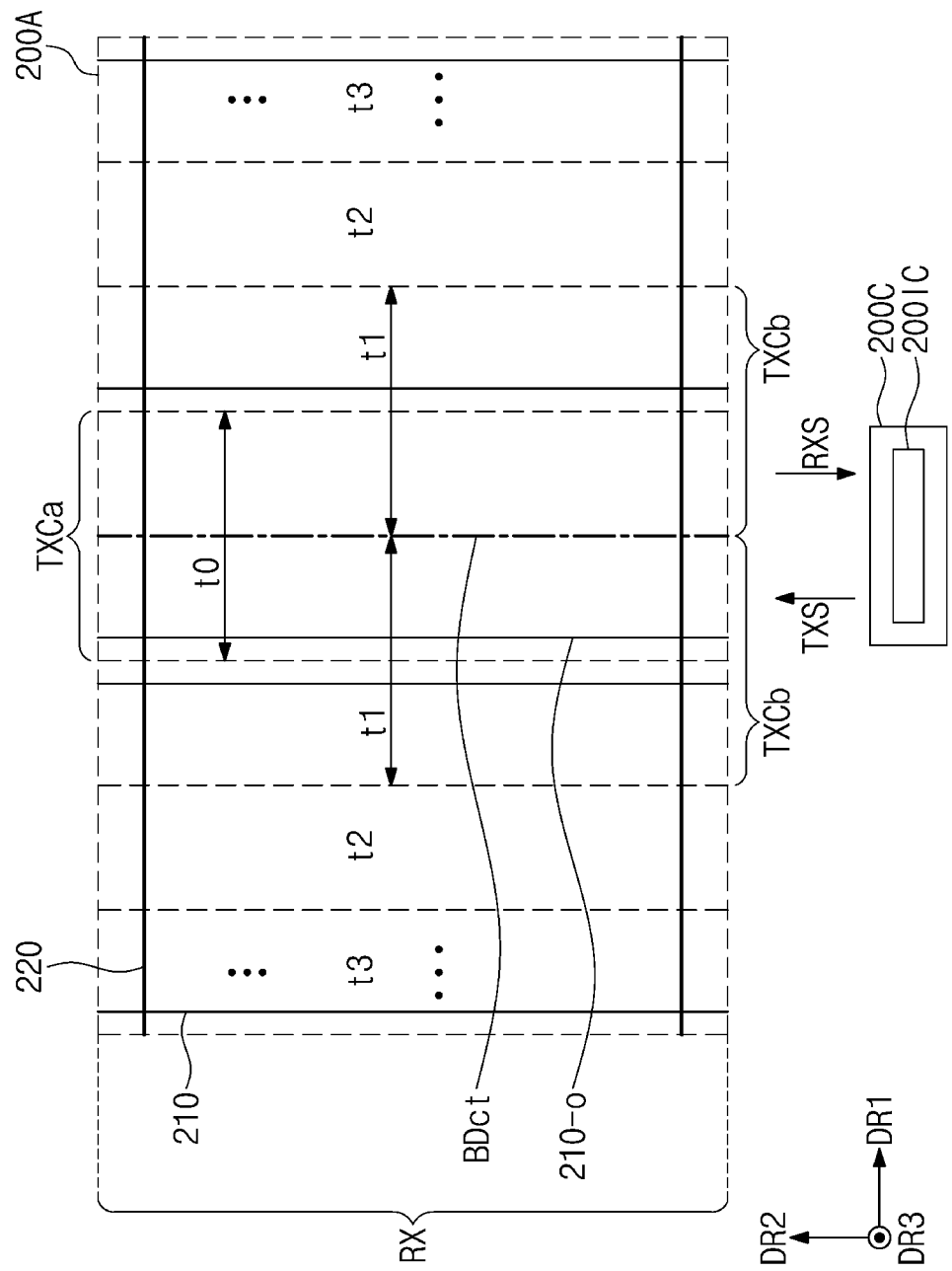
FIG. 19 is a diagram illustrating an operation of a sensor according to an embodiment of the present disclosure.

FIG. 19 is a diagram illustrating an operation of a sensor according to an embodiment of the present disclosure.

Referring to FIG. 19, a plurality of transmit groups TX and a receive group RX may be disposed in the sensing area 200A. The sensor driver 200C may simultaneously output a plurality of transmit signals TXS to the first electrodes 210 included in each of the transmit groups TX.

At least one transmit group TXC among the transmit groups TX may at least partially overlap the boundary BDct. For example, the sensor driver 200C may provide the transmit signal TXS to a single transmit group TXC, and then provide the transmit signals TXS in a symmetrical manner (e.g., mirror symmetry) about the boundary BDct.

FIG. 19 shows timings t0, t1, t2, and t3 at which the signals are provided to the transmit groups TX. For example, the transmit signals TXS may be sequentially provided to the transmit groups TX as the transmit groups TX are disposed away from the boundary BDct.

At least some transmit groups among the transmit groups TX may partially overlap each other. For example, some first electrodes 210-*o* included in a transmit group TXCa to which the transmit signals are provided for a first period t0 may be included in a transmit group TXCb to which the transmission signals are provided for a second period t1.

According to an embodiment of the present disclosure, the transmit signals TXS may be simultaneously provided to the single transmit group TXCa including the boundary BDct. The sensed signal RXS obtained from an area including the boundary BDct may be post-processed in the sensing driver 200C. Therefore, the data difference due to the trace line design discontinuity may be reduced, and thus, reliability of data acquired from the area including the boundary BDct may be further increased.

Figure 20:
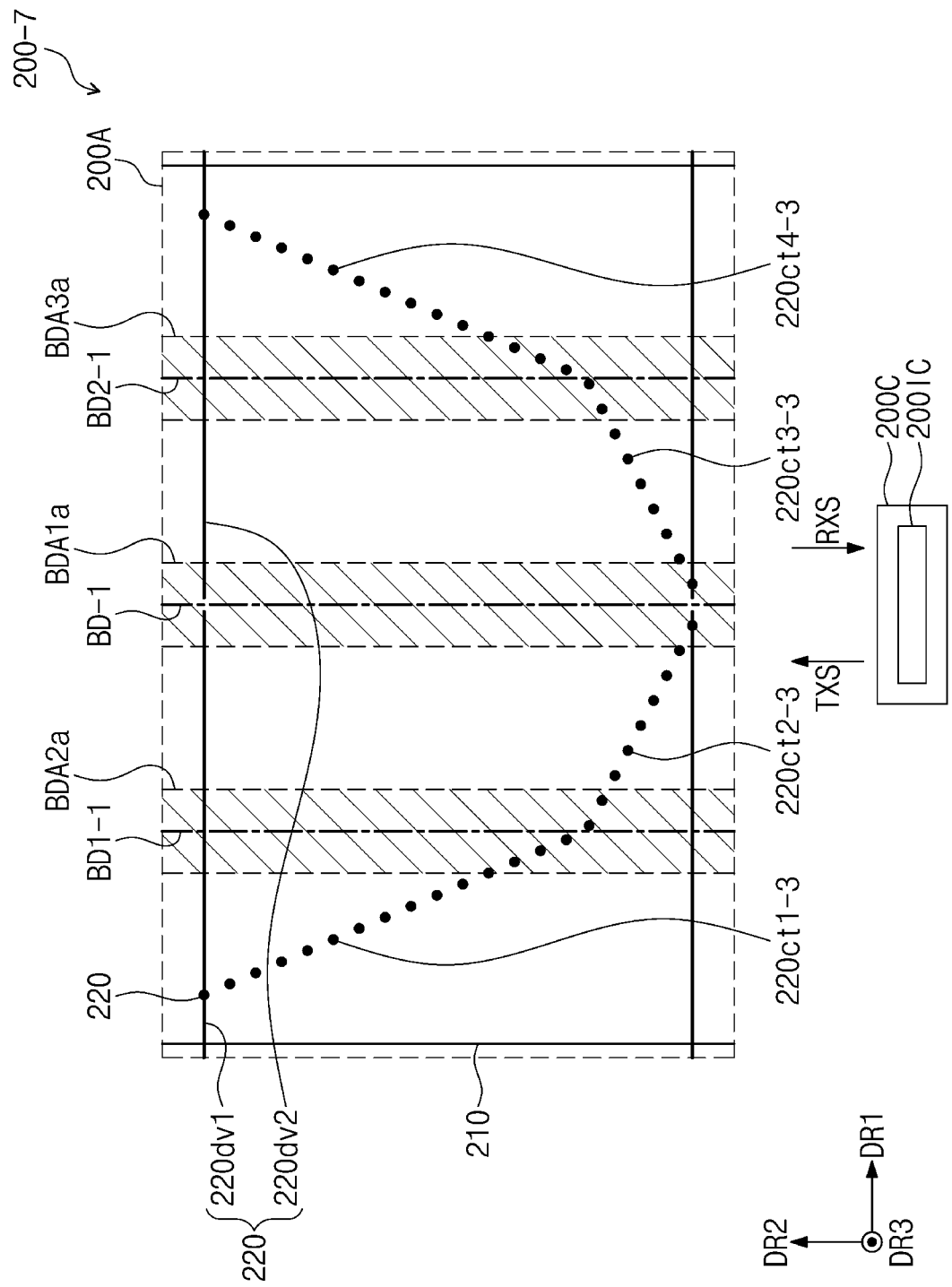
FIG. 20 is a plan view of a sensor according to an embodiment of the present disclosure.

FIG. 20 is a plan view of a sensor 200-7 according to an embodiment of the present disclosure.

Referring to FIG. 20, the sensing area 200A of the sensor 200-7, and first contacts 220*ct*1-3, second contacts 220*ct*2-3, third contacts 220*ct*3-3, and fourth contacts 220*ct*4-3 disposed in the sensing area 200A are illustrated by way of example.

A boundary BD-1 may be defined in the sensing area 200A. Each of the plurality of second electrodes 220 may be divided into the sub-electrodes 220*dv*1 and 220*dv*2 via the boundary BD-1. The boundary BD-1 may be a divided driving boundary-line. The first contacts 220*ct*1-3 and the second contacts 220*ct*2-3 may be spaced apart from the third contacts 220*ct*3-3 and the fourth contacts 220*ct*4-3 with the boundary BD-1 being disposed therebetween.

A first boundary BD1-1 extending along the second direction DR2 and a second boundary BD2-1 extending along the second direction DR2 and spaced apart from the first boundary BD1-1 with the boundary BD-1 being interposed therebetween may be further defined in the sensing area 200A. The first contacts 220*ct*1-3 and the second contacts 220*ct*2-3 may be spaced apart from each other while the first boundary BD1-1 is disposed therebetween. The third contacts 220*ct*3-3 and the fourth contacts 220*ct*4-3 may be spaced apart from each other while the second boundary BD2-1 is disposed therebetween.

The second electrode 220 may be divided into the first sub-electrode 220*dv*1 and the second sub-electrode 220*dv*2 via the boundary BD-1, while the first sub-electrode 220*dv*1 and the second sub-electrode 220*dv*2 may be electrically insulated from each other. The first sub-electrode 220*dv*1 may at least partially overlap the first boundary BD1-1, and the second sub-electrode 220*dv*2 may at least partially overlap the second boundary BD2-1.

Although only one first sub-electrode 220*dv*1 and one second sub-electrode 220*dv*2 are shown in FIG. 20, a plurality of first sub-electrodes 220*dv*1 and a plurality of second sub-electrodes 220*dv*2 may be provided. The first sub-electrodes 220*dv*1 may be electrically connected to the first and second contacts 220*ct*1-3 and 220*ct*2-3 in a one-to-one corresponding manner. For example, the number of the first sub-electrodes 220*dv*1 may correspond to a total of the numbers of the first and second contacts 220*ct*1-3 and 220*ct*2-3. The second sub-electrodes 220*dv*2 may be electrically connected to the third and fourth contacts 220*ct*3-3 and 220*ct*4-3 in a one-to-one corresponding manner. For example, the number of the second sub-electrodes 220*dv*2 may correspond to a total of the numbers of the third and fourth contacts 220*ct*3-3 and 220*ct*4-3.

The first contacts 220*ct*1-3 may be arranged according to a first rule, and the second contacts 220*ct*2-3 may be arranged according to a second rule that is different from the first rule. A slope of a first arrangement direction of the first contacts 220*ct*1-3 and a slope of a second arrangement direction of the second contacts 220*ct*2-3 may be different from each other. The third contacts 220*ct*3-3 and the fourth contacts 220*ct*4-3 may be arranged in a symmetrical manner with the first contacts 220*ct*1-3 and the second contacts 220*ct*2-3 about the boundary BD-1.

According to an embodiment of the present disclosure, the transmit signals TXS may be simultaneously provided to each of areas BDA1*b*, BDA2*b*, and BDA3*b* respectively including the boundary BD-1, the first boundary BD1-1, and the second boundary BD2-1. Accordingly, the same noise and the sensed signal may be sensed in each of the areas BDA1*b*, BDA2*b*, and BDA3*b* respectively including the boundary BD-1, the first boundary BD1-1, and the second boundary BD2-1. Therefore, as a difference between the sensed signals respectively measured in two portions of each of the areas BDA1*b*, BDA2*b*, and BDA3*b* spaced apart from each other while each of the boundary BD-1, the first boundary BD1-1, and the second boundary BD2-1 is disposed therebetween is reduced or eliminated, the data distortion and data discontinuity that occur around each of the boundary BD-1, the first boundary BD1-1, and the second boundary BD2-1 may be reduced or eliminated. Further, the sensed signal RXS obtained from each of the areas BDA2*b* and BDA3*b* respectively including the first boundary BD1-1 and the second boundary BD2-1 may be post-processed in the sensing driver 200C. Therefore, the data difference due to the trace line design discontinuity may be reduced, and thus, reliability of data acquired from each of the areas BDA2*b* and BDA3*b* may be increased. As a result, the sensing performance of the sensor 200-7 may be increased.

Figure 21:
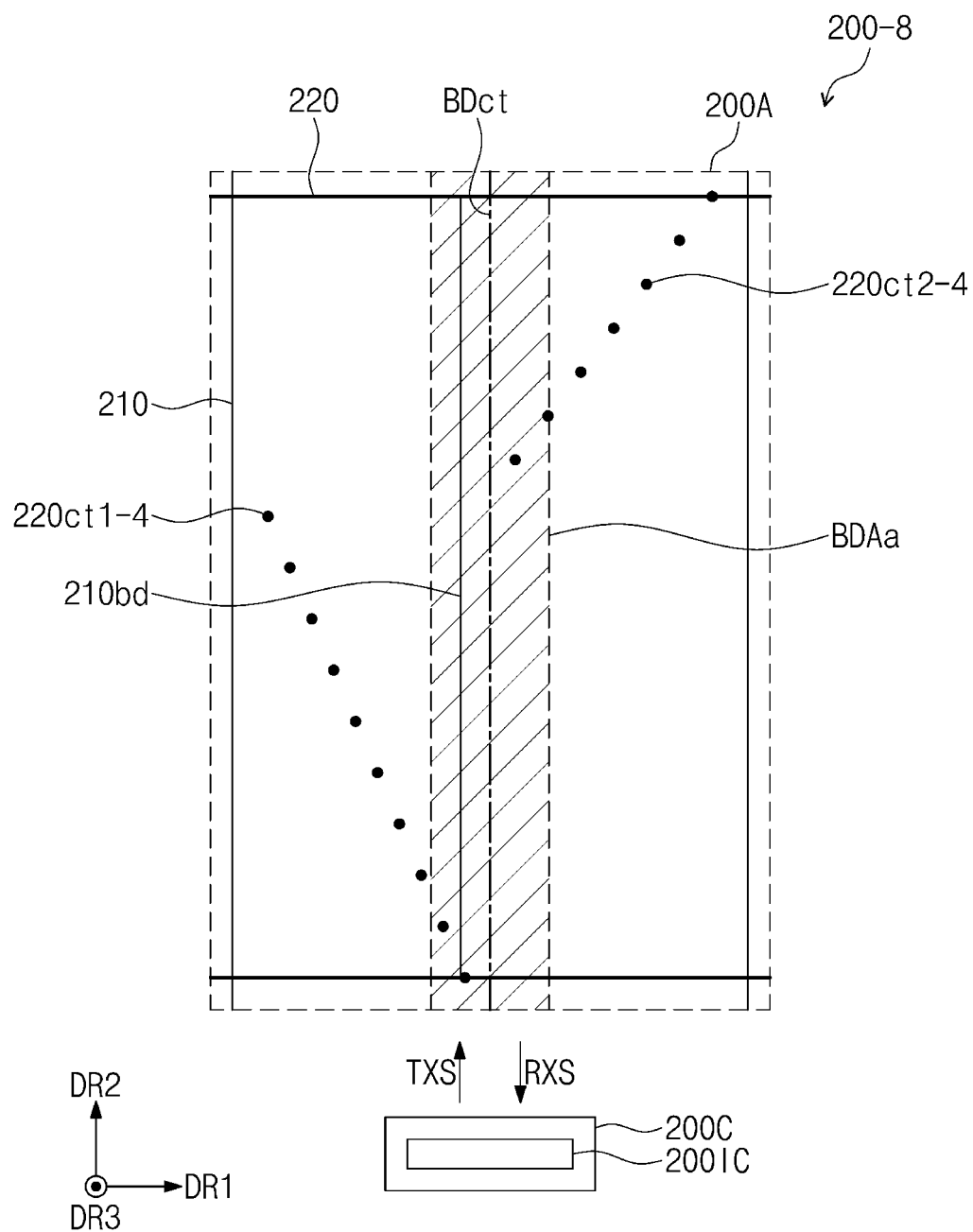
FIG. 21 is a plan view of a sensor according to an embodiment of the present disclosure.

FIG. 21 is a plan view of a sensor 200-8 according to an embodiment of the present disclosure.

Referring to FIG. 21, a sensing area 200Aa of the sensor 200-8, and first contacts 220*ct*1-4 and second contacts 220*ct*2-4 disposed in the sensing area 200Aa are illustrated by way of example. A width in the first direction DR1 of the sensing area 200Aa may be smaller than a width in the second direction DR2 of the sensing area 200Aa.

The first contacts 220*ct*1-4 and the second contacts 220*ct*2-4 may be spaced apart from each other with the boundary BDct being disposed therebetween. The first contacts 220*ct*1-4 may be arranged according to a first rule, and the second contacts 220*ct*2-4 may be arranged according to a second rule that is different from the first rule. A slope of a first arrangement direction of the first contacts 220*ct*1-4 and a slope of a second arrangement direction of the second contacts 220*ct*2-4 may be different from each other.

According to an embodiment of the present disclosure, the sensor 200-8 may simultaneously provide the transmit signals TXS to the boundary electrodes 210*bd* disposed in an area BDAa including the boundary BDct among the first electrodes 210. For example, the transmit signals TXS may be simultaneously provided to the area BDAa including the boundary BDct. The sensed signal RXS obtained from the area BDAa including the boundary BDct may be post-processed in the sensing driver 200C. Therefore, the data difference due to the trace line design discontinuity may be reduced, and thus, reliability of data acquired from the area BDAa including the boundary BDct may be increased. As a result, sensing performance of the sensor 200-8 may be increased.

Figure 22:
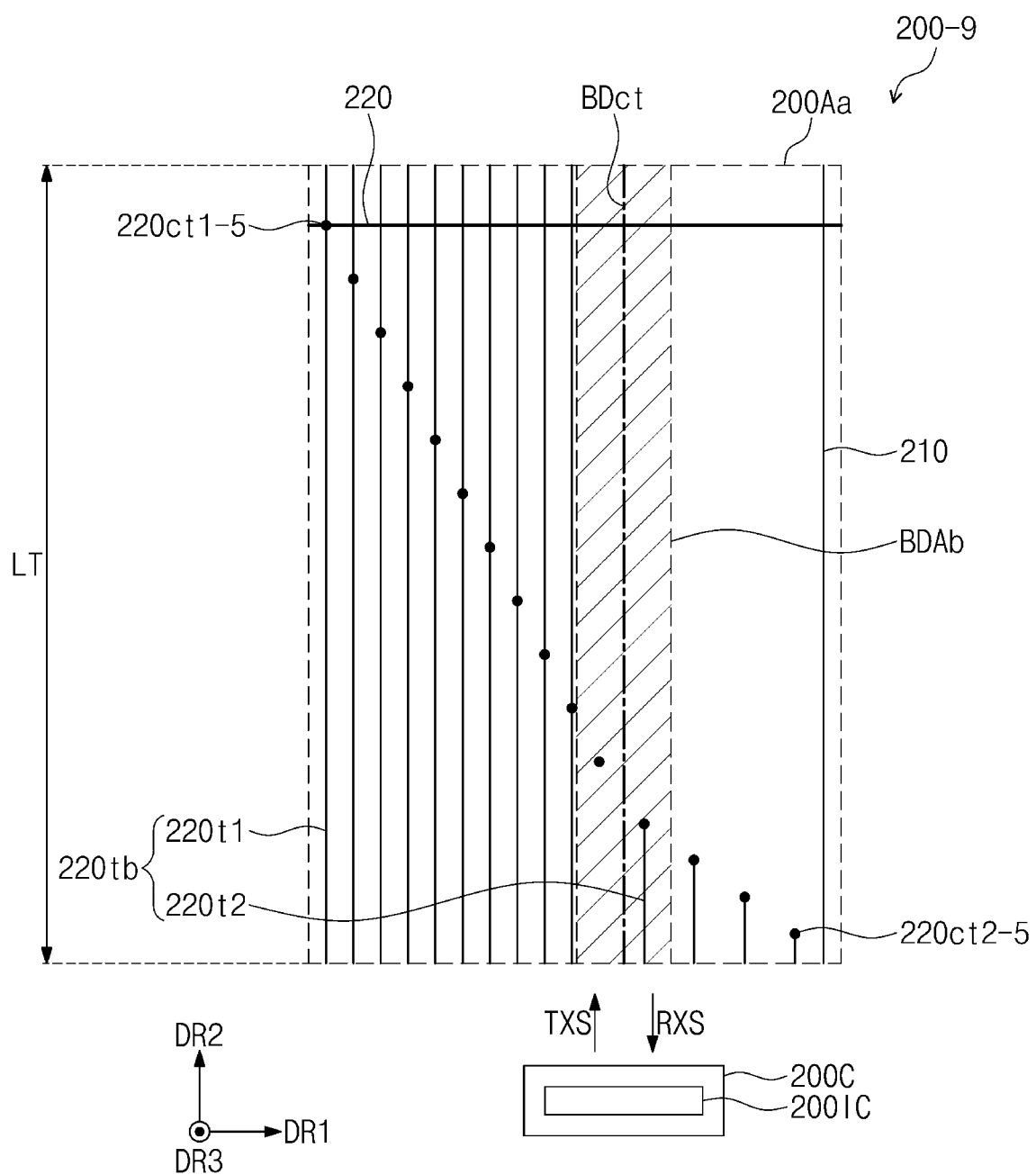
FIG. 22 is a plan view of a sensor according to an embodiment of the present disclosure.

FIG. 22 is a plan view of a sensor 200-9 according to an embodiment of the present disclosure.

Referring to FIG. 22, the sensing area 200Aa of the sensor 200-9, one first electrode 210, one second electrode 220, first contacts 220*ct*1-5, second contacts 220*ct*2-5, and second trace lines 220*tb* disposed in the sensing area 200Aa are illustrated by way of example.

The first contacts 220*ct*1-5 and the second contacts 220*ct*2-5 may be spaced apart from each other with the boundary BDct being disposed therebetween. The first contacts 220*ct*1-5 may be arranged according to a first rule, and the second contacts 220*ct*2-5 may be arranged according to a second rule that is different from the first rule. A slope of ta first arrangement direction of the first contacts 220*ct*1-5 and a slope of a second arrangement direction of the second contacts 220*ct*2-5 may be different from each other.

The second trace lines 220*tb* may include second-first trace lines 220*t*1 and second-second trace lines 220*t*2. The second-first trace lines 220*t*1 and the second-second trace lines 220*t*2 may be spaced apart from each other with the boundary BDct being disposed therebetween. The second-first trace lines 220*t*1 may be electrically connected to the second electrodes 220 in a one-to-one corresponding manner via the first contacts 220*ct*1-5. The second-second trace lines 220*t*2 may be electrically connected to the second electrodes 220 in a one-to-one corresponding manner via the second contacts 220*ct*2-5.

Each of the second-first trace lines 220*t*1 may extend in the second direction DR2. In an embodiment of the present disclosure, lengths LT of the second-first trace lines 220*t*1 may be substantially equal to each other. Accordingly, the second-first trace lines 220*t*1 may extend beyond the first contacts 220*ct*1-5. Each of the second-second trace lines 220*t*2 may extend in the second direction DR2, and lengths of the second-second trace lines 220*t*2 may be different from each other.

Figure 23:
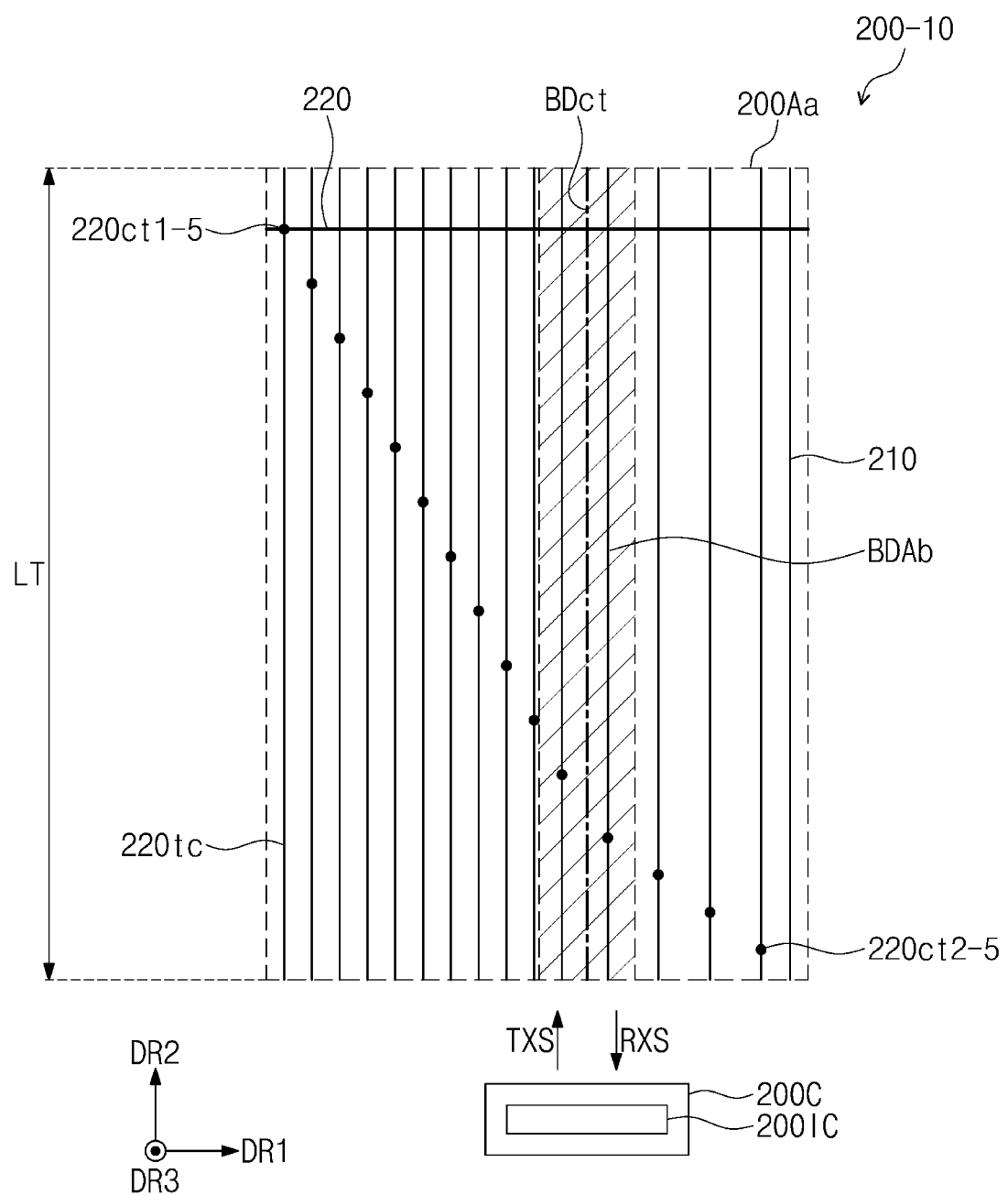
FIG. 23 is a plan view of a sensor according to an embodiment of the present disclosure.

FIG. 23 is a plan view of a sensor 200-10 according to an embodiment of the present disclosure.

Referring to FIG. 23, the sensing area 200Aa of the sensor 200-10, and the first contacts 220*ct*1-5, the second contacts 220*ct*2-5, and second trace lines 220*tc* disposed in the sensing area 200Aa are illustrated by way of example.

Each of the second trace lines 220*tc* may extend in the second direction DR2. In an embodiment of the present disclosure, lengths LT of the second trace lines 220*tc* may be substantially equal to each other. Accordingly, the second trace lines 220*tc* may extend beyond the first contacts 220*ct*1-5 and the second contacts 220*ct*2-5.

Referring to FIG. 22 and FIG. 23, the sensor 200-9 or 200-10 may simultaneously provide the transmit signal TXS to the boundary electrodes disposed in the area BDAb including the boundary BDct among the first electrodes 210. For example, the transmit signal TXS may be simultaneously provided to the area BDAb including the boundary BDct, and the sensed signal RXS acquired from the area BDAb including the boundary BDct may be post-processed in the sensing driver 200C. Therefore, the data difference due to the trace line design discontinuity may be reduced, and thus, reliability of data obtained from the area BDAb including the boundary BDct may be increased. As a result, the sensing performance of the sensor 200-9 or 200-10 may be increased.

As described above, the boundary may be defined in the sensing area of the sensor. The boundary may be the divided driving boundary or a boundary due to the trace line design discontinuity. A single transmit group of the sensor may at least partially overlap the boundary. The sensor may receive the transmit signals in a symmetrical manner (e.g., mirror symmetry) about the boundary. In this case, the same noise and the same sensed signal may be simultaneously sensed in an area proximate to the boundary. Therefore, as the difference or deviation between the sensed signals respectively measured in the areas spaced apart from each other with the boundary being disposed therebetween is reduced or eliminated, the distortion of data and data discontinuity that occur proximate to the boundary may be reduced or eliminated. Alternatively, the transmit signals may be simultaneously provided to the first electrodes disposed in the area including the boundary, and the sensed signal acquired from the area including the boundary may be post-processed in the sensing driver. Therefore, the data difference due to the trace line design discontinuity may be reduced, and thus, reliability of data acquired from the area including the boundary may be increased. As a result, the sensing performance of the sensor may be increased.

While the present disclosure has been described with reference to embodiments thereof, it will be apparent to those of ordinary skill in the art that various changes and modifications may be made thereto without departing from the spirit and scope of the present disclosure.

What is claimed is:

1. An electronic device, comprising:
a sensor including a sensing area and a peripheral area proximate to the sensing area; and
a sensor driver driving the sensor,
wherein the sensor includes:
    a plurality of first electrodes disposed in the sensing area, extending in a second direction intersecting a first direction, and arranged along the first direction, the plurality of first electrodes including a plurality of boundary electrodes;
    a plurality of second electrodes arranged along the second direction and extending in the first direction; and
    a plurality of trace lines electrically connected to the plurality of second electrodes, respectively, wherein one or more of the plurality of trace lines individually overlaps multiple different second electrodes of the plurality of second electrodes as it extends in the second direction and also individually overlaps multiple different first electrodes of the plurality of first electrodes as it extends in the first direction,
wherein a boundary extending along the second direction is defined in the sensing area,
wherein the plurality of second electrodes and the plurality of trace lines are electrically connected to each other via a plurality of contacts disposed in the sensing area, respectively,
wherein the plurality of contacts include a plurality of first contacts arranged according to a first rule and a plurality of second contacts arranged according to a second rule that is different from the first rule, the first and second rule defining areas of the respective second electrodes that the plurality of contacts attach to that are between ends of the respective second electrodes by differing amounts,
wherein the plurality of first contacts and the plurality of second contacts are spaced apart from each other with the boundary disposed therebetween, and
wherein the sensor driver simultaneously outputs a plurality of boundary transmit signals to the plurality of boundary electrodes disposed in a boundary area that includes the boundary.

2. The electronic device of claim 1, wherein the boundary is a divided driving boundary-line, and
wherein the sensor driver outputs a plurality of transmit signals to the plurality of first electrodes in a symmetrical manner about the boundary.

3. The electronic device of claim 2, wherein a plurality of groups are defined, wherein each of the plurality of groups includes one or more first electrodes among the plurality of first electrodes, wherein numbers of the first electrodes respectively included in the plurality of groups are symmetrical with respect to each other about the boundary, and
wherein the sensor driver simultaneously outputs the plurality of transmit signals to the first electrodes included in two groups disposed symmetrically about the boundary among the plurality of groups.

4. The electronic device of claim 3, wherein two groups closest to each other and disposed proximate to the boundary, among the plurality of groups, include the plurality of boundary electrodes.

5. The electronic device of claim 2, wherein each of the plurality of second electrodes includes each of a plurality of first sub-electrodes arranged along the second direction and each of a plurality of second sub-electrodes arranged along the second direction, and
wherein each of the plurality of first sub-electrodes and each of the plurality of second sub-electrodes are spaced apart from each other with the boundary disposed therebetween.

6. The electronic device of claim 5, wherein the sensor further includes:

a plurality of first trace lines electrically connected to the plurality of first electrodes, respectively, and
wherein the plurality of trace lines comprises:
a plurality of second trace lines electrically connected to the plurality of first sub-electrodes, respectively; and
a plurality of third trace lines electrically connected to the plurality of second sub-electrodes, respectively,
wherein the plurality of second trace lines and the plurality of third trace lines each at least partially overlap the sensing area.

7. The electronic device of claim 6, wherein the plurality of first sub-electrodes and the plurality of second trace lines are electrically connected to each other via the plurality of first contacts, respectively,
wherein the plurality of second sub-electrodes and the plurality of third trace lines are electrically connected to each other via the plurality of second contacts, respectively, and
wherein the plurality of first contacts and the plurality of second contacts are arranged in a symmetrical manner with respect to each other about the boundary.

8. The electronic device of claim 7, wherein the plurality of first contacts include first sub-contacts arranged according to a first sub rule and second sub-contacts arranged according to a second sub rule that is different from the first sub rule,
wherein a first boundary extending along the second direction and disposed between the first sub-contacts and the second sub-contacts is further defined in the sensing area, and
wherein the sensor driver simultaneously outputs a plurality of first boundary transmit signals to a plurality of first boundary electrodes disposed in a first boundary area including the first boundary among the plurality of first electrodes.

9. The electronic device of claim 5, wherein the sensor driver includes a single driver chip, and
wherein the plurality of first electrodes and the plurality of second electrodes are electrically connected to the single driver chip.

10. The electronic device of claim 5, wherein the sensor driver includes a plurality of driver chips,
wherein a first plurality of first electrodes and a second plurality of first electrodes among the plurality of first electrodes are spaced apart from each other with the boundary disposed therebetween,
wherein the first plurality of first electrodes are electrically connected to a first driver chip,
wherein the second plurality of first electrodes are electrically connected to a second driver chip, and
wherein the plurality of first sub-electrodes are electrically connected to the first driver chip, while the plurality of second sub-electrodes are electrically connected to the second driver chip.

11. The electronic device of claim 10, wherein a first boundary extending along the second direction and a second boundary extending along the second direction are further defined in the sensing area such that the second boundary is spaced apart from the first boundary with the boundary being interposed therebetween,
wherein each of the first boundary and the second boundary is a divided driving boundary-line,
wherein the first driver chip outputs a plurality of transmit signals to the first plurality of first electrodes in a symmetrical manner about the first boundary, and
wherein the second driver chip outputs a plurality of transmit signals to the second plurality of first electrodes in a symmetrical manner about the second boundary.

12. The electronic device of claim 11, wherein the first driver chip simultaneously outputs a plurality of first boundary transmit signals to a plurality of first boundary electrodes disposed in a first boundary area including the first boundary among the first plurality of first electrodes, and
wherein the second driver chip simultaneously outputs a plurality of second boundary transmit signals to a plurality of second boundary electrodes disposed in a second boundary area including the second boundary among the second plurality of first electrodes.

13. The electronic device of claim 1, wherein the sensor further includes:
a plurality of first trace lines electrically connected to the plurality of first electrodes, respectively,
wherein the plurality of trace lines and the plurality of contacts at least partially overlap the sensing area.

14. The electronic device of claim 13, wherein a plurality of groups are defined, wherein each of the plurality of groups includes one or more first electrodes among the plurality of first electrodes, and
wherein the sensor driver simultaneously outputs a plurality of transmit signals to the first electrodes included in each of the plurality of groups.

15. The electronic device of claim 14, wherein one group of the plurality of groups includes the plurality of boundary electrodes.

16. The electronic device of claim 15, wherein a center in the first direction of the one group and the boundary at least partially overlap each other.

17. The electronic device of claim 15, wherein a center in the first direction of the one group and the boundary do not overlap each other.

18. The electronic device of claim 14, wherein a plurality of boundary groups among the plurality of groups at least partially overlap the boundary, and
wherein the plurality of boundary groups partially overlap each other.

19. The electronic device of claim 13, wherein lengths of some of the trace lines overlapping the sensing area are substantially equal to each other.

20. The electronic device of claim 13, wherein lengths of some of the trace lines overlapping the sensing area are different from each other.

21. The electronic device of claim 13, wherein some of the trace lines at least partially overlap the sensing area, and
wherein lengths of some of said some second traces are equal to each other, while lengths of the others of said some second traces are different from each other.

22. The electronic device of claim 1, wherein a first arrangement direction of the plurality of first contacts has a negative slope, while a second arrangement direction of the plurality of second contacts has a positive slope.

23. The electronic device of claim 1, wherein the plurality of first contacts and the plurality of second contacts are arranged in a substantially mirror-symmetrical manner with respect to each other about the boundary.

24. The electronic device of claim 1, wherein in the first direction, the plurality of first contacts and the plurality of second contacts do not overlap each other.

25. The electronic device of claim 1, wherein a slope of a first arrangement direction of the plurality of first contacts is different from a slope of a second arrangement direction of the plurality of second contacts.

26. The electronic device of claim 1, wherein a plurality of groups are defined, wherein each of the plurality of groups includes one or more first electrodes among the plurality of first electrodes, wherein the sensor driver simultaneously outputs a plurality of transmit signals to the first electrodes included in each of the plurality of groups, and wherein a number of the first electrodes included in each of the plurality of groups varies based on an operation mode of the sensor.

27. An electronic device, comprising:

a sensing area;

a peripheral area proximate to the sensing area;

a plurality of transmit groups arranged along a first direction and disposed in the sensing area, wherein each of the transmit groups includes one or more first electrodes;

a receive group including a plurality of second electrodes disposed in the sensing area and arranged along a second direction intersecting the first direction;

a plurality of trace lines electrically connected to the plurality of second electrodes, respectively, wherein one or more of the plurality of trace lines individually overlaps multiple different second electrodes of the plurality of second electrodes as it extends in the second direction and also individually overlaps multiple different first electrodes of the plurality of first electrodes as it extends in the first direction, wherein the plurality of second electrodes and the plurality of trace lines are electrically connected to each other via a plurality of contacts disposed in the sensing area, respectively, wherein a transmit signal is simultaneously provided to the one or more first electrodes included in each of the plurality of transmit groups, wherein a boundary extending along the second direction intersecting the first direction is defined in the sensing area, wherein one transmit group of the plurality of transmit groups at least partially overlaps the boundary, wherein the plurality of contacts include a plurality of first contacts arranged according to a first rule and a plurality of second contacts arranged according to a second rule that is different from the first rule, the first and second rule defining areas of the respective second electrodes that the plurality of contacts attach to that are between ends of the respective second electrodes, and wherein the plurality of first contacts and the plurality of second contacts are spaced apart from each other with the boundary disposed therebetween.

28. The electronic device of claim 27, wherein a number of the one or more first electrodes included in each of the plurality of transmit groups is variable.

29. The electronic device of claim 27, wherein the transmit signal is sequentially provided to the plurality of transmit groups along the first direction.

30. The electronic device of claim 27, wherein numbers of the one or more first electrodes respectively included in the plurality of transmit groups are symmetrical with respect each other about the boundary.

31. The electronic device of claim 27, wherein the transmit signal is sequentially provided to two transmit groups disposed symmetrically about the boundary among the plurality of transmit groups.

32. The electronic device of claim 27, wherein the plurality of transmit groups do not overlap with each other.

33. The electronic device of claim 27, wherein at least some of the plurality of transmit groups partially overlap each other.

34. The electronic device of claim 27, wherein the plurality of second electrodes includes a plurality of first sub-electrodes arranged along the second direction and a plurality of second sub-electrodes arranged along the second direction, wherein the plurality of first sub-electrodes and the plurality of second sub-electrodes are spaced apart from each other with the boundary is disposed therebetween, and wherein the one transmit group at least partially overlaps the plurality of first sub-electrodes and the plurality of second sub-electrodes.

\* \* \* \* \*